US011656367B2

(12) United States Patent
Willcox

(10) Patent No.: US 11,656,367 B2
(45) Date of Patent: May 23, 2023

(54) RAPID ASSESSMENT OF VEHICLE RELATIVE SPEED PERFORMANCE

(71) Applicant: The Boeing Company, Chicago, IL (US)

(72) Inventor: Jeffrey Scott Willcox, Arlington, MA (US)

(73) Assignee: The Boeing Company, Chicago, IL (US)

( * ) Notice: Subject to any disclaimer, the term of this patent is extended or adjusted under 35 U.S.C. 154(b) by 533 days.

(21) Appl. No.: 16/898,282

(22) Filed: Jun. 10, 2020

(65) Prior Publication Data

US 2021/0389475 A1    Dec. 16, 2021

(51) Int. Cl.
| G01S 19/42 | (2010.01) |
| G01C 21/20 | (2006.01) |
| G01S 19/52 | (2010.01) |
| G05D 1/02 | (2020.01) |
| G05D 1/10 | (2006.01) |
| G08G 3/00 | (2006.01) |
| G08G 5/00 | (2006.01) |
| G01S 19/14 | (2010.01) |

(52) U.S. Cl.
CPC ............ *G01S 19/42* (2013.01); *G01C 21/203* (2013.01); *G01S 19/52* (2013.01); *G05D 1/0206* (2013.01); *G05D 1/104* (2013.01); *G08G 3/00* (2013.01); *G08G 5/0034* (2013.01)

(58) Field of Classification Search
None
See application file for complete search history.

(56) References Cited

U.S. PATENT DOCUMENTS

| 7,264,204 | B1 * | 9/2007 | Portmann | ............... B63B 35/50 244/11 OF |
| 7,371,136 | B2 | 5/2008 | Hine et al. | |
| 8,944,866 | B2 | 2/2015 | Hine | |

(Continued)

OTHER PUBLICATIONS

Wilhelm B. Klinger, et al., "Control of an Unmanned Surface Vehicle with Uncertain Displacement and Drag", IEEE J. Oceanic Eng., vol. 42, No. 2, pp. 458-476, Apr. 2017, 35 pages.*

(Continued)

*Primary Examiner* — Aniss Chad
*Assistant Examiner* — Mahmoud M Kazimi
(74) *Attorney, Agent, or Firm* — Ferguson Braswell Fraser Kubasta PC

(57) ABSTRACT

A method including operating vehicles through a medium. The vehicles are subject to advection due to movement of the medium. The vehicles are in sufficient proximity to each other that one or more conditions of the medium are about equivalent for the vehicles. The method also includes applying an incremental sequence of about equivalent thrust forces to the plurality of vehicles to generate about equivalent incremental changes in a plurality of steady-state average drag forces for the plurality of vehicles. The method also includes measuring a plurality of speed changes for the plurality of vehicles. The method also includes calculating, from the plurality of speed changes, a plurality of relative speed performance statistics for relative speed performance between pairs of vehicles, wherein calculating is performed independently of the one or more conditions of the medium.

20 Claims, 27 Drawing Sheets

(56) References Cited

U.S. PATENT DOCUMENTS

| | | |
|---|---|---|
| 9,051,037 B2 | 6/2015 | Hine et al. |
| 9,802,681 B1 * | 10/2017 | Hine ................. G01N 33/1886 |
| 2012/0094556 A1 | 4/2012 | Hine et al. |
| 2014/0038477 A1 | 2/2014 | Hine et al. |
| 2014/0263851 A1 * | 9/2014 | Hine .................... B64F 1/04 |
| | | 244/4 R |
| 2016/0027308 A1 | 1/2016 | Hine |
| 2019/0118920 A1 | 4/2019 | Hine et al. |

OTHER PUBLICATIONS

Mohamed Abdellatif, et. al., "Online Ocean Current Estimation and Mapping for Autonomous Underwater Vehicle" in Proceeding of Mechatronics 2018, Sep. 2018, 7 pages.

Edoardo I. Sarda, et. al., "Station-keeping control of an unmanned surface vehicle exposed to current and wind disturbances", IEEE J. Ocean Engineering, vol. 127, Sep. 2019; 44 pages.

T. I. Fossen, K. Y. Pettersen and R. Galeazzi, "Line-of-Sight Path Following for Dubins Paths With Adaptive Sideslip Compensation of Drift Forces," in IEEE Transactions on Control Systems Technology, vol. 23, No. 2, pp. 820-827, Mar. 2015. 9 pages.

\* cited by examiner

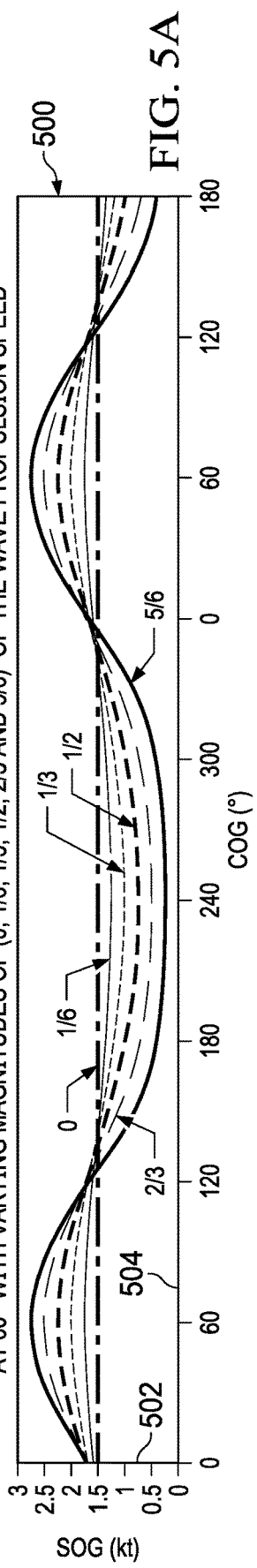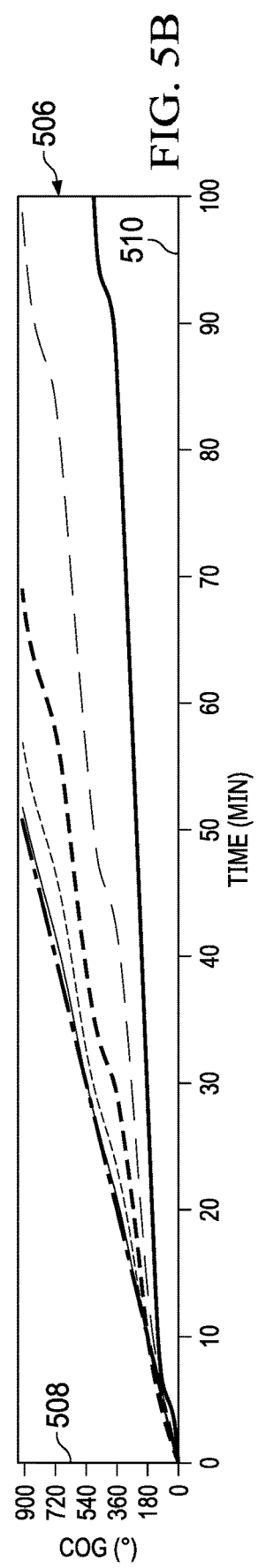

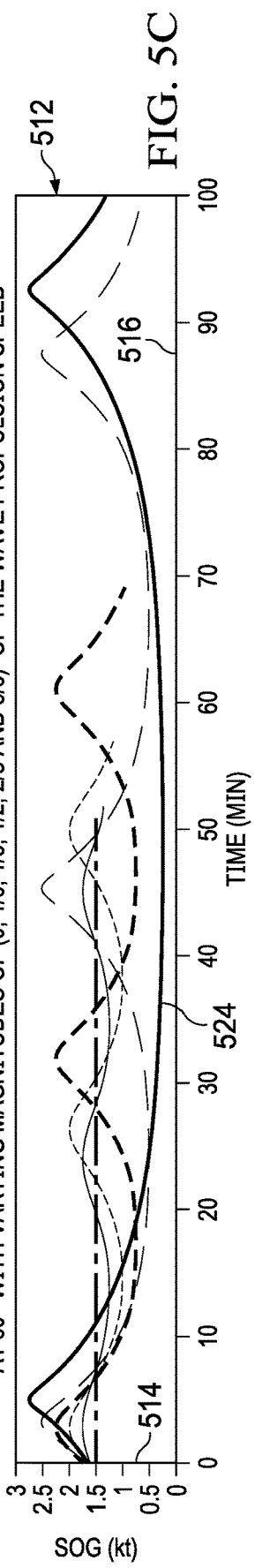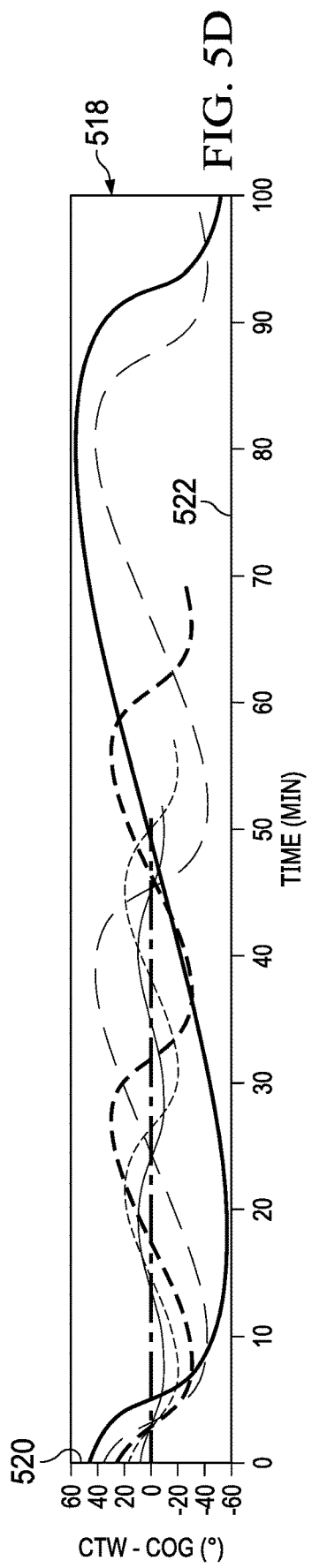

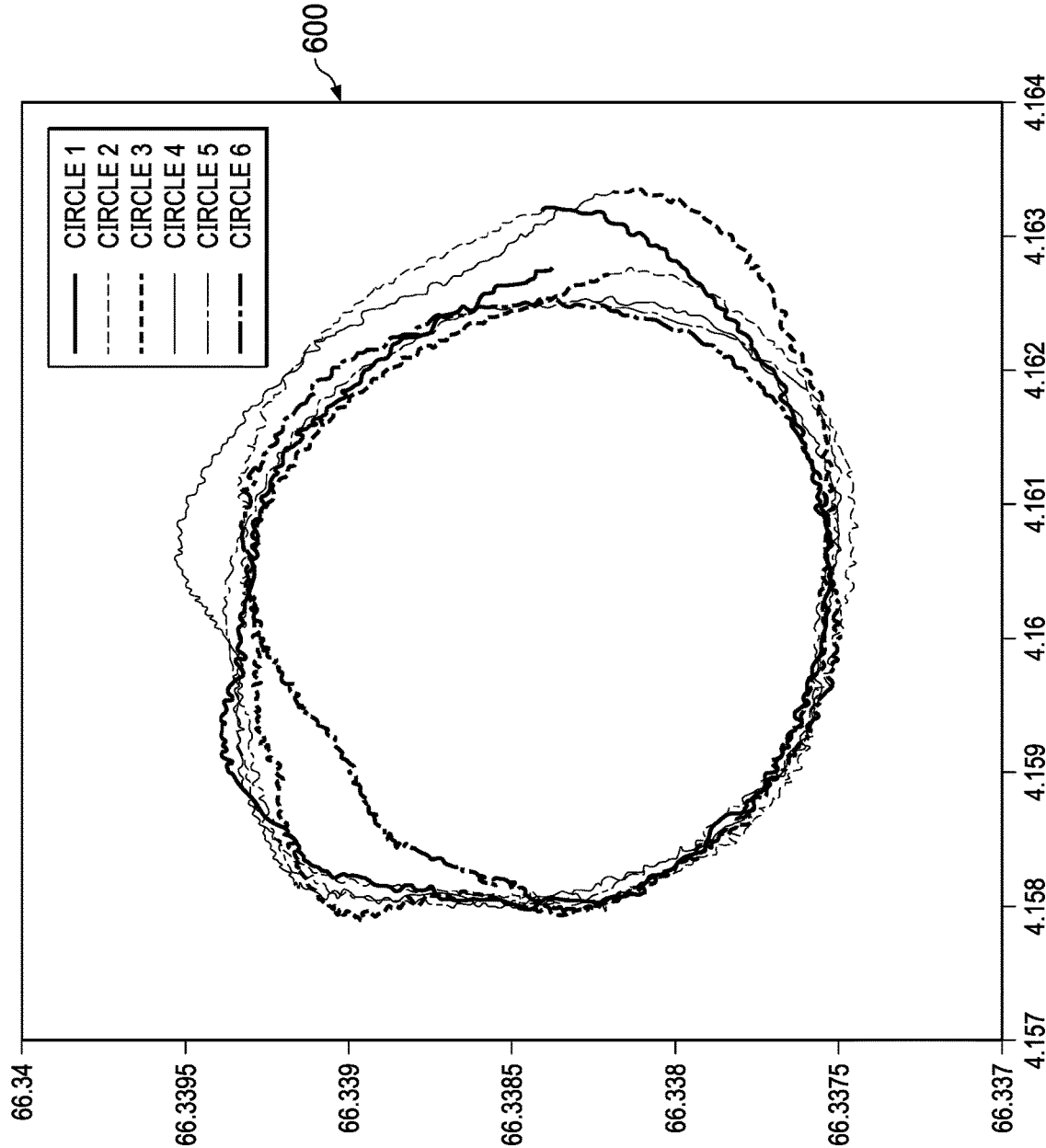

WAVE GLIDER OBSERVED AND MODELED SPEED OVER
GROUND (SOG) vs. COURSE THROUGH WATER (CTW), ESTIMATED
SPEED THROUGH WATER (STW) AND MODEL RESIDUAL ERROR

WAVE GLIDER OBSERVED AND MODELED SPEED OVER
GROUND (SOG) vs. COURSE THROUGH WATER (CTW), ESTIMATED
SPEED THROUGH WATER (STW) AND MODEL RESIDUAL ERROR

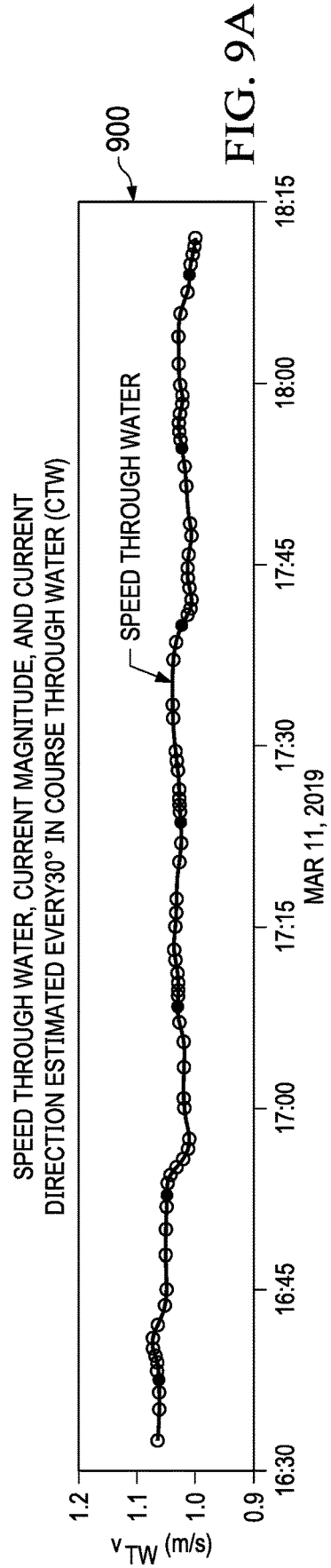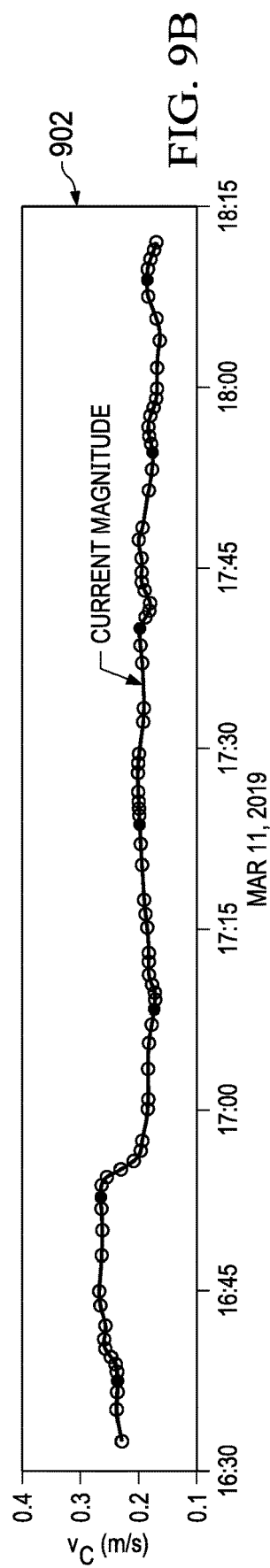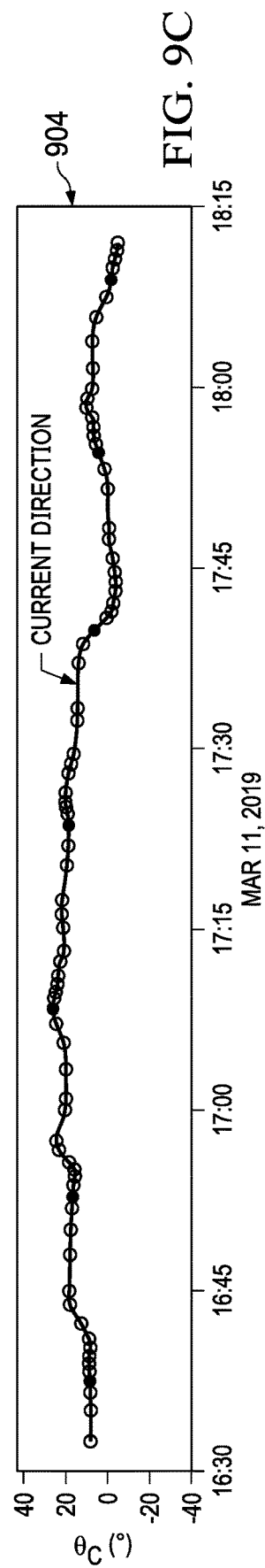
FIG. 9A
FIG. 9B
FIG. 9C

CURRENT-ADJUSTED WATCH-CIRCLE COURSES WITH A CURRENT AT 90°
WITH CURRENT MAGNITUDE OF $v_C/v_{TW}$ = (0, 1/4, 1/2, 3/4)

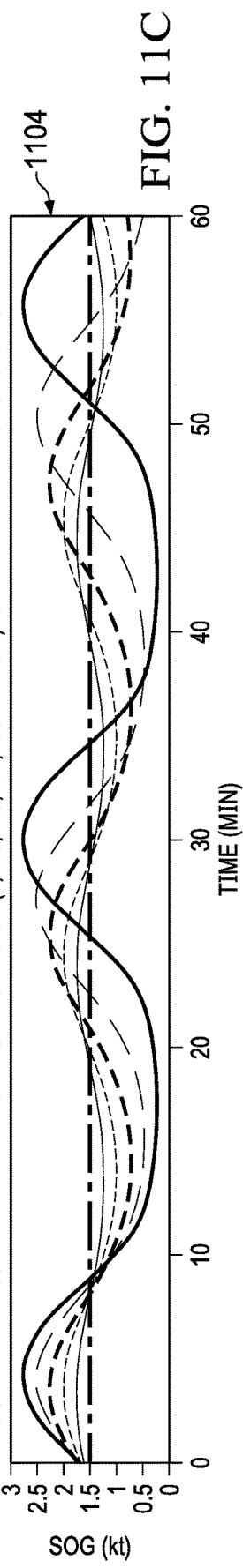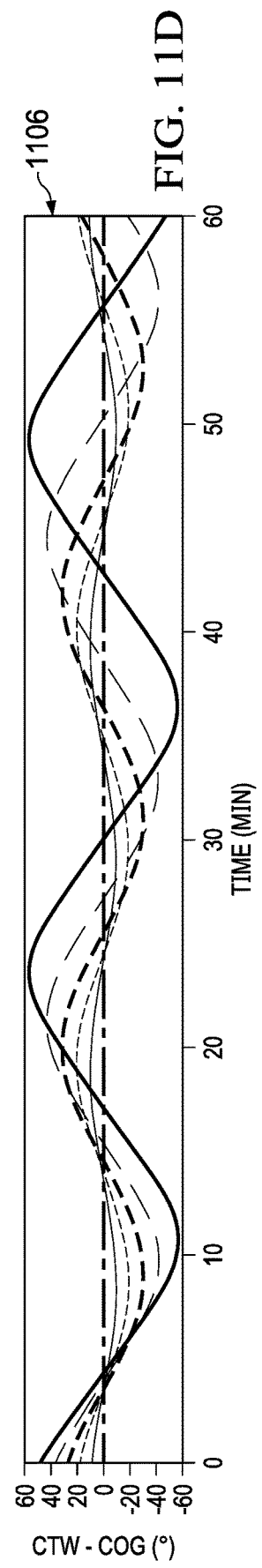

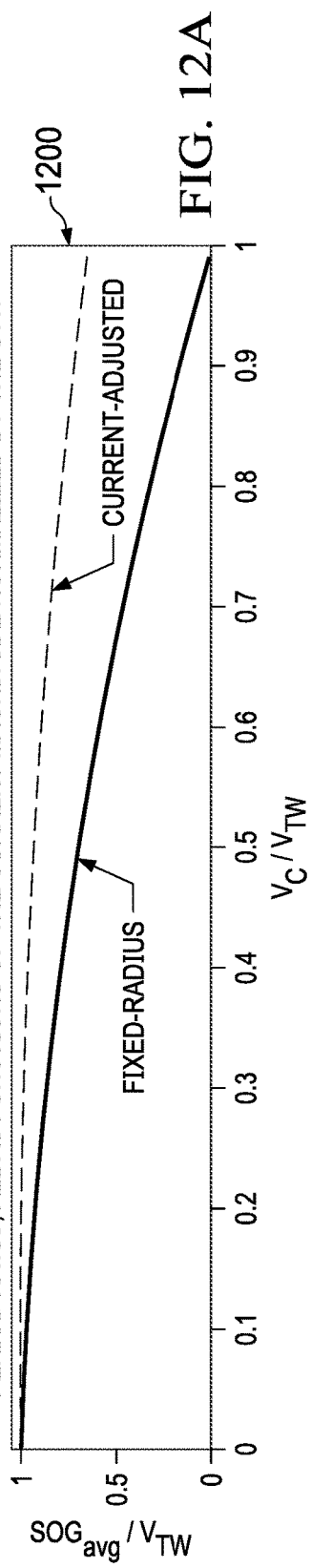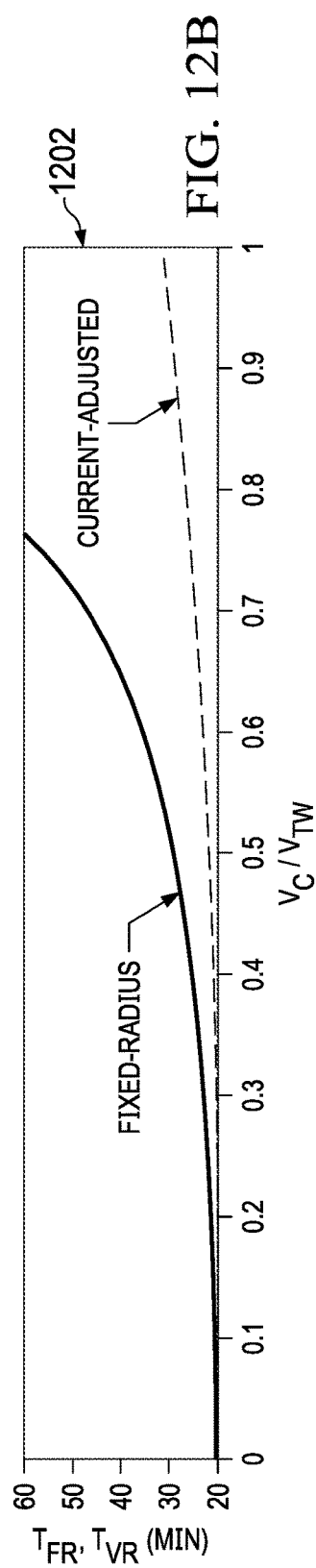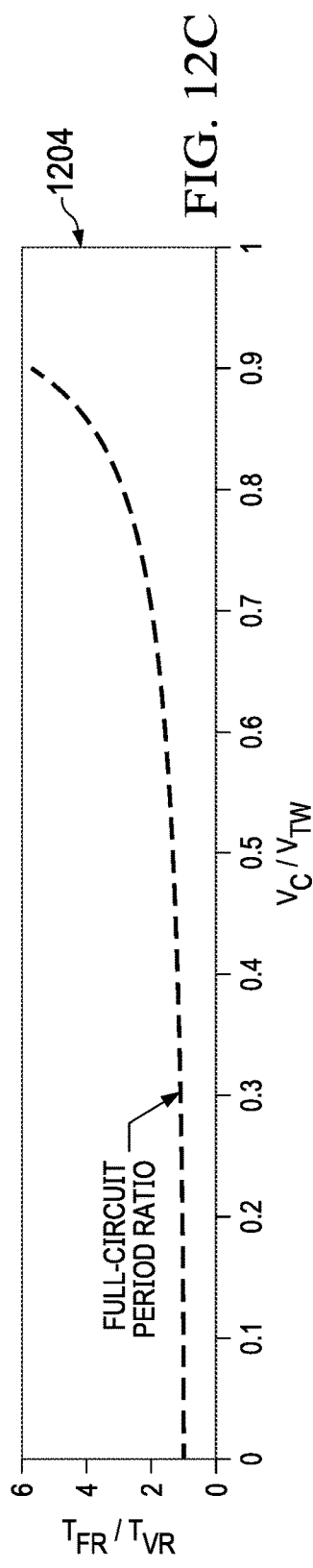

RAPID ASSESSMENT OF VEHICLE RELATIVE SPEED PERFORMANCE

FIELD

The one or more embodiments are related to vehicle navigation improvements when the vehicle is subject to advection caused by movement of the medium in which the vehicle is propelled.

BACKGROUND

Testing has been used to assess the performance of certain types of vehicle propulsion systems as a function of the state conditions of the medium in which the vehicle is placed. Since, for certain types of propulsion systems, the vehicle's speed changes with the prevailing conditions of the medium's state, it is desirable to conduct speed performance testing over a wide range of medium state conditions. For example, for vehicles moving through water, waves and currents can cause both steady and unsteady advection (i.e. movement of the vehicle caused by motion of the water) that significantly affects the performance of certain types of vehicle propulsion and navigation systems. A similar effect due to winds may occur in certain types of aerospace vehicles.

By comparing the relative performance of differently modified vehicles against standard designs, vehicle performance can be tested. Such tests help guide the evolution of vehicle platform design, as well as increase understanding of the impact of configuration changes (e.g., variations in buoyancy and trim with different payload, towed sensors, etc.) on speed performance.

Speed performance testing leads to long deployments for each set of speed performance trials. Long deployments drive up the cost of vehicle design and production, and reduce the number of design or configuration changes that can be tested in a given time or budget. Additionally, each speed performance test event may involve labor-intensive data processing and analysis to generate relative performance data, further increasing costs and reducing testing opportunities. Thus, techniques for enhancing the speed and efficiency of vehicle propulsion testing are desirable.

SUMMARY

The one or more embodiments provide for a method. The method includes operating vehicles through a medium. The vehicles are subject to advection due to movement of the medium. The vehicles are in sufficient proximity to each other that one or more conditions of the medium are about equivalent for the vehicles. The method also includes applying an incremental sequence of about equivalent thrust forces to the plurality of vehicles to generate about equivalent incremental changes in a plurality of steady-state average drag forces for the plurality of vehicles. The method also includes measuring a plurality of speed changes for the plurality of vehicles. The method also includes calculating, from the plurality of speed changes, a plurality of relative speed performance statistics for relative speed performance between pairs of vehicles, wherein calculating is performed independently of the one or more conditions of the medium.

The one or more embodiments also provide for a system. The system includes at least two vehicles. The vehicles include thrusters for propelling the vehicles through a medium that subjects the vehicles to advection caused by movement of the medium. The vehicles also include communication devices. The system also includes a control system in communication with the vehicles via the communication devices. The control system is programmed to apply an incremental sequence of about equivalent thrust forces to the vehicles to generate about equivalent incremental changes in steady-state average drag forces for the vehicles. The control system is also programmed to receive speed changes for the vehicles. The control system is also programmed to calculate, from the speed changes, relative speed performance statistics for relative speed performance between pairs of vehicles. Calculating is performed independently of the one or more conditions of the medium.

Other aspects of the invention will be apparent from the following description and the appended claims.

FIC. 3C shows a flowchart of a method of assessing vehicle relative speed performance, in accordance with one or more embodiments.

Figure 4:
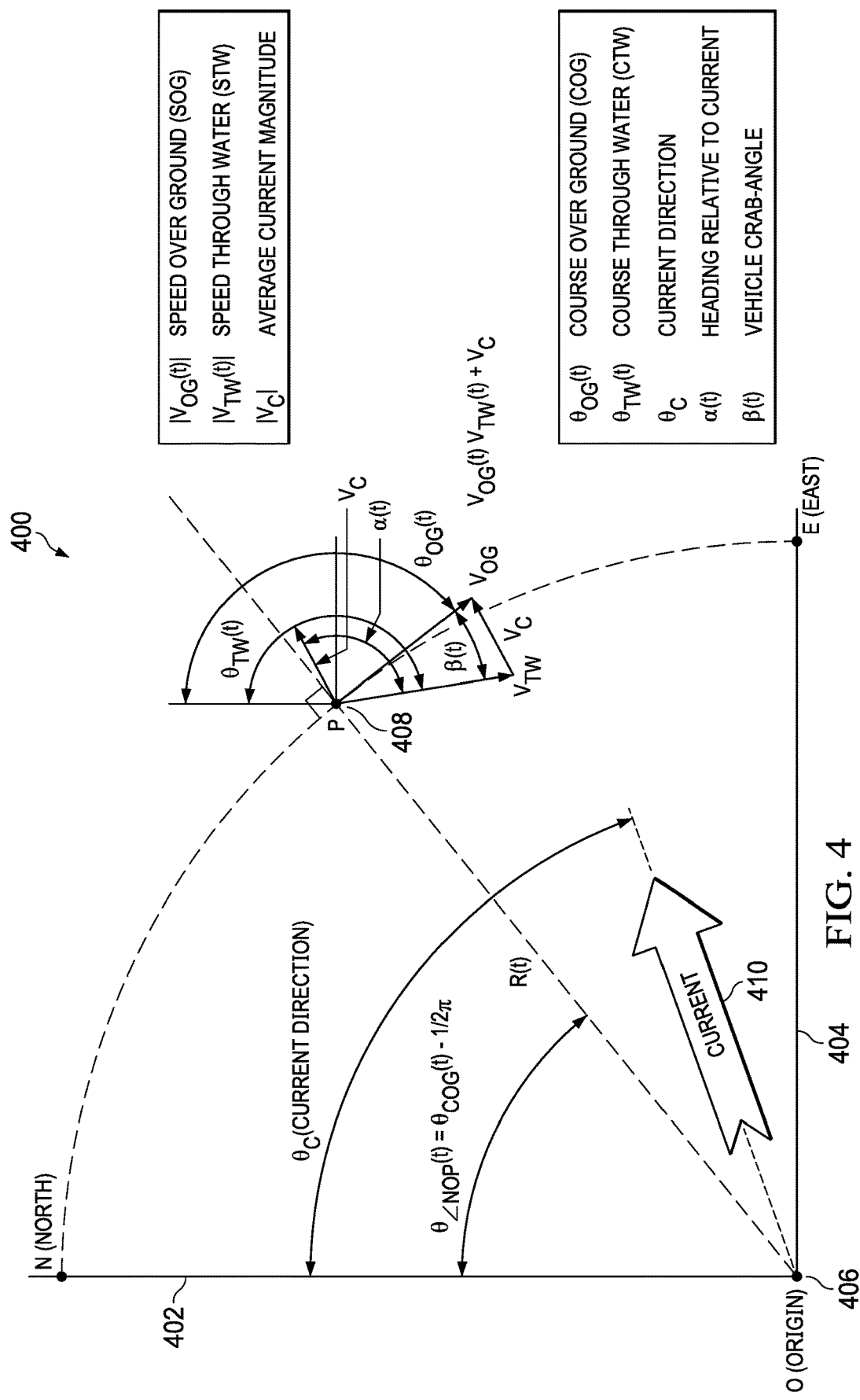

FIG. 4 shows a graph of geometry and nomenclature for a vehicle being propelled in water, in accordance with one or more embodiments;

FIG. 5A shows a graph of vehicle speed-over-ground as a function of course-over-ground, in accordance with one or more embodiments.

FIG. 5B shows a graph of vehicle course-over-ground as a function of time, in accordance with one or more embodiments.

FIG. 5C shows a graph of vehicle speed-over-ground as a function of time, in accordance with one or more embodiments.

FIG. 5D shows a graph of the difference between vehicle course-through-water less vehicle speed-over-ground, as a function of time, in accordance with one or more embodiments.

FIG. 6 shows navigation plots of a water vehicle executing six circuits of a watch-circle navigation course in water, in accordance with one or more embodiments.

Figure 7A:
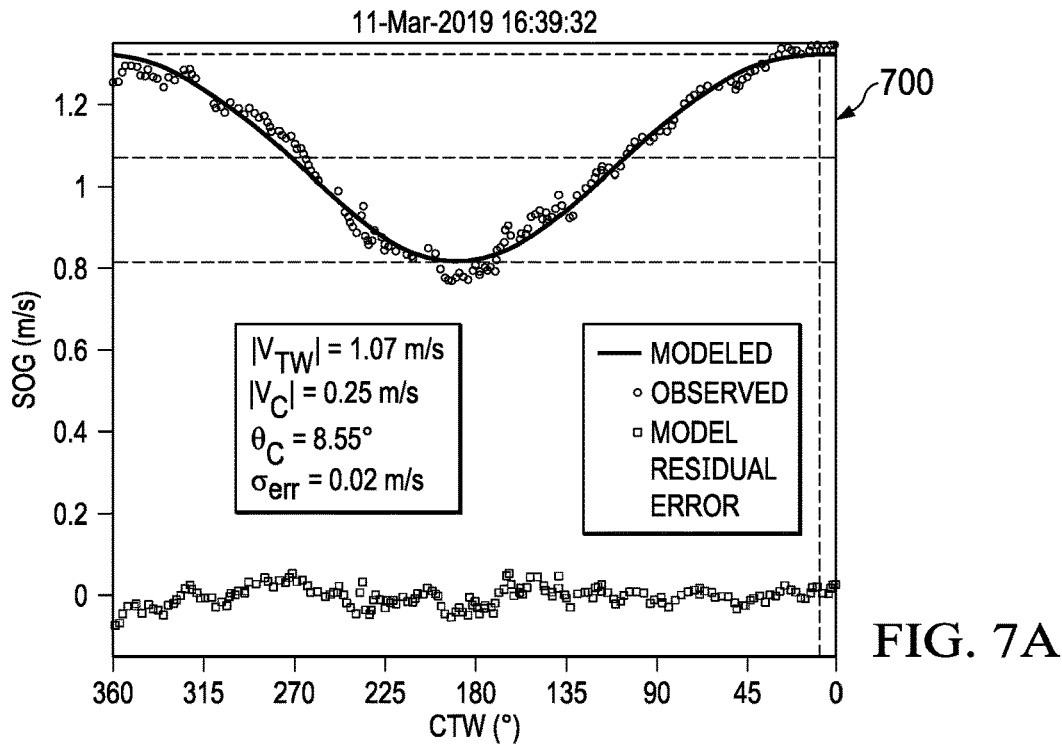

FIG. 7A shows a graph of observed and modeled vehicle speed-over-ground versus course-through-water at a first time, in accordance with one or more embodiments.

Figure 7B:
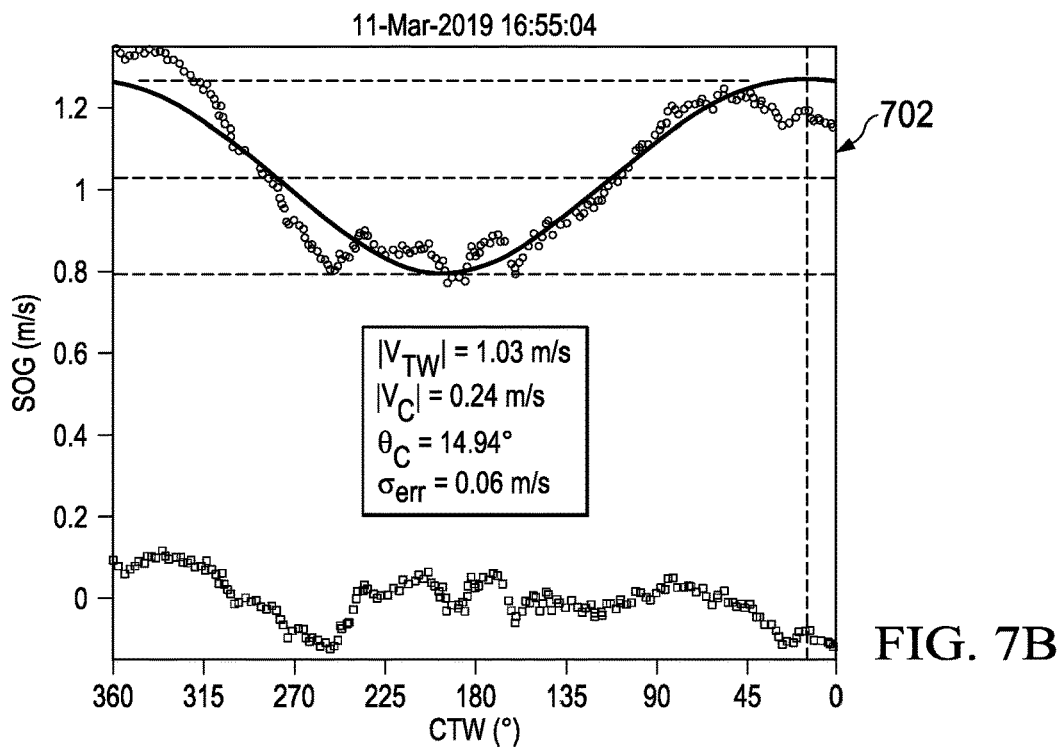

FIG. 7B shows a graph of observed and modeled vehicle speed-over-ground versus course-through-water at a second time, in accordance with one or more embodiments.

Figure 7C:
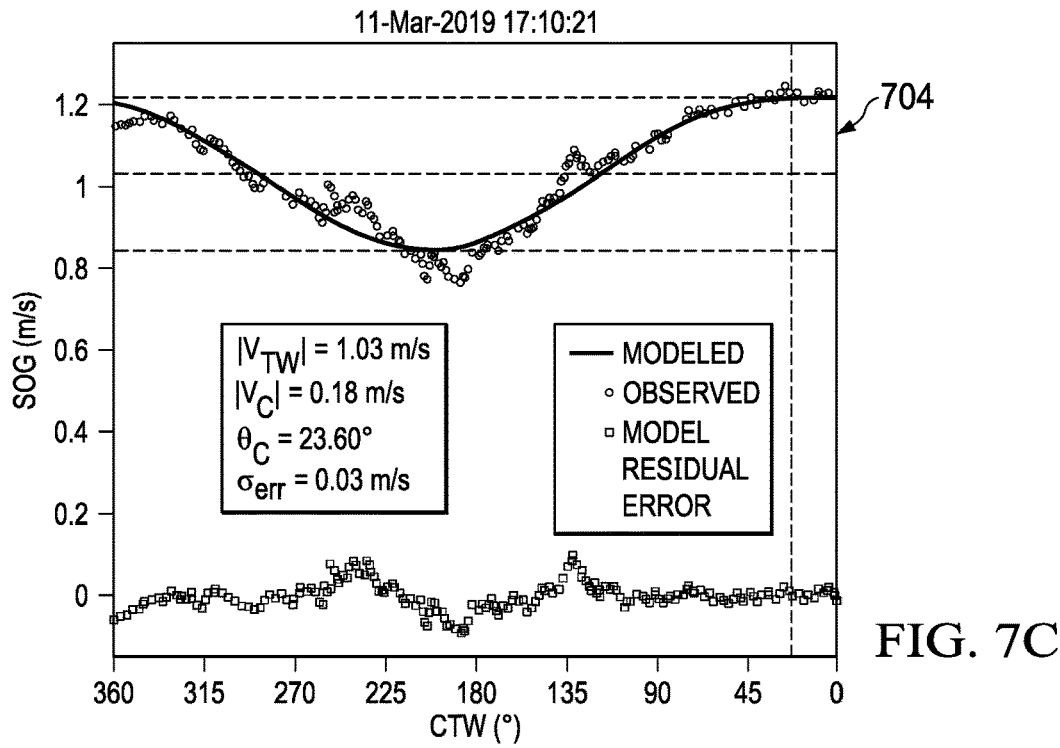

FIG. 7C shows a graph of observed and modeled vehicle speed-over-ground versus course-through-water at a third time, in accordance with one or more embodiments.

Figure 7D:
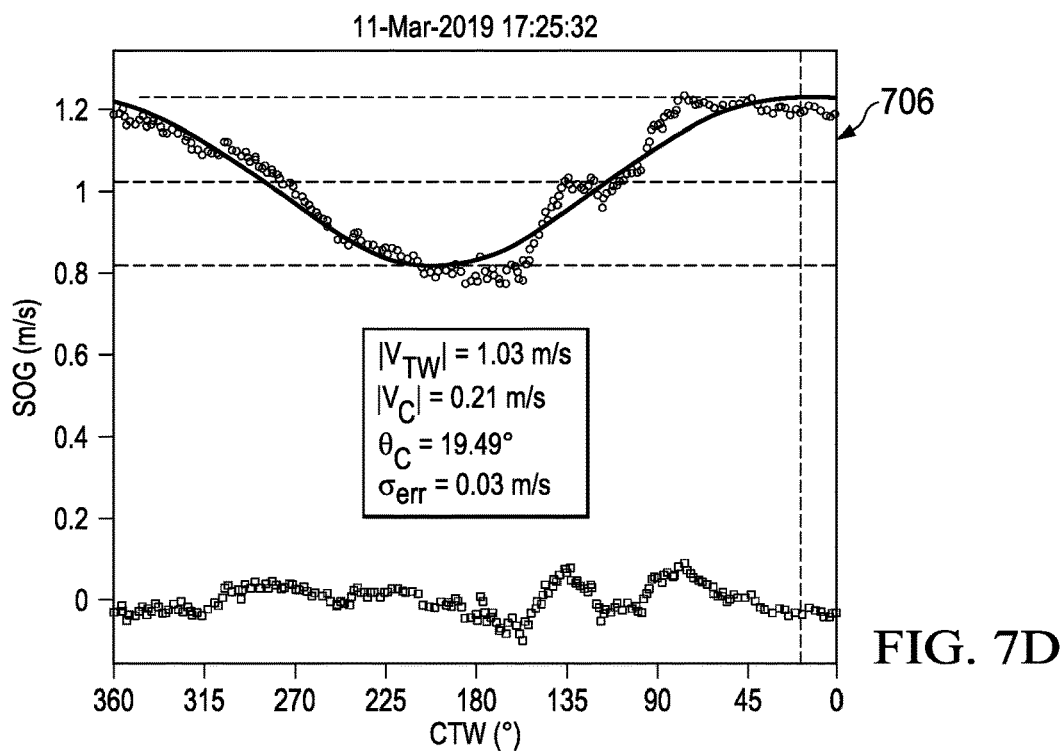

FIG. 7D shows a graph of observed and modeled vehicle speed-over-ground versus course-through-water at a fourth time, in accordance with one or more embodiments.

Figure 7E:
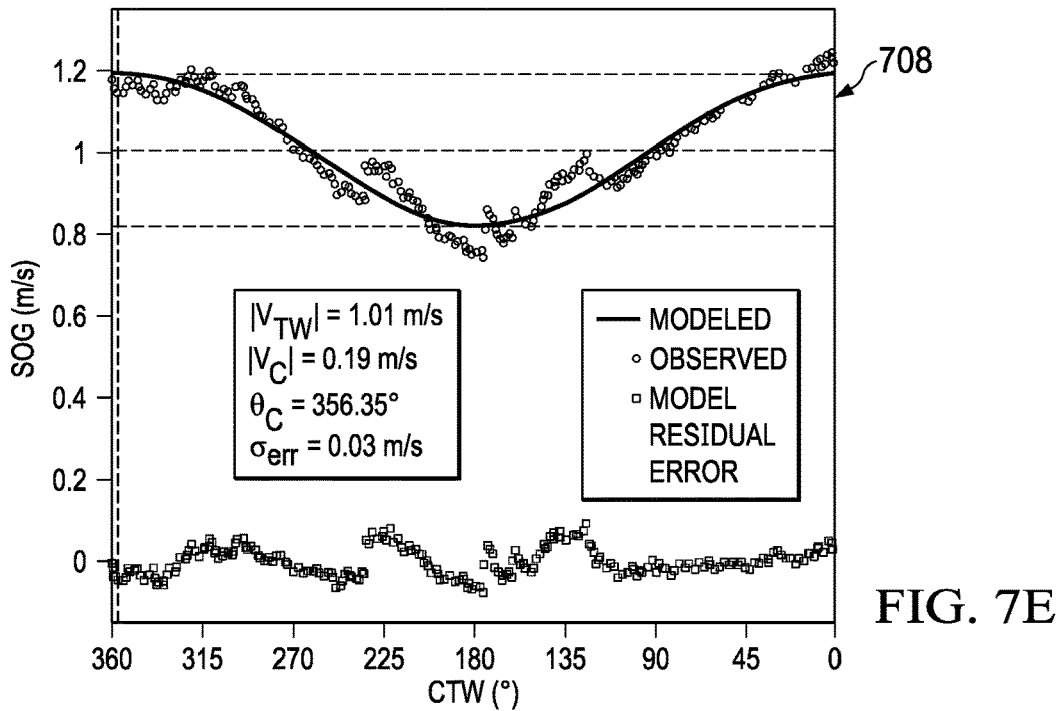

FIG. 7E shows a graph of observed and modeled vehicle speed-over-ground versus course-through-water at a fifth time, in accordance with one or more embodiments.

Figure 7F:
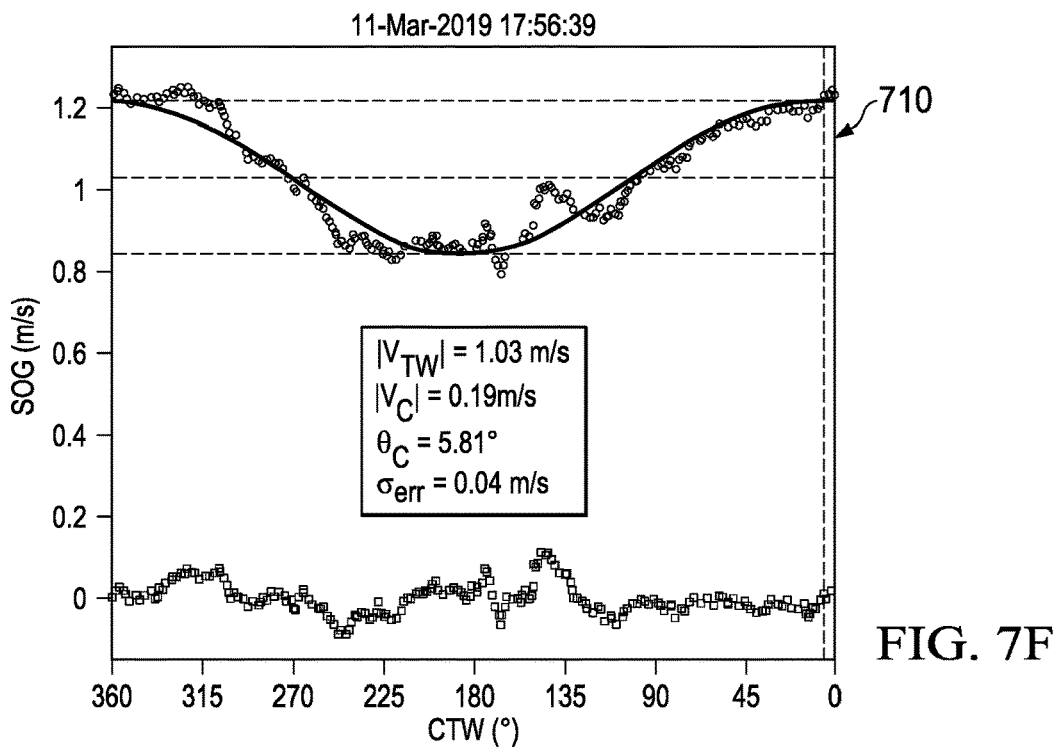

FIG. 7F shows a graph of observed and modeled vehicle speed-over-ground versus course-through-water at a sixth time, in accordance with one or more embodiments.

Figure 8A:
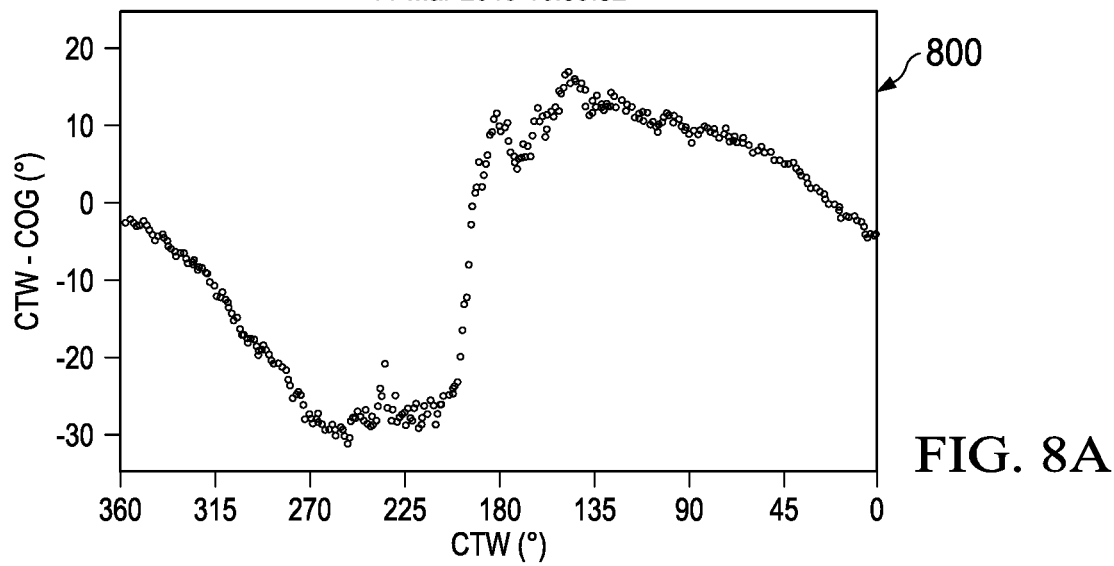

FIG. 8A shows a graph of a difference between course-through-water and course-over-ground, versus course-through-water, at a first time, in accordance with one or more embodiments.

Figure 8B:
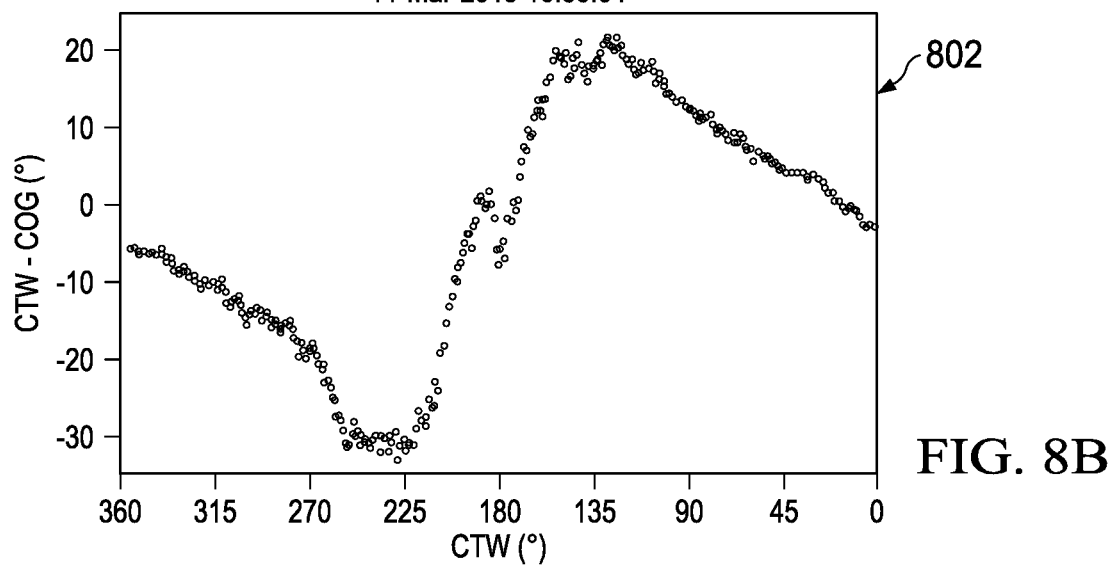

FIG. 8B shows a graph of a difference between course-through-water and course-over-ground, versus course-through-water, at a second time, in accordance with one or more embodiments.

Figure 8C:
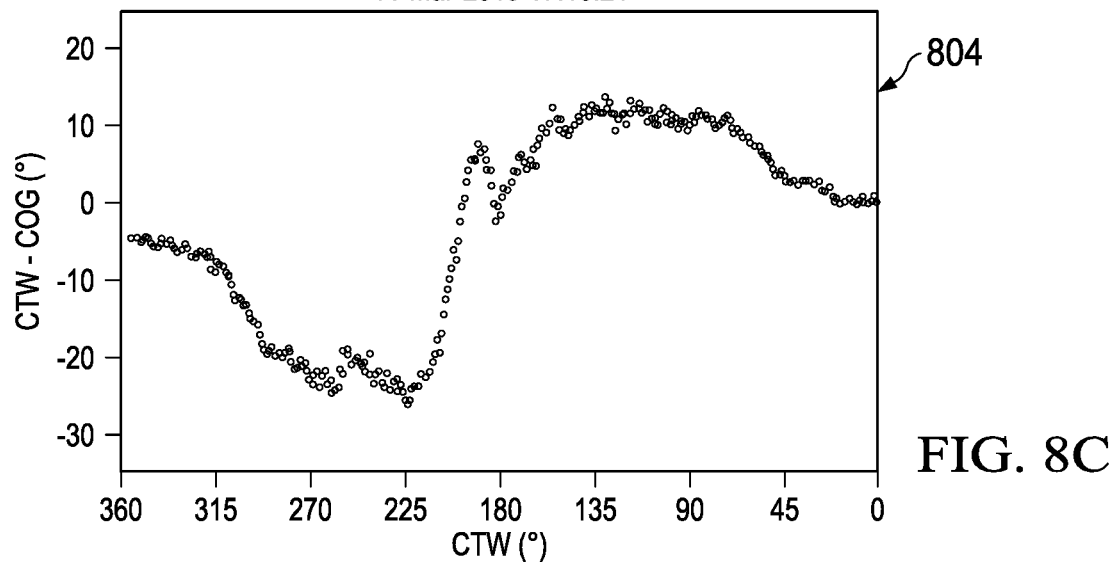

FIG. 8C shows a graph of a difference between course-through-water and course-over-ground, versus course-through-water, at a third time, in accordance with one or more embodiments.

Figure 8D:
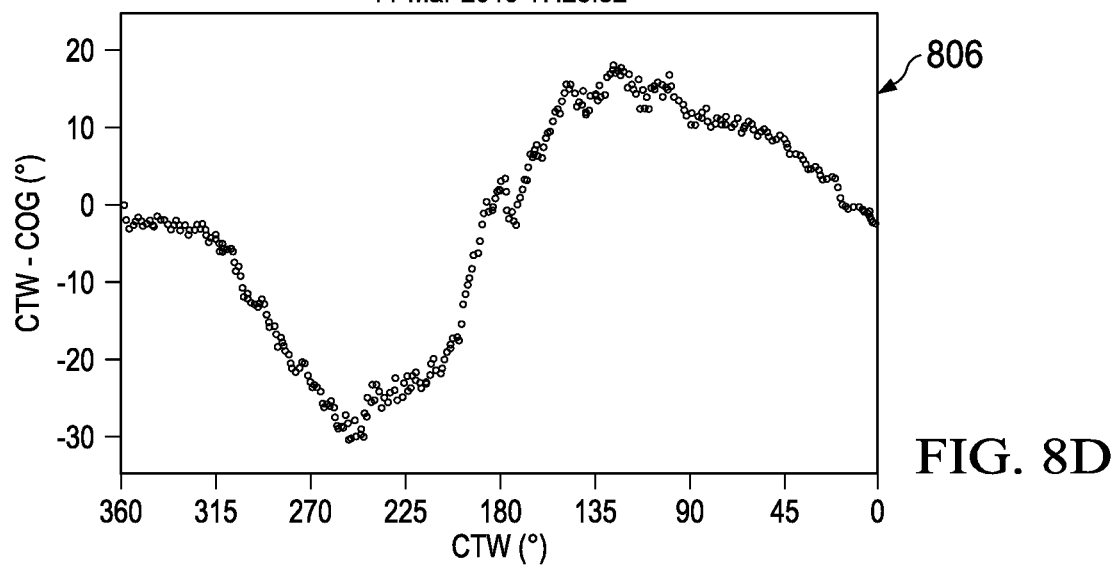

FIG. 8D shows a graph of a difference between course-through-water and course-over-ground, versus course-through-water, at a fourth time, in accordance with one or more embodiments.

Figure 8E:
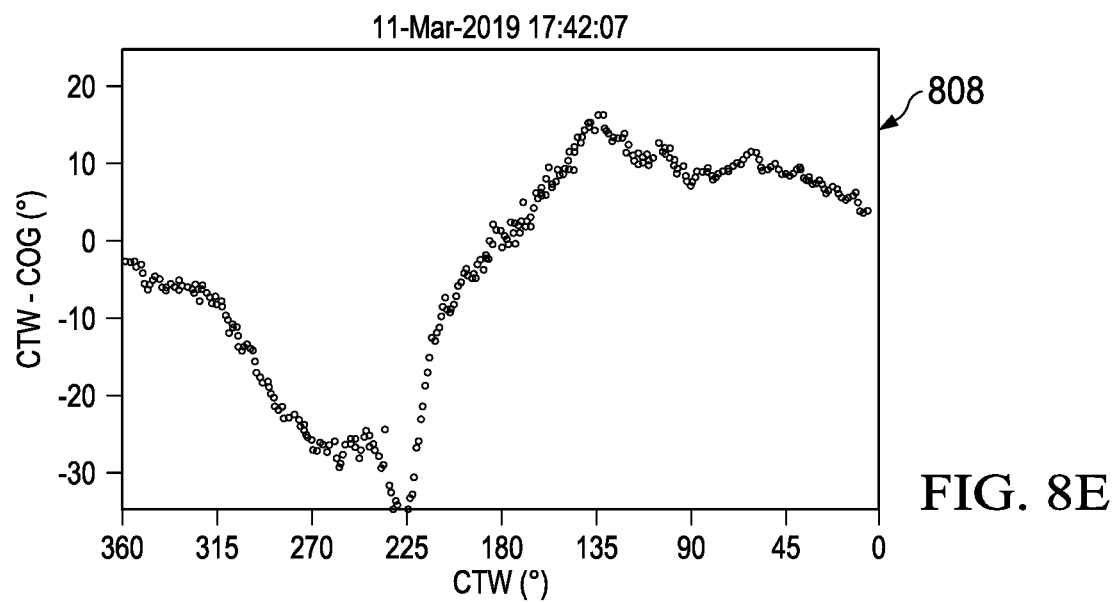

FIG. 8E shows a graph of a difference between course-through-water and course-over-ground, versus course-through-water, at a fifth time, in accordance with one or more embodiments.

Figure 8F:
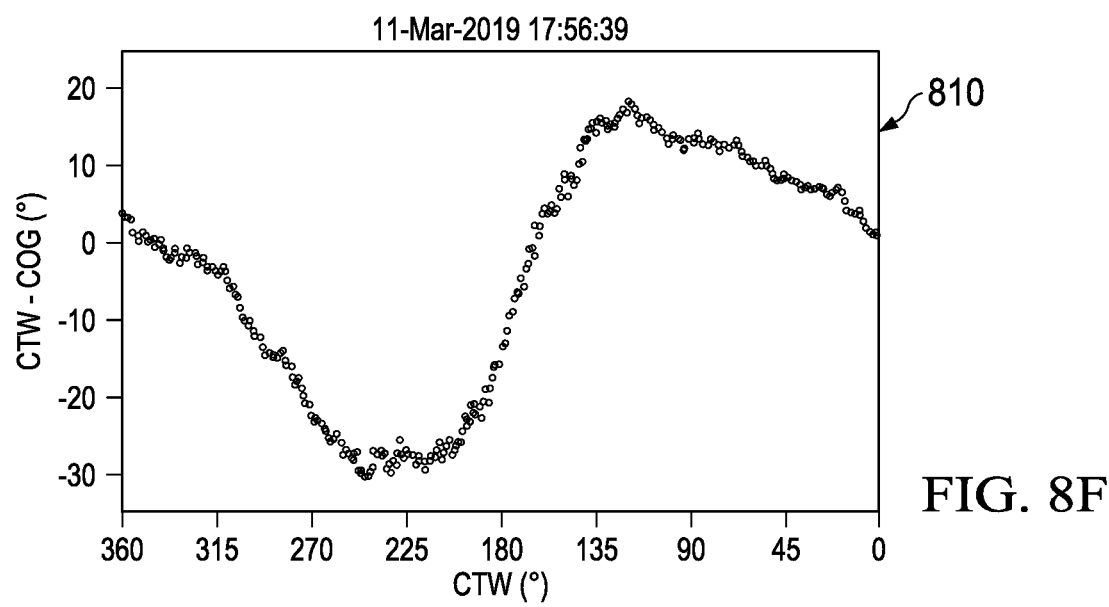

FIG. 8F shows a graph of a difference between course-through-water and course-over-ground, versus course-through-water, at a sixth time, in accordance with one or more embodiments.

FIG. 9A shows a graph of vehicle speed-through-water versus time, in accordance with one or more embodiments.

FIG. 9B shows a graph of current magnitude versus time, in accordance with one or more embodiments.

FIG. 9C shows a graph of water current direction versus time, in accordance with one or more embodiments.

Figure 10A:
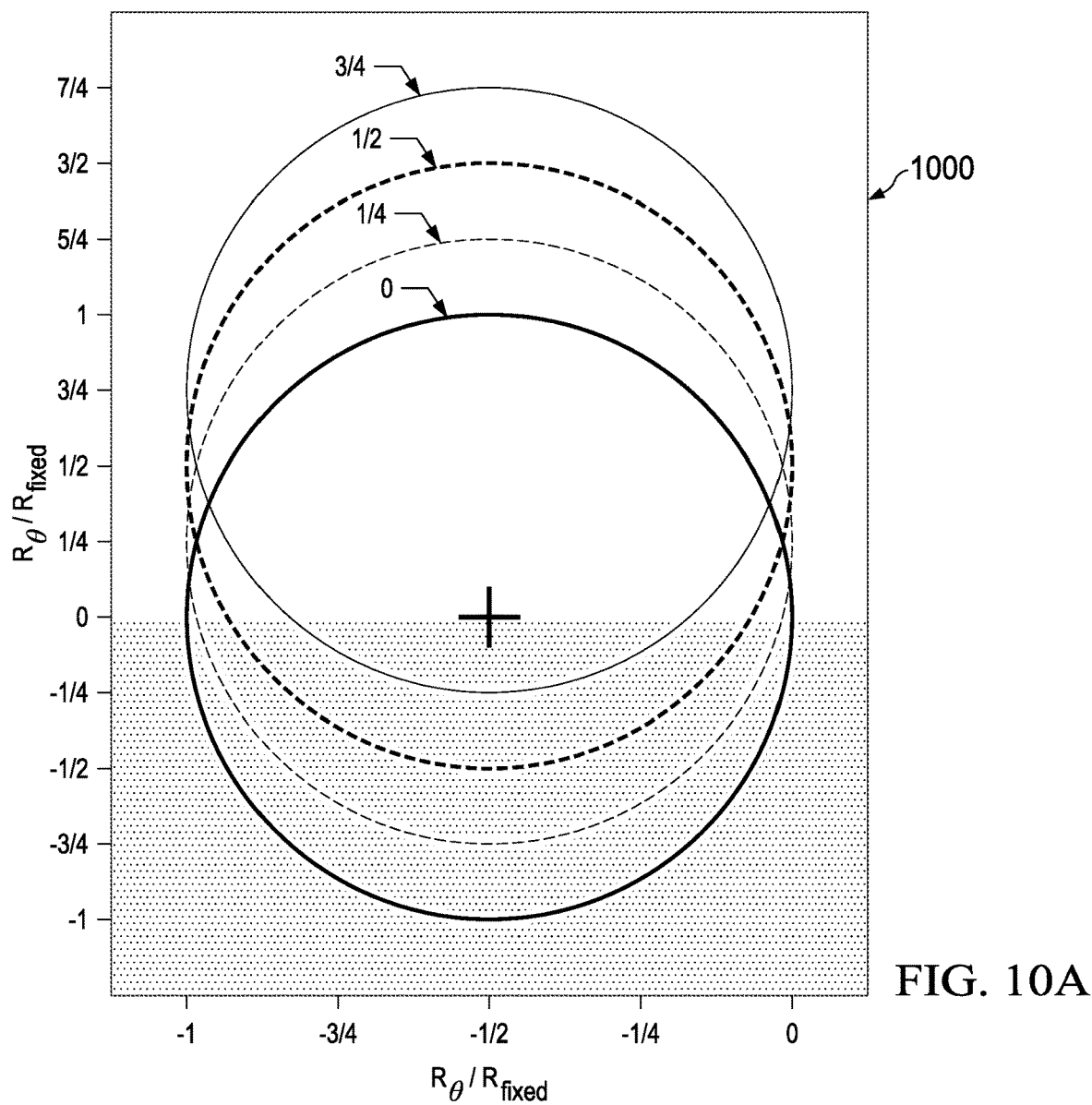

FIG. 10A shows a graph of courses over ground for current-adjusted (variable radius) watch-circle courses with a common phase center and a current at ninety degrees at different current magnitudes relative to vehicle speed-through-water, in accordance with one or more embodiments.

Figure 10B:
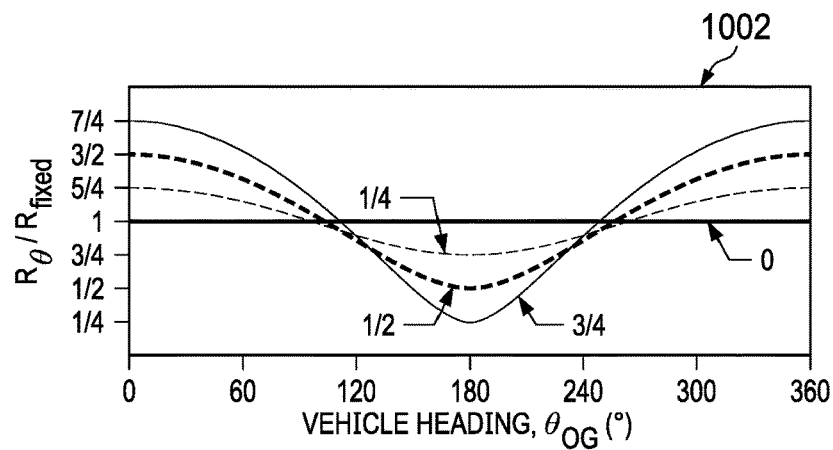

FIG. 10B shows a graph of instantaneous current-adjusted (variable-radius) watch-circle courses with a current at ninety degrees and varying current magnitude to water speed ratios, in accordance with one or more embodiments.

Figure 11A:
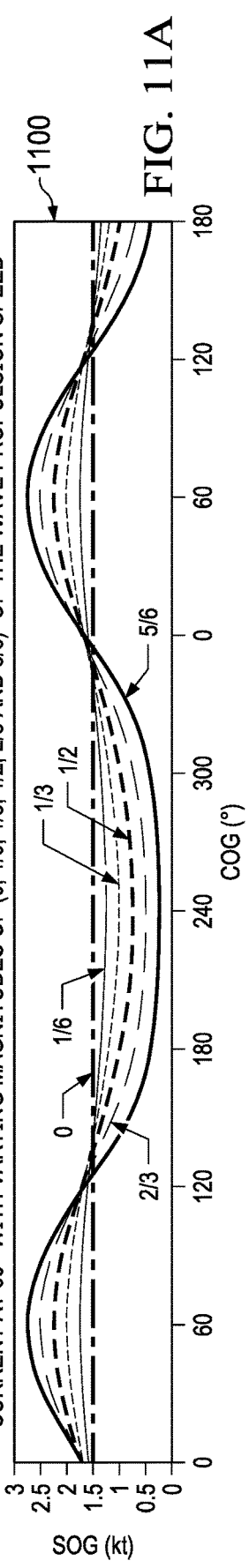

FIG. 11A shows a graph of speed-over-ground versus course-over-ground for a current-adjusted watch-circle with varying water current magnitudes, in accordance with one or more embodiments.

Figure 11B:
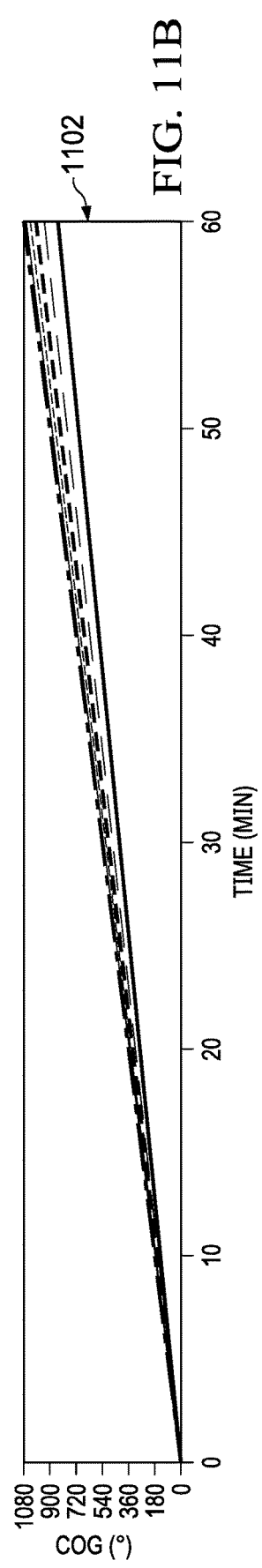

FIG. 11B shows a graph of course-over-ground versus time for a current-adjusted watch-circle with varying water current magnitudes, in accordance with one or more embodiments.

FIG. 11C shows a graph of speed-over-ground versus time for a current-adjusted watch-circle with varying water current magnitudes, in accordance with one or more embodiments.

FIG. 11D shows a graph of a difference between a course-through-water and a course-over-ground, versus time, for a current-adjusted watch-circle with varying water current magnitudes, in accordance with one or more embodiments.

FIG. 12A shows a graph of average speed-over-ground divided by speed-through-water, relative to current magnitude over vehicle speed-through-water, in accordance with one or more embodiments.

FIG. 12B shows a graph of full-circuit completion periods for fixed and current-adjusted watch-circle navigation, versus the current magnitude to vehicle water speed ratio, in accordance with one or more embodiments.

FIG. 12C shows a graph of the ratio of full-circuit completion periods versus current magnitude over vehicle speed through the water, in accordance with one or more embodiments.

Figure 13A:
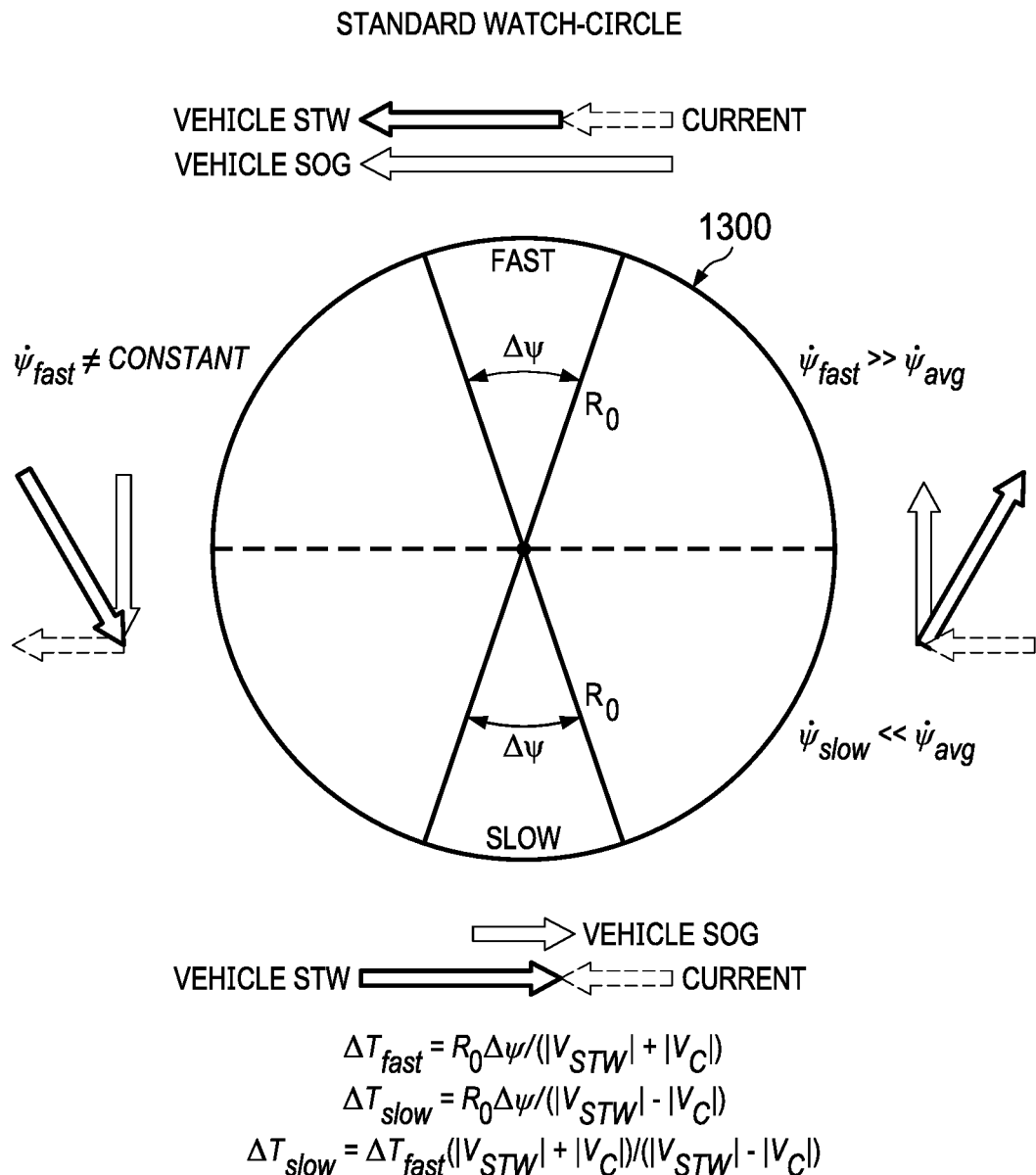

FIG. 13A shows an example of a standard watch-circle navigation course, in accordance with one or more embodiments.

Figure 13B:
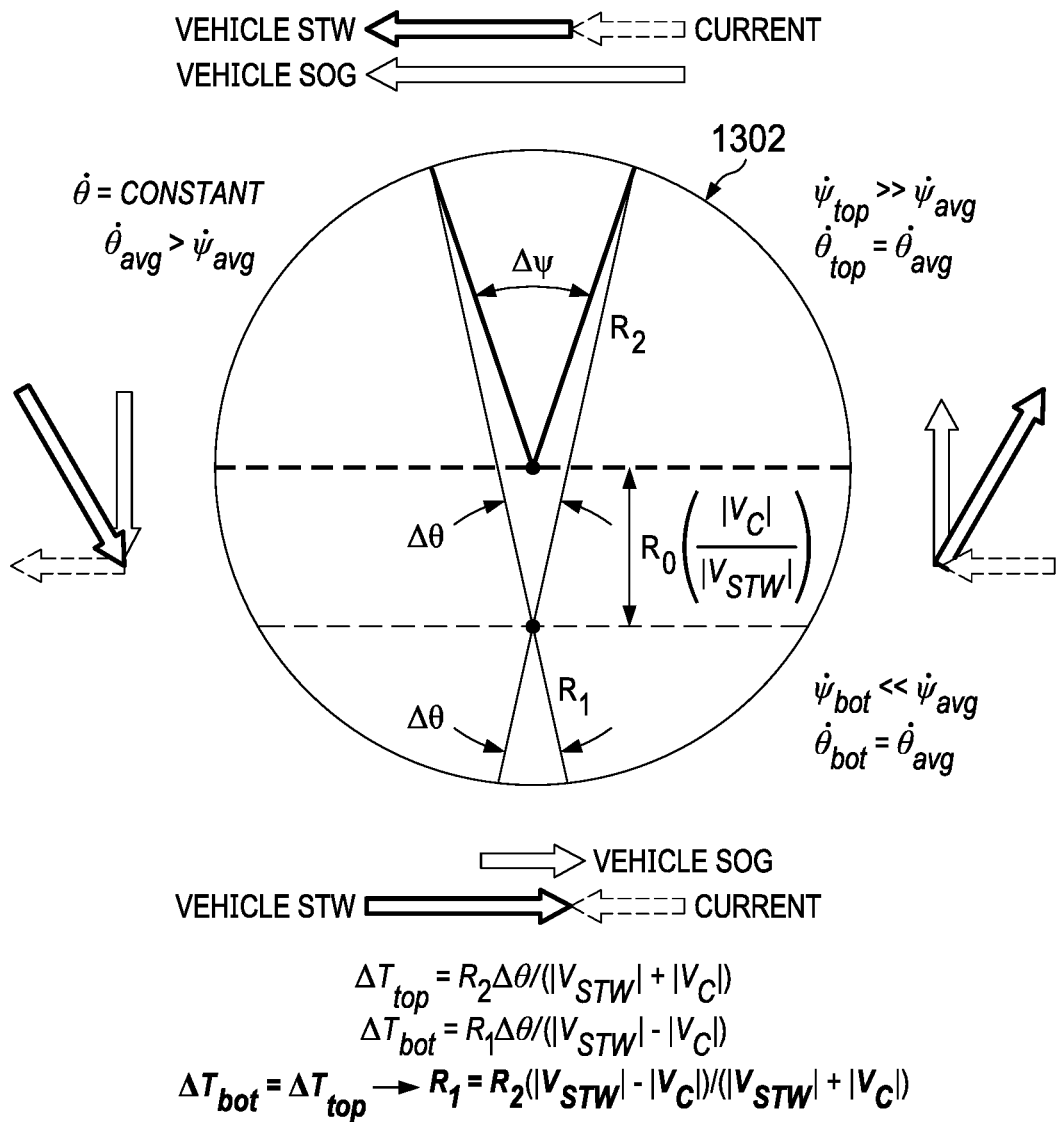

FIG. 13B shows an example of a current-adjusted (variable radius) watch-circle navigation course, in accordance with one or more embodiments.

Figure 14A:
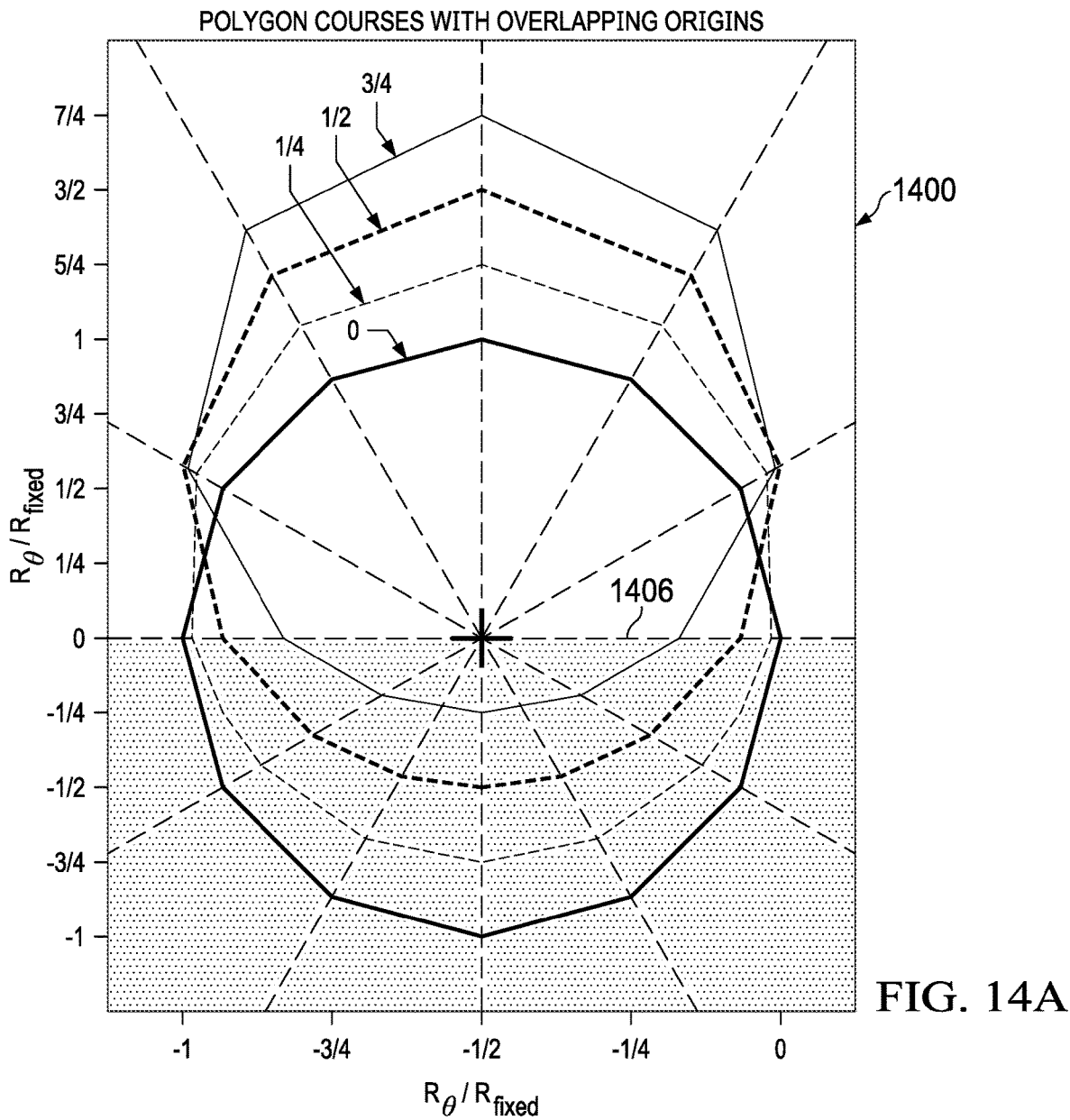

FIG. 14A shows a graph of watch-polygon courses with overlapping origins (phase centers) with a current at ninety degrees at different current magnitudes relative to vehicle speed-through-water, in accordance with one or more embodiments.

Figure 14B:
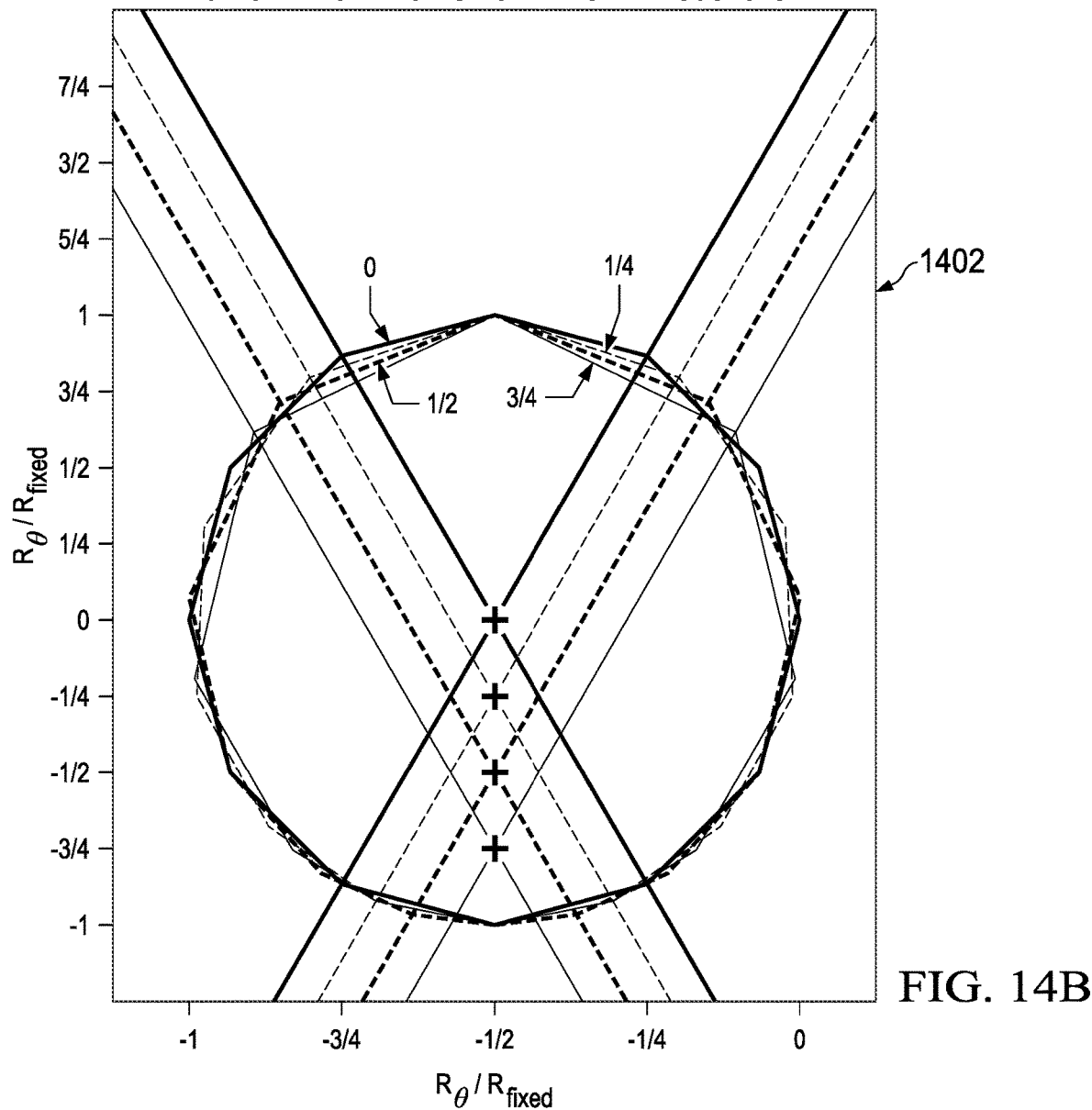

FIG. 14B shows a graph of offsetting of the origins (phase centers) to realign the course geometries over ground, in accordance with one or more embodiments.

Figure 14C:
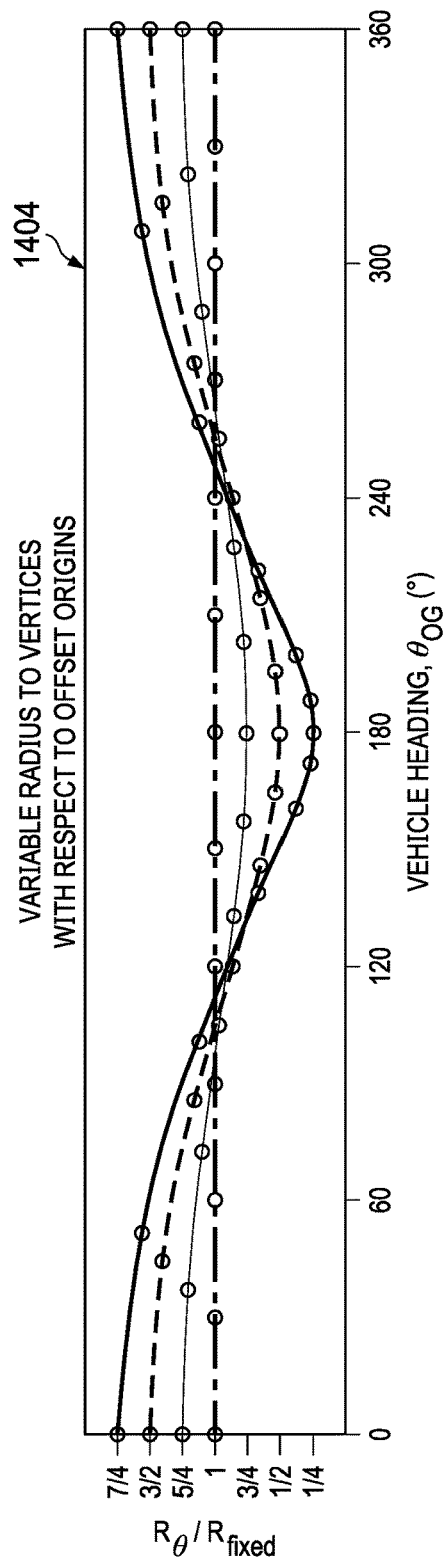

FIG. 14C shows a graph of the variable-radii to vertices of watch-polygon courses with a current at ninety degrees versus vehicle heading over ground, in accordance with one or more embodiments.

Figure 15A:
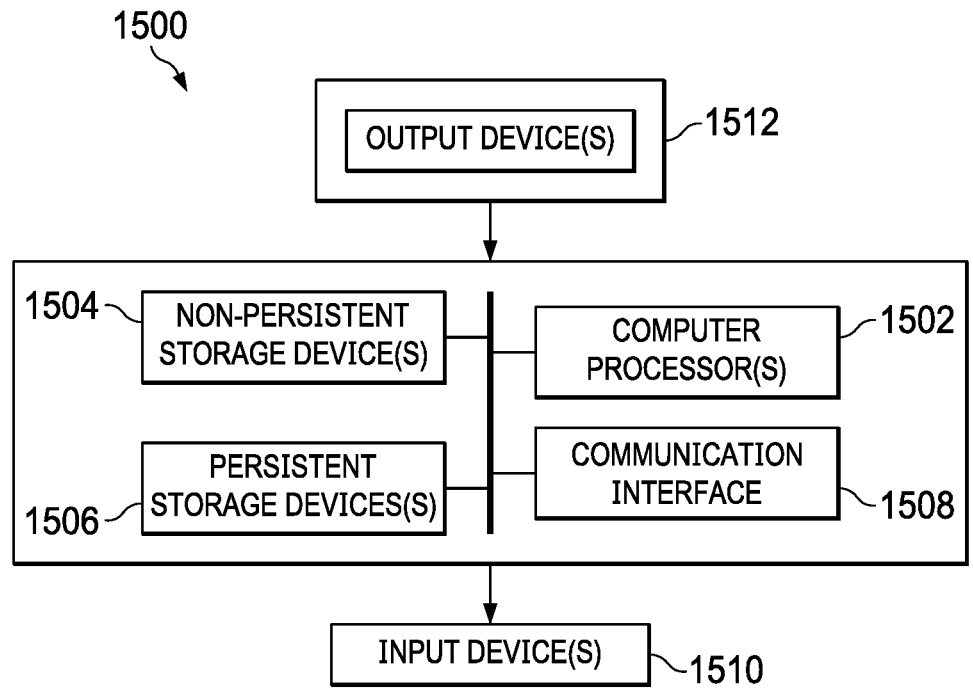

FIG. 15A shows a computing system, in accordance with one or more embodiments of the invention.

Figure 15B:
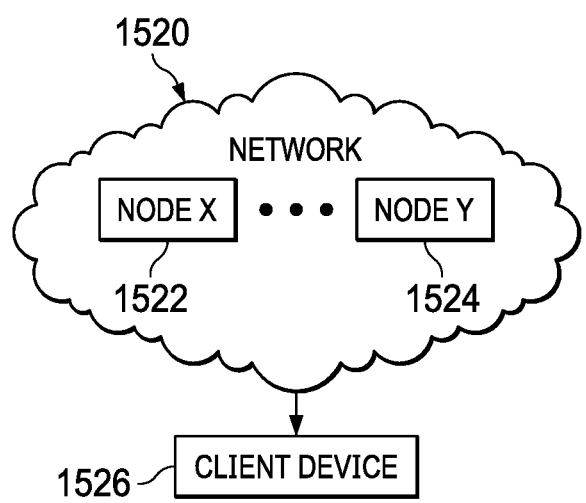

FIG. 15B shows a computing network, in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

In general, embodiments of the invention relate to improved techniques for measuring, testing, and comparing the performance of vehicles that are subject to advection in a medium. "Advection," as defined herein, is the movement of the vehicle caused by independent movement of the medium in or through which the vehicle is moving. For example, a kayak may be subject to advection in the presence of a current in a river. A sea-born watercraft may be subject to advection caused by waves or currents in the sea. An aerospace vehicle, such as a balloon or slow-moving drone, may be subject to advection caused by air currents.

As used herein, a vehicle is "subject to advection" in the medium in or through which the vehicle moves when the speed of the medium is "substantial" relative to the speed of the vehicle itself. The term "substantial" in this context is defined quantifiably, below, with respect to FIG. 2.

In general, a propulsion performance tests may be conducted on vehicles subject to advection. The results of the tests may be used to change the design parameters of the vehicle, such as vehicle shape, size, orientation, propulsion type, propulsion mechanism parameters, etc. Thus, testing may be considered a desirable part of the development and production of vehicles subject to advection. Additionally, testing may be considered a desirable part of the on-going performance assessment of a deployed vehicle as a means to detect deviation from expected performance. Deviation of expected performance can be indicative of a fault condition, an external influence, the need for maintenance, or an undesirable operational parameter that should be addressed.

In a specific example, a particular water vehicle subject to advection may have a propulsion mechanism which draws energy from the waves of the ocean through which the water vehicle moves. While the water vehicle has an effectively unlimited supply of energy for propulsion, such water vehicles tend to be slow, meaning that such water vehicles are subject to the advection caused by the waves and/or currents in the ocean. It is desirable to test different designs of such watercraft to maximize their propulsion performance.

Current speed testing methodology requires long vehicle deployments (e.g., days), particular for assessing relative performance between vehicles. Such testing requires direct expenses (e.g., crew, testing personnel, fuel for a mother craft, etc.) and indirect expenses (e.g., time to design completion, etc.) Additionally, labor-intensive post-processing of the data collected during tests may further drive up direct and indirect costs. Furthermore, if multiple pilots or watercraft operators are used during testing, then human errors may occur (e.g., differing configurations, missing data, inconsistent piloting, etc.). As a result, not only is an undesirable amount of time used to perform testing and analysis, but the estimates of vehicle speeds through the water and the current magnitude and direction may be subject to unacceptable error margins.

The one or more embodiments provide for several techniques for producing more accurate vehicle testing that may be performed more quickly than conventional testing techniques. The one or more embodiments described herein are well-suited to real-time processing (i.e., processing concurrently with data receipt), as no data windowing is required because the vehicles do not slow due to sharp turns. Furthermore, the one or more embodiments enable continuous monitoring of speed performance of the vehicles versus the state of the medium. The one or more embodiments also allow assessment of the relative speed performance between multiple vehicles in a substantially reduced time, relative to prior techniques (e.g., several hours of testing rather than several days of testing). Thus, the one or more embodiments may avoid or at least mitigate variations in the state of the medium over the course of testing, thereby further reducing errors or uncertainty in determining vehicle performance metrics.

The one or more embodiments described herein affect three main aspects of testing: Improving the speed of performing a test course (see FIG. 3A), improving the estimation of vehicle speed through the medium and advection velocity without directly measuring such quantities (see FIG. 3B), and improving the estimation of relative performance among multiple vehicles around similar test courses (see FIG. 3C). Improving the speed of performing a test course decreases the time used for testing. Improving the estimation of vehicle speed through the medium and advection velocities without using direct sensors reduces the direct costs of testing by eliminating the need for costly sensors. Improving the estimation of relative performance also reduces the time to perform tests and the costs of performing the tests.

Figure 1A:
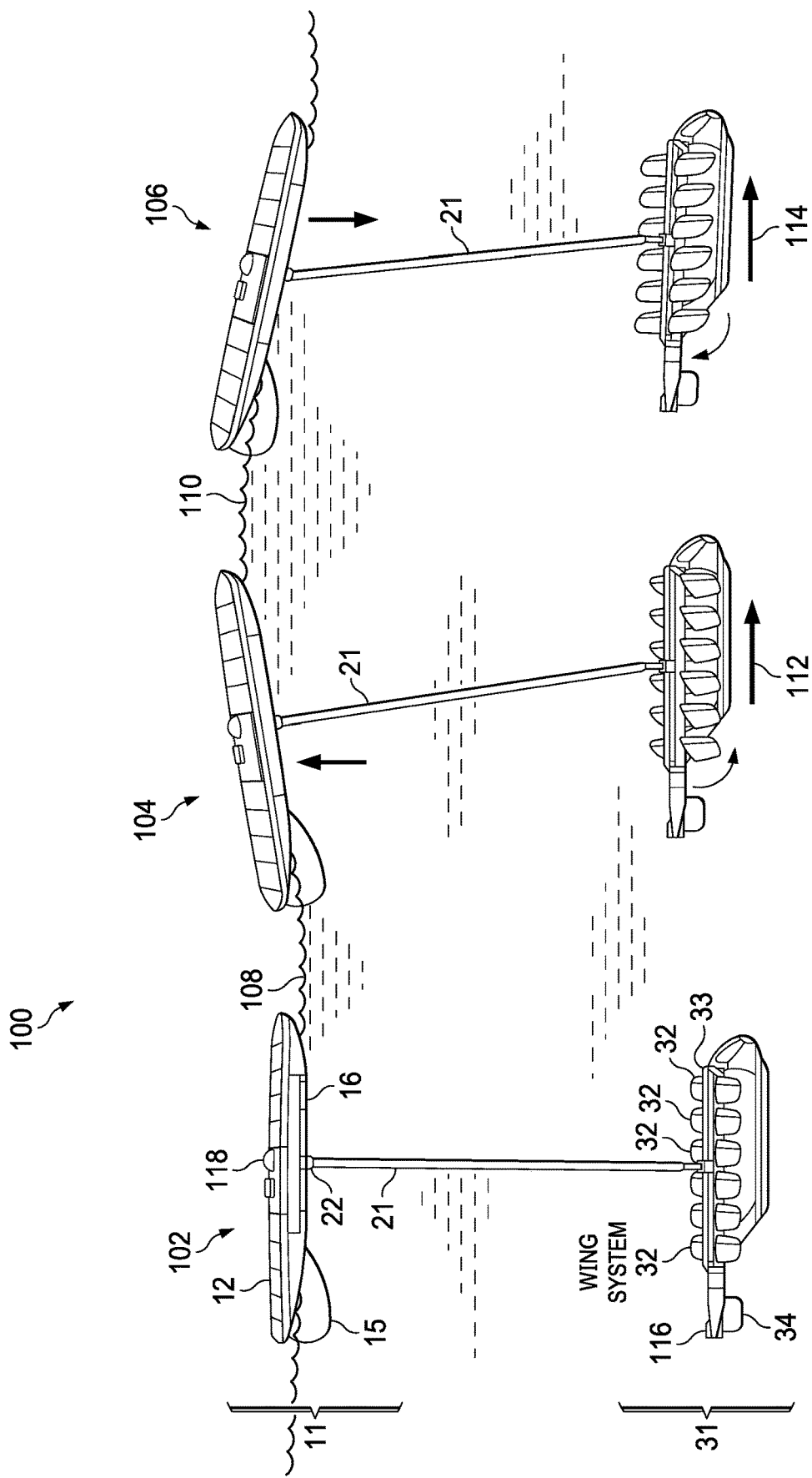
FIG. 1A shows a water vehicle, in accordance with one or more embodiments.
Figure 1B:
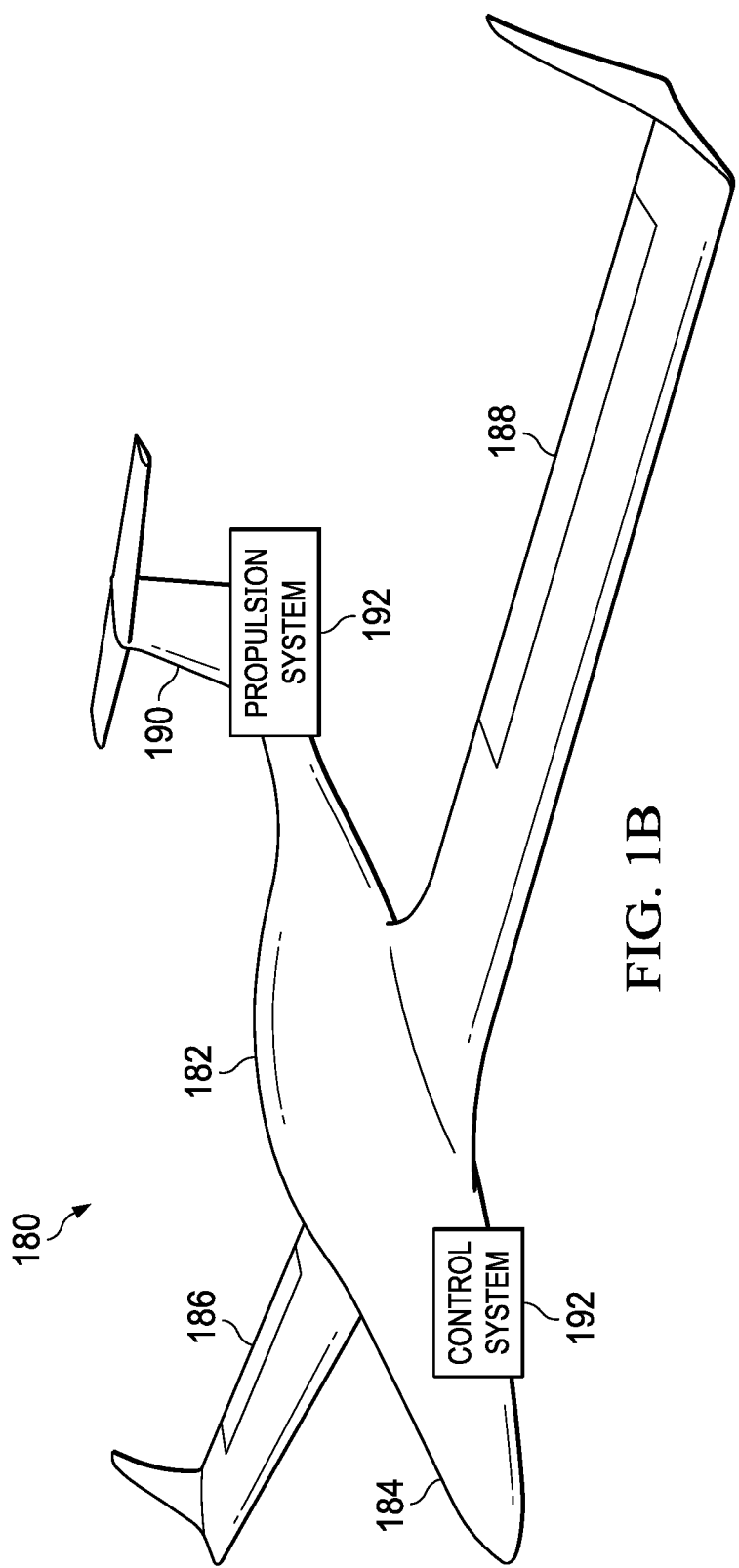
FIG. 1B shows an aerospace vehicle, in accordance with one or more embodiments.
Figure 2:
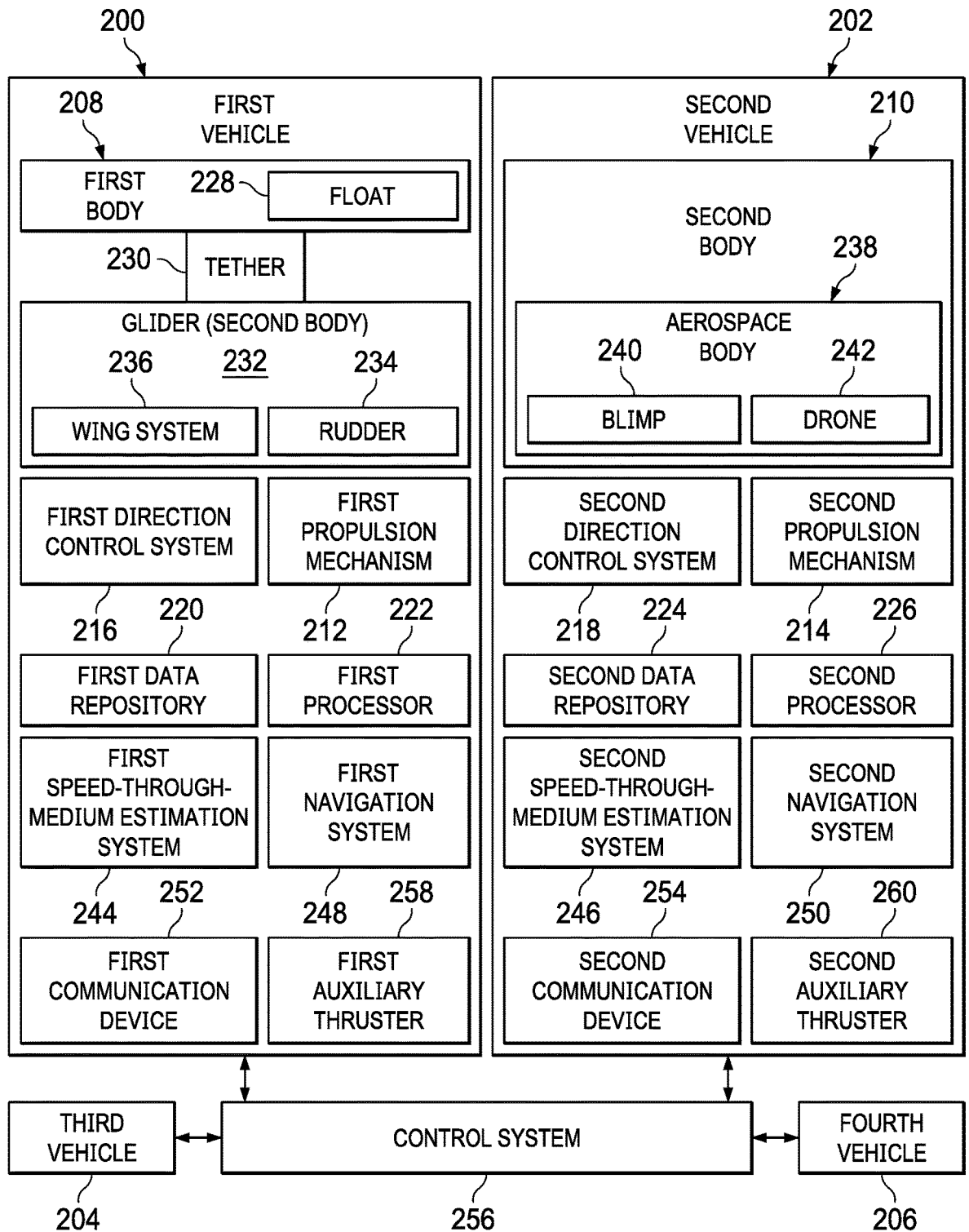
FIG. 2 shows a block diagram of vehicles, in accordance with one or more embodiments.

The one or more embodiments also provide for a description of vehicle embodiments useful for accomplishing these techniques, such as in FIG. 1A, FIG. 1B, and FIG. 2. The one or more embodiments provide for test platforms expressed as both aerospace vehicles and water vehicles.

The one or more embodiments also provide, in FIG. 4 through FIG. 14C, the specific technical details for accomplishing the recited methods (FIG. 3A through FIG. 3C), as well as the programming of vehicles to perform the recited methods (FIG. 2). The examples of FIG. 4 through FIG. 14C are presented in the context of the water vehicle shown in FIG. 1A. However, the specific example of the water vehicle in FIG. 1A may be generalized to other types of water vehicles, as well as to aerospace vehicles.

The one or more embodiments may be performed in conjunction with programming improvements in computers in order to produce improved vehicles. For example, FIG. 15A and FIG. 15B provide an example of a computer and a network environment in which the one or more embodiments may be implemented.

Attention is now turned to the details of the figures. FIG. 1A and FIG. 1B, below, provide examples of the types of vehicles for which testing may be desirable.

FIG. 1A shows a water vehicle, in accordance with one or more embodiments. The water vehicle (100) may be the subject of testing, as described with respect to FIG. 3A through FIG. 3C. The water vehicle (100) is shown in three different stages of operation, including stage 1 (102), stage 2 (104), and stage 3 (106).

The water vehicle (100) includes a float (11), which may be characterized as a vessel body, resting on a surface (108) of water. A glider (31) hangs below the float (11), suspended by one or more tethers (21). (The glider (31) may be characterized as a swimmer.) The glider (31) may also be characterized as a glider. The float (11) includes a displacement hull (16) and a fixed keel fin (15). The glider (31) includes a rudder (34) for steering and a wing system (32) connected to a central beam of the rack (33) so as to permit rotation of the wing system (32) around a transverse axis within a constrained range, and provide propulsion. The wing system (32) may be characterized as a fin system, composed of fins or wings. The wing system (32) may also be characterized as a propulsion system, propeller system, thrust system, etc.

The one or more tethers (21) may be attached at either end by way of a winch (22). The winch (22) may be used to retract the glider (31) up to the float (11) for purposes of storage or navigational adjustment. The winch (22) may also be used to deploy the glider (31) downwardly for operation.

Propulsion of the water vehicle (100) through the water is now described. In still water, at stage 1 (102), the submerged glider (31) hangs level by way of the one or more tethers (21) directly below the float (11). As a wave (110) lifts the float (11), at stage 2 (104), an upwardly directed force is applied to the one or more tethers (21). The upwardly directed force pulls the glider (31) upwardly through the water. Pulling the glider (31) upwardly through the water causers the wing system (32) of the glider (31) to rotate about a transverse axis where the wing system (32) is connected to the rack (33). Thus, the wing system (32) rotates into a sloping position, as shown at stage 2 (104). As the water is forced downwardly through the glider (31), the rotation of the wing system (32) generates forward thrust, as indicated by arrow (112), and the glider (31) thereby propels the float (11) forward through the water. After the wave (110) crests, at stage (106), the float (11) descends into a trough in the water. The glider (31) (or glider) also sinks downwardly through the water, since the glider (31) is heavier than water. Thus, tension is dept on the one or more tethers (21) (though the one or more tethers (21) may be rigid or semi rigid). The wing system (32) then rotates again about the transverse axis the other way, assuming an upwards sloping position, as shown at stage 3 (106). As the water is forced upwardly through the glider (31), the wing system (32) generates renewed forward thrust, as indicated by arrow (114). The renewed forward thrust again propels the glider (31) and the float (11) forward through the water. Thus, the glider (31) generates forward thrust through the water when both ascending and descending along the wave (110), resulting in forward motion of the entire water vehicle (100).

The water vehicle (100) may include additional components. For example, the water vehicle may include an auxiliary thruster (116) secured to the rear of the glider (31). The auxiliary thruster (116) may apply additional propulsion thrust to the water vehicle (100) via a force applied to the glider (31), when desirable. The auxiliary thruster (116) may take many different forms including, but not limited to, a propeller, a water jet, etc.

In addition, a control system (118) may be connected to the float (11). The control system (118) is electronics, software, or a combination thereof. The control system (118) may be used to perform the various testing techniques described with respect to FIG. 3A through FIG. 3C. An example of a control system (118) may be one or more of the first direction control system (216), the first data repository (220), the first processor (222), the first speed-through-medium estimation system (244), the first navigation system (248), and/or the first communication device (252) of the first vehicle (200) shown in FIG. 2.

FIG. 1B shows an aerospace vehicle, in accordance with one or more embodiments. The aerospace vehicle (180) may be the subject of testing, as described with respect to FIG. 3A through FIG. 3C.

The aerospace body (182) may be that of an aerospace vehicle, such as but not limited to a blimp, an unmanned drone, etc. However, as an example, the aerospace body (182) shown in FIG. 4 is an airplane including a fuselage (184), a first wing (186), and a second wing (188) and a tail (190), and a propulsion and control system (192).

In addition, a propulsion and control system (192) may be connected to the aerospace body (182). The propulsion and control system (192) may be used to perform the various testing techniques described with respect to FIG. 3A through FIG. 3C.

FIG. 2 shows a block diagram of vehicles, in accordance with one or more embodiments. Any of the first vehicle (200), the second vehicle (202), the third vehicle (204), and the fourth vehicle (206) may be either the water vehicle (100) shown in FIG. 1A or the aerospace vehicle (180) shown in FIG. 1B. In some embodiments, the functional relationship between components in the vehicles shown in FIG. 2 may apply to either water vehicles or aerospace vehicles. In other embodiments, components may apply only to a certain type of vehicle.

Thus, the first vehicle (200) and the second vehicle (202) could be of a same type (e.g. both are water vehicles), assuming the appropriate body (for water or air) were provided. However, for clarity and for purposes of the example of FIG. 2, the first vehicle (200) is a water vehicle (e.g., the water vehicle (100) of FIG. 1A) and the second vehicle (202) is an aerospace vehicle (e.g., the aerospace vehicle (180) of FIG. 1B). The third vehicle (204) and the fourth vehicle (206) may be either type of vehicle.

For additional clarity, the example of FIG. 2 assumes that the third vehicle (204) is of the same type as the first vehicle (200). The example of FIG. 2 also assumes that the fourth vehicle (206) is of the same type as the second vehicle (202). Thus, for the purposes of the example of FIG. 2, it is assumed that the first vehicle (200) and the third vehicle (204) are water vehicles, but that the second vehicle (202) and the fourth vehicle (206) are aerospace vehicles. In an embodiment, all four of the first vehicle (200), the second vehicle (202), the third vehicle (204), and the fourth vehicle (206) are of a same type (e.g., water vehicles) for comparative testing purposes, such as described with respect to FIG. 3C.

Attention is now turned to definitions. As used herein, a "water vehicle" is any vehicle which operates on or under the surface of water, but which is subject to advection caused by motion of the water. As used herein, an "aerospace vehicle" is any vehicle which operates in air, but which is subject to advection caused by motion of the air. In the general case, water and air are both types of media through or in which vehicles may operate. Thus, most generally, the one or more embodiments apply to vehicles that are subject to advection caused by motion of the medium in or through which the vehicles move.

Again, "advection," as defined herein, is the movement of the vehicle caused by independent movement of the medium in or through which the vehicle is moving. For example, a kayak may be subject to advection in the presence of a current in a river. A sea-born watercraft may be subject to advection caused by waves or currents in the sea. An aerospace vehicle, such as a slow-moving drone, may be subject to advection caused by air currents.

As used herein, a vehicle is "subject to advection" in the medium in or through which the vehicle moves when the speed of the medium is "substantial" relative to the speed of the vehicle itself. The term "substantial" is defined as being within a predetermined amount that is considered "significant" by an ordinary artisan. Thus, for example, a vehicle is subject to advection when the speed of the vehicle is within a predetermined speed of the medium through or in which the vehicle moves, such that the motion caused by advection is "significant" relative to the motion caused by propulsion. A vehicle is also subject to advection when the movement of the medium forces a course alteration by the vehicle. In a highly specific example, a watercraft is subject to substantial advection when the speed of the watercraft is no more than twice the speed of the medium through or in which the vehicle moves. However, the exact number chosen for the "predetermined amount" may vary in different contexts, may be expressed differently (i.e. expressed as a ratio of medium speed divided by vehicle speed), and otherwise may change in different contexts (e.g., course change comparisons versus speed change comparisons). Nevertheless the "predetermined amount," and thus the term "substantial," in the context of the one or more embodiments, is quantifiably determinable based on empirically measured data or derived data, as defined above. The process of measuring or deriving, as well as using, such data is described with respect to FIG. 3 through FIG. 14C.

The following description serves an example of determining what constitutes "substantial" means with respect to determining whether a vehicle is "subject to advection" of the medium. Mathematically, the one or more embodiments described herein for estimating a speed of a vehicle without using a speed sensor is applicable up to the point where the current reaches parity with the vehicles speed through the water. Practically, it is useful for currents that are at most only almost to parity (e.g. 90%, 95%, or 99%) with the vehicle's speed-through-water. The precise limit is a product of the vehicle's maximum turn rate through the water, which will be dependent on a particular vehicle. While the methods of the one or more embodiments are applicable to current to water speed ratios of 0 to 1, the effect of employing the methods of the one or more embodiments does not become pronounced until the current to water speed fraction increases above 0.30 (i.e., current magnitude is 30 percent or greater of the vehicle's water speed).

Note that this example may be varied, depending on medium conditions and different vehicle configurations. However, the principles described above show how the term "substantial" is a quantifiably determinable amount with respect to determining whether a vehicle is "subject to" advection caused by the motion of the medium through or in which the vehicle moves.

Attention is now returned to the vehicles shown in FIG. 2. The first vehicle (200) has a first body (208). The second vehicle (202) has a second body (210). Because the first vehicle (200) is a water vehicle, the first body (208) may be that of a watercraft, as described further below. Because the second vehicle (202) is an aerospace vehicle, the second body (210) is an aerospace body, as described further below.

The first vehicle (200) has a first propulsion mechanism (212). The second vehicle (202) has a second propulsion mechanism (214). Because the first vehicle (200) is a water vehicle, the first propulsion mechanism (212) is that of a watercraft, as described further below. Because the second vehicle (202) is an aerospace vehicle, the second propulsion mechanism (214) is that of an aerospace vehicle, as described further below.

Any of the vehicles shown in FIG. 2 may include a direction control system connected to the body. Thus, the first vehicle (200) may include a first direction control system (216) and the second vehicle (202) may include a second direction control system (218). In both cases, the term "connected to" may include a direct physical connection, a wired connection, a wireless connection, inside the vehicle, on the vehicle, connected to a projection on the vehicle, etc. In one embodiment, the direction control system is physically connected in or on the vehicle.

The first direction control system (216) and the second direction control system (218) both are hardware and/or software components programmed to perform the functions described below. Thus, for example, either system may be a processor, a data repository for processing code configured to accomplish the procedures described below when executed by the processor, a communication device for transmitting and receiving data, and possibly a user interface. In the example of FIG. 2, the first direction control system (216) is software which interacts with a first data repository (220) and a first processor (222) for the first vehicle (200). Similarly, the second direction control system (218) is software which interacts with a second data repository (224) and a second processor (226) for the second vehicle (202).

In one or more embodiments of the invention, the first data repository (220) and the second data repository (224) are storage units and/or device (e.g., a file system, database, collection of tables, or any other storage mechanism) for storing data, as described with respect to FIG. 14A and FIG. 14B. Further, the first data repository (220) and the first processor (222) may include multiple different storage units and/or devices. The multiple different storage units and/or devices may or may not be of the same type or located at the same physical site.

The first processor (222) and the second processor (226) are physical processing units, such as those described with respect to FIG. 14A and FIG. 14B. The processors are configured to execute code stored in the respective data repositories to perform the techniques described herein.

Note that, in different embodiments, the processors and data repositories may be present on an off-board computer. In this case, data is sent from the first vehicle (200) and/or the second vehicle (202), and data processed off-board.

The first direction control system (216) is calibrated and programmed to operate with respect to data received for a watercraft. The second direction control system (218) is calibrated and programmed to operate with respect to data received for an aerospace vehicle. However, the mathematics and underlying techniques for processing data from both types of media are effectively equivalent, as described with respect to the methods of FIG. 3 through FIG. 14C.

The first direction control system (216) and the second direction control system (218) are also programmed to issue commands to first vehicle (200) and the second vehicle (202), respectively. Thus, for example, the first direction control system (216) can issue a command to the first vehicle (200) to turn a rudder in order to cause the first vehicle (200) to turn by a pre-determined amount in its course in or on the water. Likewise, for example, the second direction control system (218) can issue a command to the second vehicle (202) to deflect a control surface to command the second vehicle (202) to lift or descend during flight.

Additional, more detailed examples of the vehicles are now provided. Note that the following examples do not limit the types of vehicles that may be used for the first vehicle (200) or the second vehicle (202).

Attention is first turned to the first vehicle (200), which is a watercraft. In this case, the first body (208) may be characterized as having sub-components. Thus, the first body (208) may include a float (228), which may be float (11) from FIG. 1A, and is configured to float on water. A tether (230), which may be tether (31) from FIG. 1A, is connected to the float (228). A glider (232), which may be glider (31) from FIG. 1A, is connected to the tether (230), opposite the float (228). The glider (232) is disposed under the float (228) with respect to the surface of the water.

The glider (232) may be characterized as a second body. A rudder (234) is attached to the glider (232). The rudder (234), when turned, causes the glider (232) (and hence indirectly the first body (208)) to turn in the water. A wing system (236) (or propulsion system, propeller system, or thrust system) is also connected to the glider (232). The wing system is one or more fins which propel the glider (232) forward through the water as the glider (232) is heaved through the water through by the tether (230) connected to the float (228), under the action of surface waves upon the float (228).

The wing system (236) is capable of moving or rotating relative to the glider (232). Thus, vertical movement of the float (228) due to motion of the water causes the wing system (236) to propel the glider (232) horizontally through the water.

Very briefly, wave energy in water is greatest at the water's surface, decreasing rapidly with increasing depth. The first vehicle (200) uses the two-part architecture of the first body (208) and the glider (232) to exploit this difference in energy to provide forward propulsion. As a wave rises and falls, the float (228) moves up and down vertically (heaves), which also causes the glider (232) to move up and down by connection to the tether (230). With each heave cycle, the trailing edges of the fins (236) on the glider (232) are deflected in the opposite direction of the heave motion. This deflection creates an angle of attack of the wing system (236) with respect to the vertical flow across the fins (236), resulting in a horizontal lift (thrust) force on each fin (236). As a result, the up-and-down motion of the waves in the water ultimately transfers energy into the wing system (236), forcing the first vehicle (200) (i.e., the combination of the first body (208), the tether (230), and the glider (232)) to move horizontally in the water.

Thus, the wing system (236) in this specific example is the first propulsion mechanism (212) for this particular example of the first vehicle (200). The vertical movement of the wing system (236) through the water at the depth of the glider (232) but at the amplitude of the surface waves provides the horizontal propulsion energy; however, the horizontal propulsion energy is ultimately derived from vertical motion of the waves.

Thus, the first vehicle (200) may be a watercraft which has nearly limitless energy for forward motion (i.e., so long as there are waves in the ocean). Solar panels may be added to the first vehicle (200) to power electrical systems. In this manner, the first vehicle (200) may be a zero emission watercraft suitable for long-term deployment in the water. Thus, the first vehicle (200) may be suitable for long-term waterborne scientific measurement systems, as well as for many other applications. A secondary propulsion system (such as a first auxiliary thruster (258)) may be provided for additional embodiments, as described further below.

A more detailed example of the second vehicle (202) is now provided. Again, the second vehicle (202) in FIG. 2 has a second body (210). The second body (210) in this example is, or is associated with, an aerospace body (238). In other words, the second body (210) may be characterized as the aerospace body (238) itself, or the second body (210) may be associated the aerospace body (238) in some way.

For example, the second body (210) could be a drone (242) which contains the second direction control system (218). In this case, the second body (210) and the aerospace body (238) are effectively the same thing. However, in another example, the second body (210) could be a platform containing the second direction control system (218), with the platform connected to a blimp (240). In this case, the second body (210) is the platform and the aerospace body (238) is the blimp (240) associated with the platform.

Thus, the aerospace body (238) may take many different forms and have different sub-components. For example, the aerospace body (238) could be a blimp (240). The aerospace body (238) could be a drone (242). The aerospace body (238) could be an aircraft, such as the aerospace vehicle (180) shown in FIG. 1B. Other variations are possible.

A brief summary description of the programming (i.e. computer code or hardware) of the first direction control system (216) and the second direction control system (218) is now addressed. Details on how the functions described below may be implemented are described with respect to FIG. 3 through FIG. 14C. For the sake of clarity, the terms "vehicle" and "direction control system" are used. However, for purposes of the following discussion, use of the term "the vehicle" may apply to any or all of the first vehicle (200), the second vehicle (202), the third vehicle (204), and the fourth vehicle (206). Similarly, the term "direction control system" may apply to either or both of the first direction control system (216) and the second direction control system (218), and corresponding direction control systems of the third vehicle (204) and the fourth vehicle (206).

Attention is now turned to the third vehicle (204) and the fourth vehicle (206). The third vehicle (204) and the fourth vehicle (206) may have features similar to those described with respect to the first vehicle (200) or the second vehicle (202). The third vehicle (204) and the fourth vehicle (206) are used with respect to the comparative testing of multiple vehicles embodiment, described further below.

Embodiment: Vehicles Used to Estimate Vehicle Speed and Medium Advection Speed without Direct Measurements.

The one or more embodiments also provide for a vehicle programmed to estimate vehicle speed and medium advection speed, without using a direct speed measurement system. The vehicle includes a body. The body may be a water vehicle or an aerospace vehicle.

A propulsion mechanism, such as first propulsion mechanism (212) or second propulsion mechanism (214) is connected to the body. The propulsion mechanism may be as described above.

A speed-through-medium estimation system, such as a first speed-through-medium estimation system (244) for the first vehicle (200) and a second speed-through-medium estimation system (246) for the second vehicle (202), is connected to the body. The first speed-through-medium estimation system (244) and the second speed-through-medium estimation system (246) are both hardware and/or software components programmed to perform the functions described below. Thus, for example, either system may be a processor, a data repository for processing code configured to accomplish the procedures described below when executed by the processor, a communication device for transmitting and receiving data, and possibly a user interface. In the example of FIG. 2, the first speed-through-medium estimation system (244) is software which interacts with a first data repository (220) and a first processor (222) for the first vehicle (200). Similarly, the second speed-through-medium estimation system (246) is software which interacts with a second data repository (224) and a second processor (226) for the second vehicle (202). The more general term "speed-through-medium estimation system"

may refer to either the first speed-through-medium estimation system (244) or the second speed-through-medium estimation system (246).

Any of the first vehicle (200) through the fourth vehicle (206) may also include a navigation system, such as first navigation system (248) for the first vehicle (200) and second navigation system (250) for the second vehicle (202). More generally, as used herein, the term "navigation system" may refer to either the first navigation system (248) or the second navigation system (250). The navigation system may be a processor executing navigation software, and thus could be, for the first vehicle (200), the first processor (222) and software stored on the first data repository (220). The navigation system may also be a an off-board processor which processes data transmitted by the vehicle in question. In any case, the navigation system is configured to measure the course taken by the vehicle, and/or plan future course changes for the vehicle, and/or issue commands to other components of the vehicle to adjust course and/or speed. For example, for the first vehicle (200), the first navigation system (248) may issue a command to the first propulsion mechanism (212) to increase speed and also issue another command to the first direction control system (216) to cause the first vehicle (200) to turn within the water. Many other variations of the navigation system are contemplated.

The speed-through-medium estimation system is configured, when the vehicle is moving through a medium which subjects the vehicle to advection due to movement of the medium, to perform a series of computer implemented steps. The computer implemented steps include measuring, using the navigation system (such as the first navigation system (248) or the second navigation system (250)), velocities of the vehicle over ground over time. The measurement of the velocities of the vehicle over ground may be performed by using global positioning system (GPS) position measurements over time, or by other positioning systems (e.g., pressure sensors, use of flow rate calculations to measure velocity, etc.). The GPS reading provide both horizontal position and vertical position differences between two different times. By dividing the distance travelled by the time taken to move that distance, the velocity of the vehicle over ground can be estimated. The vehicle's velocity over ground can be decomposed into a vehicle speed over ground coupled with a vehicle course-over-ground.

The computer implemented steps also include measuring, using a directional sensor, a course-through-medium over the time. Under the assumption that the vehicle does not side-slip through the medium (i.e., it is advected along with the moving medium), the vehicle course-through-medium can be measured by observing vehicle heading. The directional system may be a compass, a camera, sensor system, or some other means for tracking vehicle orientation.

The computer implemented steps also include calculating, using the velocities and the course-through-medium, a variation of a speed-over-ground of the vehicle over time as a function of the course-through-medium over the time. The calculation of the variation of the speed-over-ground of the vehicle is described with respect to FIG. 4 through FIG. 14C. Note that the speed-through-medium is not the same as the speed-over-ground, due to advection caused by the medium.

The computer implemented steps also include concurrently estimating, using the variation, an average speed-through-medium for the vehicle over the time, an advection rate of the medium over the time, and an advection direction of the medium over the time. The process of estimating these values is described with respect to FIG. 4 through FIG. 14C.

Embodiment: Vehicles Used for Improved Speed of Closed Course Navigation Through a Moving Medium.

The one or more embodiments include vehicles having programming for performing more efficient course control of the vehicle. In particular, the one or more embodiments provide for a more efficient closed course navigation through a moving medium.

In particular, the direction control system is configured to adjust a direction of motion of the vehicle while the vehicle moves in a medium subject to advection. The direction control system is also programmed to command the vehicle to perform a navigation course including a closed course-over-ground. The direction control system is also programmed to periodically adjust navigation of the vehicle along the closed course such that a course-through-the-medium turn rate is varied in a manner that causes a course-over-ground turn rate of the vehicle to be held constant, thereby minimizing the impact of medium advection on vehicle speed over ground. An example of a displaced phase center, and navigation to effect a displaced phase center, is described with respect to FIG. 10A through FIG. 14C.

The direction control system may be programmed to perform a variety of other, or more specific, operations. For example, the direction control system may be configured such that the closed course-over-ground including one of a circular closed course and a polygonal closed course. For the circular closed course, the direction control system may be configured such that a first instantaneous radius of the circular closed course with respect to a phase center of the navigation course includes a first function of a phase angle formed by a position of the vehicle with respect to a displaced phase center of the circular closed course. For the polygonal closed course, for this case, the direction control system may be configured such that a second instantaneous radius to vertices of each side of the polygonal closed course with respect to the phase center of the navigation course includes a second function of the phase angle formed by the position of the vehicle with respect to the displaced phase center of the polygonal closed course.

Other variations of the programming of the first direction control system (216) and/or the second direction control system (218) are possible. For example, the direction control system may be configured such that the first instantaneous radius of the circular closed course and the second instantaneous radius to the vertices of the polygonal closed course reach a maximum when a speed-over-ground of the vehicle reaches a maximum. The direction control system may be configured such that the first instantaneous radius of the circular closed course and the second instantaneous radius to the vertices of the polygonal closed course reach a minimum when a speed-over-ground of the vehicle reaches a minimum. The direction control system may be configured such that an average radius of a side and a side length of the polygonal closed course reaches a maximum when a speed-over-ground of the vehicle reaches a maximum. The direction control system may be configured such that an average radius of a side and a side length of the polygonal closed course reaches a minimum when a speed-over-ground of the vehicle reaches a minimum.

In still another embodiment, the direction control system may be configured such that a course-over-ground turn rate of the vehicle is held at about a constant value around a closed course. In this embodiment, a course-through-medium turn rate of the vehicle is highest in a slowest portion of the closed course, and lowest in a fastest portion of the closed course. In this case, the slowest portion of the closed course occurs when a course-over-ground of the vehicle is in opposition to an average current direction of a current in the medium. The fastest portion of the closed course occurs when the course-over-ground of the vehicle is aligned with the average current direction of the current in the medium.

The system shown in FIG. 2 may be varied. For example, the navigation system (either the first navigation system (248) or the second navigation system (250)) may be at least one of a global positioning system (GPS) and a global navigation satellite system (GNSS). Other non-GPS navigation systems, such as a sensor navigation system, etc., are possible.

In another example, the directional sensor may be the part of the first direction control system (216) and/or the second direction control system (218). The directional sensor may be selected from the group consisting of a compass, a camera, and a means for tracking vehicle position relative to another fixed object; however, other directional sensors are contemplated.

Any of first vehicle (200) through fourth vehicle (206) may be equipped with other components. For example, one or more of the vehicles may include a solar panel configured to convert light energy into electrical energy. One or more of the vehicles may include an electrical system in communication with the solar panel, the electrical system configured to provide the electrical energy to the speed-through-medium estimation system.

Embodiment: Vehicles Used in Relative Speed Performance Evaluations.

The one or more embodiments also include a system used for estimating the relative speed performance between distinct pairs of vehicles in a set of multiple vehicles. The system includes two or more vehicles, including at least two of the first vehicle (200), the second vehicle (202), the third vehicle (204), and the fourth vehicle (206). However, in this embodiment, all vehicles are of a same type (i.e., all of the vehicles are water vehicles, all of the vehicles are aerospace vehicles, etc.). The vehicles are located in sufficient proximity to each other that all vehicles are subject to approximately the same advection speed and direction as the other vehicles.

The system may include an auxiliary thruster for each vehicle. An auxiliary thruster may also be characterized as an auxiliary propulsion system. The auxiliary thruster may be a first auxiliary thruster (258) for the first vehicle (200) or may be a second auxiliary thruster (260) for the second vehicle (202). The auxiliary thrusters are provided in addition to the first propulsion mechanism (212) and the second propulsion mechanism (214), respectively. Auxiliary thrusters may also be present in the third vehicle (204) and the fourth vehicle (206). Briefly, while the propulsion mechanisms are passive systems that use wave energy for propulsion, as explained above, the auxiliary thrusters are active propulsions systems that use electricity or a fuel course to generate additional thrust. In particular, the auxiliary thrusters may be used to produce a controlled incremental thrust, as explained further below.

The vehicles also include a communication device, at least one per vehicle. The communication device may be, for example, a first communication device (252) for the first vehicle (200) or a second communication device (254) for the second vehicle (202). A communication device may be a radio, a short range communication device (e.g., BLUETOOTH®), a wired connection, etc.

A control system (256) is in communication with the vehicles via the communication devices. The control system (256) may be a computer, mobile phone, tablet, etc., which is programmed to issue commands to the vehicles and to track the vehicles. The control system (256) is programmed to apply an incremental sequence of about equivalent thrust forces to the vehicles to generate about equivalent incremental changes in steady-state average drag forces for the vehicles. The control system (256) is also programmed to receive speed changes for the vehicles. The control system (256) is also programmed to calculate, from the speed changes, relative speed performance statistics for relative speed performance between pairs of vehicles or multiple sets of vehicles. Calculating is performed independently of the one or more conditions of the medium. Details for performing these calculations are provided with respect to FIG. 4 through FIG. 14C.

While FIG. 2 shows a configuration of components, other configurations may be used without departing from the scope of the invention. For example, various components may be combined to create a single component. As another example, the functionality performed by a single component may be performed by two or more components.

Figure 3A:
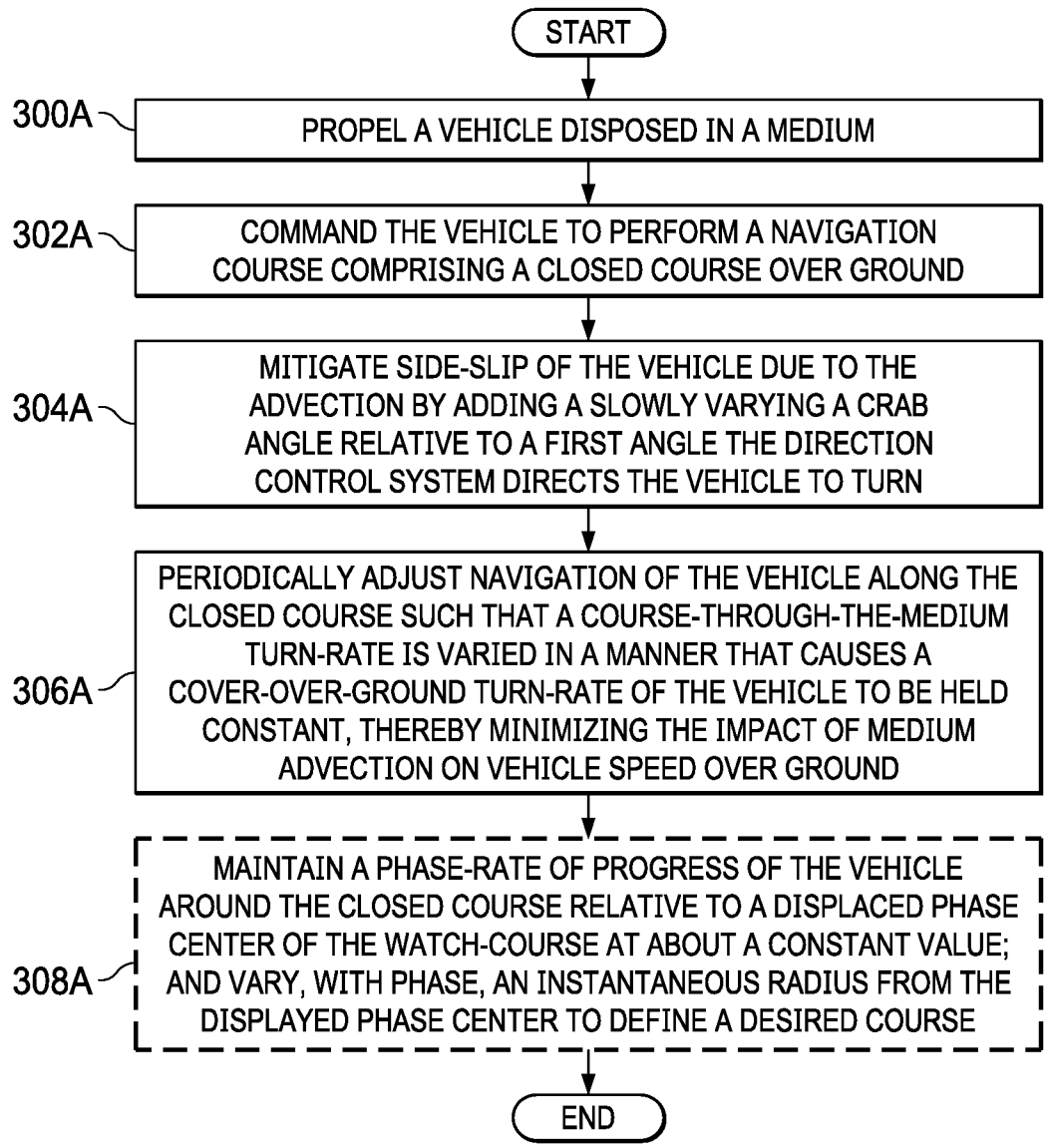
FIG. 3A shows a flowchart of a method of closed course navigation through a moving medium, in accordance with one or more embodiments.

FIG. 3A shows a flowchart of a method of closed course navigation through a moving medium, in accordance with one or more embodiments. The method of FIG. 3A may be performed using one or more of the vehicles described with respect to FIG. 1A, FIG. 1B and FIG. 2. The details of performing the closed course navigation steps described with respect to FIG. 3A are described with respect to FIG. 4 through FIG. 14C.

At step 300A, a vehicle disposed in a medium is propelled. For example, a water vehicle may have a primary propulsion mechanism, or a primary and secondary propulsion system, as described with respect to FIG. 2, which causes the vehicle to be propelled through or on the water. An aerospace or water vehicle may have an appropriate type of propeller for propulsion. A jet system could also be used to propel the vehicle, as not all jet engines necessarily produce high power and thus produce high vehicle speed. In any case, the velocity at which the vehicle is propelled, relative to the velocity changes caused by advection, are at a value low enough that the vehicle is subject to advection.

At step 302A, the vehicle is commanded to perform a navigation course including a closed course-over-ground. Examples of closed courses are shown in FIG. 6, FIG. 10A, FIG. 14A, and FIG. 14B. Thus, the closed course may be either a circular course or a polygonal course.

At step 304A, side-slip of the vehicle due to the advection is mitigated. Mitigation may be performed by adding a slowly varying a crab angle relative to a first angle the direction control system directs the vehicle to turn.

At step 306A, navigation of the vehicle is periodically adjusted along the closed course such that a course-through-the-medium turn rate is varied in a manner that causes a course-over-ground turn rate of the vehicle to be held constant, thereby minimizing the impact of medium advection on vehicle speed over ground. Examples of such periodic adjustment is described with respect to FIG. 4 through FIG. 14C.

In one embodiment, the method of FIG. 3A may terminate thereafter. However, variations are possible. For example, periodically adjusting navigation may maximize an average speed of the vehicle over ground while performing the navigation course.

Additional steps are also possible. For example, the method of FIG. 3 may also include optional step 306A, which includes maintaining a phase-rate of progress of the vehicle around the closed course relative to a displaced phase center of the watch-course at about a constant value;

and vary, with phase, a course-through-the-medium turn rate around the closed course. Note that step 308A or step 306A may be performed without one or the other; thus, for example, step 306A may not be present while step 308A is present.

Variations of the closed course are also possible. For example, the closed course-over-ground may be one of a circular closed course and a polygonal closed course. A first instantaneous radius of the circular closed course with respect to a phase center of the navigation course includes a first function of a phase angle formed by a position of the vehicle with respect to a displaced phase center of the circular closed course. A second instantaneous radius to the vertices of the polygonal closed course with respect to the phase center of the navigation course includes a second function of the phase angle formed by the position of the vehicle with respect to the displaced phase center of the polygonal closed course. In an embodiment, the first instantaneous radius of the circular closed course and the second instantaneous radius to the vertices of the polygonal closed course reach a maximum when a speed-over-ground of the vehicle reaches a maximum. In an embodiment, the first instantaneous radius of the circular closed course and the second instantaneous radius to the vertices of the polygonal closed course reach a minimum when a speed-over-ground of the vehicle reaches a minimum. In an embodiment, an average radius of a side and a side length of the polygonal closed course reaches a maximum when a speed-over-ground of the vehicle reaches a maximum. In still another embodiment, an average radius of a side and a side length of the polygonal closed course reaches a minimum when a speed-over-ground of the vehicle reaches a minimum. Additional details regarding these variations are described with respect to FIG. 4 through FIG. 14C.

In yet another embodiment, a course-over-ground heading rate of the vehicle is highest in a slowest portion of the closed course, and lowest in a fastest portion of the closed course. In this case, the slowest portion of the closed course occurs when a course-over-ground of the vehicle is in opposition to an average current direction of a current in the medium. The fastest portion of the closed course occurs when the course-over-ground of the vehicle is aligned with the average current direction of the current in the medium. Again the details for these variations are described with respect to FIG. 4 through FIG. 14C.

Figure 3B:
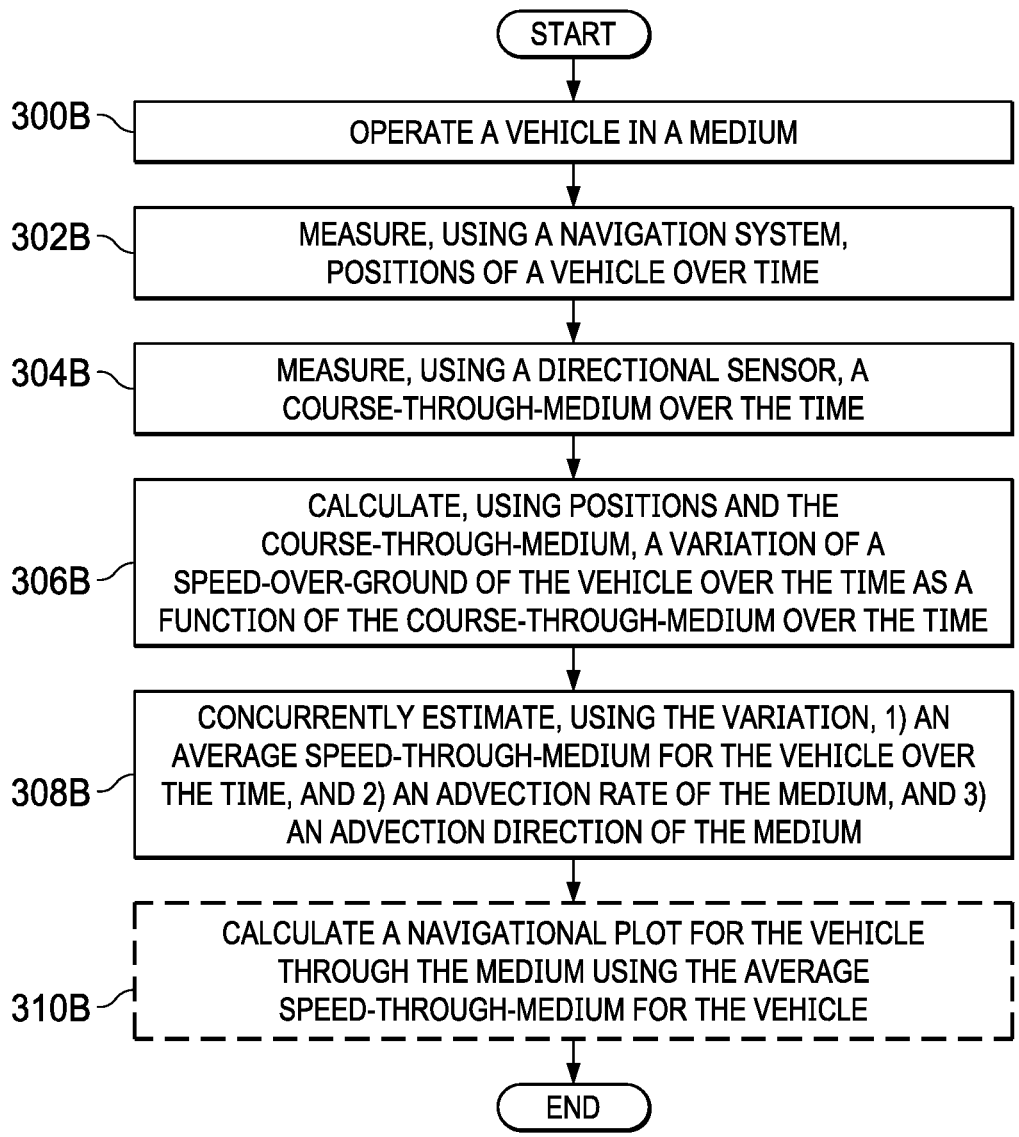
FIG. 3B shows a flowchart of a method of estimating vehicle speed through an advecting medium, in accordance with one or more embodiments.

FIG. 3B shows a flowchart of a method of estimating vehicle speed through an advecting medium, in accordance with one or more embodiments. The method of FIG. 3C may be performed using one or more of the vehicles described with respect to FIG. 1A, FIG. 1B and FIG. 2. The details of performing the estimation of vehicle and advection speed described with respect to FIG. 3A are described with respect to FIG. 4 through FIG. 14C.

At step 300B, a vehicle is operated in a medium. Operating a vehicle in a medium means that the vehicle is disposed in or on the medium and is moving with respect to the medium. The movement of the vehicle need not be due to propulsion. For example, an aerospace glider may have been given an initial speed and then allowed to move through the air, while adjusting speed in response to angle of attack and other maneuvers while considering variations in air density, wind speed, and the vehicle's aerodynamic efficiency. In any case, the vehicle is subject to advection due to movement of the medium while the vehicle is operating.

At step 302B, a navigation system is used to measure positions of a vehicle over time. The navigation system may include a GPS or GNSS system for measuring position, as described above.

At step 304B, a directional sensor is used to measure a course-through-medium over the time. The directional sensor may be a compass, a GPS or GNSS system, or some other sensor.

At step 306B, the positions and the course-through-medium are used to calculate a variation of a speed-over-ground of the vehicle over the time as a function of the course-through-medium over the time. The procedures for performing such calculations are described with respect to FIG. 4 through FIG. 14C. However, as an example, calculating may include minimizing a mean square difference between i) a modeled speed-over-ground versus a modeled course-through-medium for the vehicle, and ii) an observed speed-over-ground versus an observed course-through-medium for the vehicle. Calculating is performed while the vehicle performs a closed course maneuver.

At step 308B, a processor concurrently estimates, using the variation, 1) an average speed-through-medium for the vehicle over the time, and 2) an advection rate of the medium, and an advection direction of the medium. Again, the procedures for performing such calculations are described with respect to FIG. 4 through FIG. 14C. In one embodiment, the method of FIG. 3B may terminate thereafter.

Step 308B may be characterized, in part, as estimating, using the variation, an average magnitude and direction of the advection of the medium. In this case, these estimates within Step 308B may be performed by observing a speed-over-ground of the vehicle versus a course-over-ground of the vehicle; defining an initial estimate of a vehicle speed-through-the-medium as one half of the sum of the maximum and minimum observed values of the speed-over-ground of the vehicle; defining an initial estimate of an average direction of the advection of the medium as a value of the course-over-ground of the vehicle that corresponds to a peak value of the speed-over-ground of the vehicle; and defining an initial estimate of an average medium advection rate as one half of a difference between maximum and minimum observed values of the speed-over-ground of the vehicle.

In an embodiment, calculating the variation of the speed-over-ground of the vehicle over the time as a function of the course-through-medium over the time may be performed as follows. An iterative estimation algorithm is applied to the course-through-medium of the vehicle, the speed-over-ground of the vehicle, the initial estimate of an average medium advection direction, and the initial estimate of the average medium advection rate to minimize model fit errors. Minimization of model fit errors may be performed around a full phase of a complete circuit of the vehicle over a closed course maneuver, but in different embodiments, it may be useful to exclude certain portions of the full phase where underlying navigation assumptions may be violated. It is also possible to use portions of more than one full phase to improve the robustness of the estimates. An output of the iterative estimation algorithm includes the average magnitude and direction of the advection of the medium and the speed-through-medium of the vehicle.

The method of FIG. 3B may be further varied. For example, at optional step 310B, a navigational plot for the vehicle through the medium may be calculated using the average speed-through-medium for the vehicle. The control system of the water vehicle can then execute the navigational plot by commanding the physical components of the vehicle (rudder, thruster, wing system, etc.) accordingly. The details of such a calculation are described with respect to FIG. 4 through FIG. 14C.

Figure 3C:
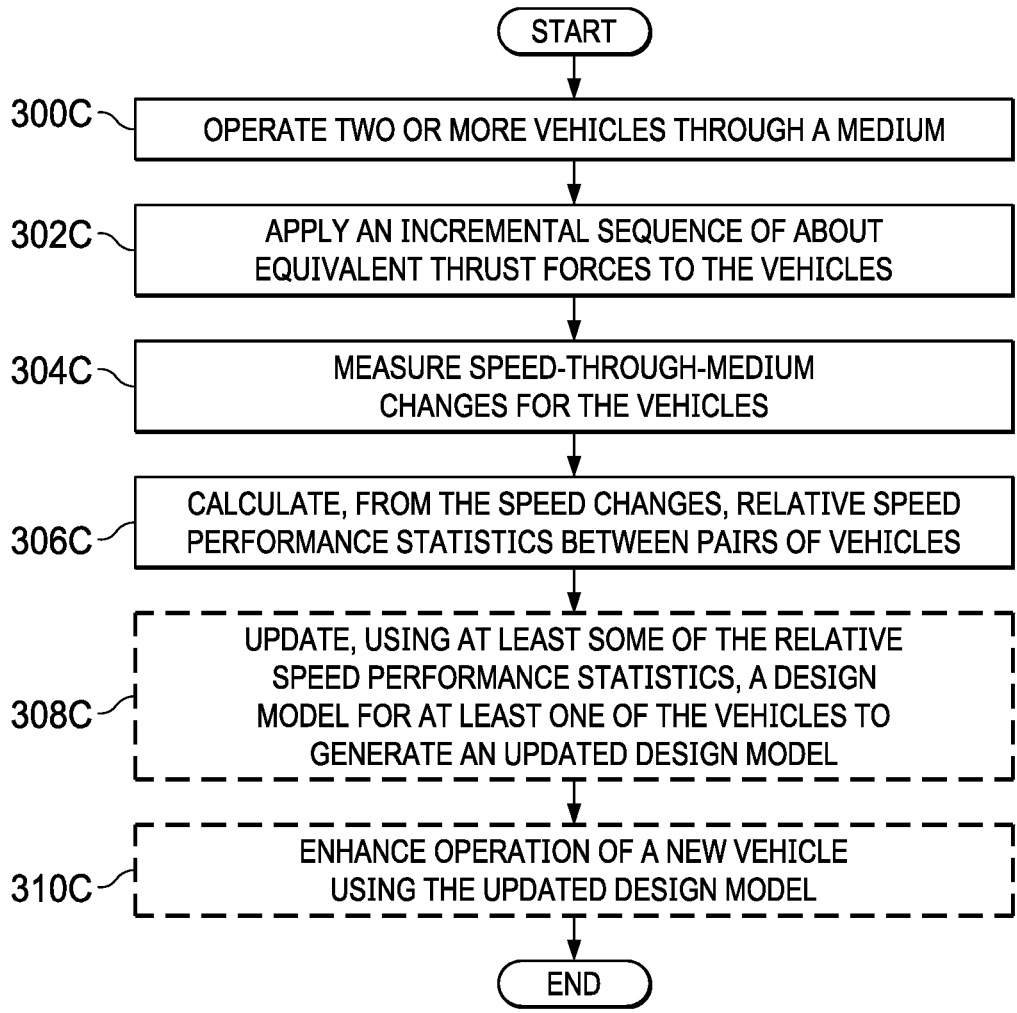

FIC. 3C shows a flowchart of a method of assessing vehicle relative speed performance, in accordance with one or more embodiments. The method of FIG. 3C may be performed using one or more of the vehicles described with respect to FIG. 1A, FIG. 1B and FIG. 2. The details of performing the steps of evaluating relative vehicle performance described with respect to FIG. 3C are described with respect to FIG. 4 through FIG. 14C.

At step 300C, two or more vehicles are operated through a medium. Operating a vehicle through a medium contemplates operating the vehicle on a surface or under the surface or within the medium, as appropriate for the vehicle type. The vehicles are subject to advection due to movement of the medium. The vehicles are in sufficient proximity to each other that one or more conditions of the medium are about equivalent for the plurality of vehicles.

At step 302C, an incremental sequence of about equivalent thrust forces is applied to the vehicles. Application of the thrust forces causes each vehicle to increase its steady state speed through the medium by amounts that vary from vehicle to vehicle, but that are balanced by about equivalent incremental changes in steady-state average drag forces for the vehicles. The sequence of incremental thrust forces may be applied concurrently across the vehicles. A more detailed approach to this step is described with respect to FIG. 4 through FIG. 14C.

At step 304C, changes of speeds through the medium for the vehicles are measured. The process of measuring the speed changes may be performed using the method described with respect to FIG. 3B, and as further detailed with respect to FIG. 4 through FIG. 14C. However, for this embodiment, measurement of speed changes alternatively may be performed directly using a speed sensor.

At step 306C, relative speed performance statistics between pairs of vehicles are calculated from the speed changes. Calculating is performed independently of the one or more conditions of the medium. Details for performing such calculations are described with respect to FIG. 4 through FIG. 14C.

In one embodiment, the method of FIG. 3C may terminate thereafter. However, the method may also be varied.

For example, measuring the speed changes may be performed over a range of incremental thrust forces. Measuring the plurality of speed changes may be performed individually by ones of the vehicles. The sequence of incremental thrust forces change the steady-state speeds of the vehicles so that the steady-state average drag forces balance additional thrust forces applied to the vehicles.

Calculating the relative speed performance at step 306C may include additional sub-steps. For example, step 306C may include observing differences between speed changes for the vehicles, and comparing ratios of total drag coefficients between the pairs of vehicles. Alternatively, or in addition, calculating may include inferring speeds-through-water for the vehicles from a combination of i) advection magnitude and direction, and ii) speeds-over-ground for the vehicles; and then calculating squares of the speeds-through-water for the vehicles at two or more different thrust values. Calculating the speeds-over-ground for the vehicles may be calculated using data from a satellite navigation system that measures a plurality of positions, velocities, or both positions and velocities for the vehicles.

In another embodiment, at step 300C, operating the vehicles may include ordering the plurality of vehicles to perform closed course navigation paths, as described with respect to FIG. 3A. Thus, for example, the closed course navigation paths may be one of: a circular closed course path, a polygonal closed course path (watch-circle navigation or polygonal watch navigation), and a hybrid closed course path composed of both circular arcs and linear segments. With respect to the hybrid closed course path, there are instances where a tear-dropped shaped closed course path would have some navigation advantages, where the point of the tear is aligned with the slowest point on an enclosing circle.

The closed course navigation paths are about equivalent in at least one of shape, perimeter, length, and orientation. Alternatively, the closed course navigation paths are about equivalent in shape and orientation, but perimeter lengths of each closed course navigation path are increased or reduced such that each of the vehicles completes a full circuit around a respective closed course in about an equivalent amount of time relative to others of the vehicles.

The method of FIG. 3C may also be extended. At optional step 308C, a design model for at least one of the vehicles is updated, using at least some of the relative speed performance statistics, to generate an updated design model. For example, at optional step 310C, the design model may be used to enhance operation of a new vehicle.

As mentioned above, the vehicles may be water vehicles or aerospace vehicles; however, for comparative testing, all of the vehicles are of the same type. In the case of water vehicles, the incremental thrust forces may be generated using propellers for the plurality of vehicles. The thrust forces are applied by increasing the propellers to a first number of revolutions per minute (RPM). The number of RPM may be varied as a sequence over time. For example, a series of impulses in the form of 100 RPM, 0 RPM, 200 RPM, 0 RPM, 300 RPM, 0 RPM, etc. may be applied. These numbers may vary and the sequence may vary; i.e., does not necessarily continue to increase in RPM.

In another embodiment, applying the sequence of incremental thrust forces may be performed after a slowest vehicle completes a full circuit around the closed course. In this case, responsive to the slowest vehicle failing to complete the closed course within a threshold period of time, a length of a perimeter of the closed course for the vehicles may be reduced. Additionally, responsive to faster vehicles completing more than one circuit of the closed course in a threshold period of time, individual lengths of perimeters of vehicle courses are increased proportionately with respective vehicle speeds through the medium, such that all vehicles will complete subsequent circuits of new courses in about a same period of time. A more detailed description of this procedure is described with respect to FIG. 4 through FIG. 14C.

While the various steps in the flowcharts of FIG. 3A through FIG. 3C are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Specific Examples Using One or More Water Vehicles.

Attention is now turned to a specific example of the one or more embodiments, detailed with respect to FIG. 4 through FIG. 14C. The specific example given is for a water vehicle. In particular, throughout the description for FIG. 4 through FIG. 14C, the term "water vehicle" refers to the type of water vehicle shown in FIG. 1A and described with respect to the "glider, tether, and float" arrangement described with respect to FIG. 2. However, the example of FIG. 4 through FIG. 14C may be extended to other types of water vehicles, as well as to aerospace vehicles. In the case of aerospace vehicles, the term "water" could be replaced by the term "air," and the general methodology would be similar to that described below for a water vehicle. Additionally, from a general perspective, the term "water" could be replaced by the term "medium." Thus, the one or more embodiments are not limited to the examples described below.

For the example of FIG. 4 through FIG. 14C, attention is first turned to a description of the challenges faced by developers of water vehicles subject to advection. In particular, the water vehicle's wave-based propulsion performance is a function of prevailing sea state conditions. Thus, the water vehicle's instantaneous speed varies with each passing wave, even though the water vehicle maintains a relatively constant speed-through-water (STW) when averaged over several wave cycles. The water vehicle's speed-through-water is dependent primarily on the current sea state conditions but is also affected by the float and glider trim and balance, umbilical length, and biofouling.

Testing different designs of the water vehicle takes time. Hundreds of days may be required at sea to characterize wave-based propulsion performance in different configurations and under different conditions. Each new set of speed performance sea trials uses multiple vehicles in differing configurations operating over multiple weeks to gather sufficient data to estimate wave-based propulsion performance over a variety of sea states. For best results, these multiple vehicles are subjected to a second set of sea trials with all vehicles in the same (standard) configuration to control for variations in the "baseline" speed performance between the test vehicles.

While the water vehicles may include water speed sensors, these sensors are all very noisy and inaccurate at speeds below two knots, which is the primary speed regime of the water vehicles. Consequently, specialized speed tests using particular course patterns (typically "chevron" courses) are conducted to allow the vehicle's speed-through-water to be inferred from its speed and course-over-ground in the presence of unknown water current perturbations. Because only speed-through-water observation can be estimated from each full circuit around the test course, speed testing requires long deployments to achieve statistically significance speed-through-water estimates over a variety of sea states.

At the end of the speed test deployments, the speed performance estimates are processed from raw vehicle data in a post-mission analysis step that is extremely labor intensive. The raw data is first examined to identify and excise anomalies, which are typically numerous. It is also often necessary to tailor the data analysis functions to adapt the functions to the specific data that are available for a given speed test. Such tailoring may be necessary, as different versions of the vehicles' source code produce different measurements, at different sample rates, and in different logging formats. Often, certain measurements are found to have not been logged at all, or to have been logged as time-averaged values that are too coarsely sampled to support the preferred post-processing techniques.

Additionally, once the speed-through-water performance has been estimated as a function for sea state for a given vehicle in a given set of sea trials, very high variability may exist within the set of speed-through-water observations under the same nominal sea state conditions and between the different vehicles in trial. Current models of vehicle speed performance explain only 50-80% of the observed variability with sea state. Speed-through-water variations between vehicles operating in adjacent "chevron" courses can be as high as 20%. Many suppositions have been made to explain these variations, but a systematic effort to identify, and eventually control, the factors that influence speed-through-water performance has not been made due to the effort required using current time-consuming and labor-intensive speed testing methodologies.

The one or more embodiments address these and other technical challenges. In one example, the one or more embodiments provides for a new methodology for conducting speed trials. The new methodology relies solely on a minimal set of higher-accuracy sensors (GPS and/or compass readings). This approach provides a standard set of data that is available on all vehicles. In particular, this approach eliminates or mitigates dependence on the vehicle's marginally-capable water speed sensor and on acoustic doppler current profiler (ADCP) sensors for water current measurements that are only available on meteorological and oceanographic (METOC) vehicles.

The one or more embodiments have other technical effects. The one or more embodiments also eliminate or mitigate the need to conduct baseline speed tests between vehicles, by employing the thruster to directly observe drag variations between vehicles. The one or more embodiments also significantly reduces the time required to conduct sea trials with differing configurations, again using the thruster to directly observe relative performance differences between vehicles with differing configuration. The one or more embodiments also eliminate or mitigate the labor intensive post-mission data analysis step. Instead, a robust algorithm is presented for in situ, real-time processing aboard the vehicle to continuously estimate a vehicle's speed-through-water and the prevailing water current magnitude and direction.

While the process described below relies on watch-circle course for conducting speed tests, the methodology can be generalized to apply to arbitrary courses. For example, watch-polygon courses are also provided. Thus, the one or more embodiments provide a means to continuously estimate vehicle speed performance across an entire fleet of water vehicles.

Attention is now returned to the details of the Figures. FIG. 4 shows a graph of geometry and nomenclature for a vehicle being propelled in water, in accordance with one or more embodiments. The graph (400) shown in FIG. 4 provides definitions of terms used with respect to FIG. 5A through FIG. 14C.

The graph (400) may be visualized as a coordinate system imposed over a two-dimensional surface, such as water. Thus, the Y-axis (402) represents a north-south direction and the X-axis (404) represents an east-west direction. However, the graph (400) may be generalized to a three-dimensional graph if altitude is to be taken into consideration. The origin (406) of the graph (400) represents a central point of the coordinate system. The point "P" (408) represents the position of the vehicle. The direction of the current in the water is designated by arrow (410).

With the coordinate system, vehicle location, and current defined, the following terms apply throughout the rest of the discussion of FIG. 5A through FIG. 5D. The terms are also shown in FIG. 4 pictorially so that each defined term may be visualized.

The distance from the origin (406) to the point "P" (408) is R(t).

The vehicle speed-over-ground (SOG) is $|V_{OG}(t)|$. Note that the speed-over-ground is not the same as the speed-through-water, due to the action of currents.

The vehicle course-over-ground (COG) is $\theta_{OG}(t)$. Note that the course-over-ground is not necessarily the same as the course-through-water, due to the presence of currents.

The vehicle-speed-through water (STW) is $|V_{TW}(t)| \approx |V_{TW}|$, a "short-term constant."

The vehicle course-through-water (CTW) is $\theta_{TW}(t)$.

The water current velocity is $\vec{V}_C(t)$.

The water current magnitude is $|V_C(t)| \approx |V_C|$, a "short-term constant."

The water current direction is $\theta_C(t) \approx \theta_C$, a "short-term constant."

The course-over-ground heading, less current heading, difference is stated as (COG-CHD), and is defined as $\alpha(t) = \theta_{OG}(t) - \theta_C$. The term $\alpha(t)$ may also be referred-to as the "heading relative to current."

The course-through-water heading, less course-over-ground heading, difference is stated as (CTW-COG), and is defined as $\beta(t) = \theta_{TW}(t) - \theta_{OG}(t)$. The term $\beta(t)$ may also be referred-to as the "vehicle crab-angle."

FIG. 5A through FIG. 5D should be considered together. FIG. 5A shows a graph (500) of vehicle speed-over-ground (Y-axis (502)) as a function of course-over-ground (X-axis (504)), in accordance with one or more embodiments. FIG. 5B shows a graph (506) of vehicle course-over-ground (X-axis (508)) as a function of time (Y-axis (510)), in accordance with one or more embodiments. FIG. 5C shows a graph (512) of vehicle speed-over-ground (Y-axis (514)) as a function of time (X-axis (516)), in accordance with one or more embodiments. FIG. 5D shows a graph (518) of the difference between vehicle course-through-water less vehicle speed-over-ground (Y-axis (520)), as a function of time (X-axis (522)), in accordance with one or more embodiments.

I. Determining Vehicle Speed-Through-Water and Determining Current Magnitude and Direction without Using Direct Speed Sensors.

The following is a method to estimate water speed and current speed using only the SOG and COG (as opposed to SOG and CTW, described below). The following method is novel and non-obvious over known methods. However, the following method assumes that the water vehicle is able to null cross-track error (i.e., the water vehicle does not deviate from a desired navigation course). A method for estimating water speed and current speed that takes into account cross-track error (using SOG and CTW) is described in section I.B., below.

Begin by setting each vehicle on a watch-circle course with radius R meters. Without loss of generality, let the center of each watch-circle be (x, y)=(0,0). Given slowly varying sea state conditions, the vehicle's short-term averaged speed-through-water due to wave-based propulsion and/or thruster usage can be assumed to be constant over the duration of a single circuit around the watch-circle course, $|V_{TW}(t)| \approx |V_{TW}|$. The vehicle's short-term averaged speed-over-ground will be the combination of the vehicle's speed-through-water plus advection by water current. We also assume that water current magnitude, $|V_C|$, and direction, $\theta_C$, can be treated as constant over the relatively short time required to complete a single circuit around the watch-circle.

For the moment, further assume that the vehicle is able to navigate around the watch-circle with minimal cross-track error. In this case, the radial component of the water current will be nulled by the radial component of the vehicle's through-water velocity as follows:

$|V_{TW}|\sin \beta(t) = -|V_C|\sin \alpha(t)$

If the radial component of the speed over ground is nulled (line-following), then the vehicle's short-term averaged velocity-over-ground is simply the sum of the along-course components of the water current and the vehicle's velocity through the water, as follows:

$|V_{OG}(t)| = |V_{TW}|\cos \beta(t) + |V_C|\cos \alpha(t)$.

Since the current magnitude and the vehicle's speed-through-water are relatively constant over moderate time scales (up to an hour, for example), then the heading difference between the vehicle's through-water and over-ground velocities, $\beta(t)$, will be a function of the heading difference between the current direction and the vehicle's course-over-ground, $\alpha(t)$, and the relative magnitudes of the current and vehicle speed through the water, as follows:

$$\beta(t) = \sin^{-1}\left(-\frac{|Vc|}{|Vtw|}\sin\alpha(t)\right)$$

Applying the identities:

$\cos(x)=\cos(-x); \sin(-x)=-\sin(x);$ and $\cos(\sin^{-1}(\alpha \sin \alpha(t)))=[1-a^2 \sin^2 \alpha(t)]^{1/2}$, we find that:

$|V_{OG}(t)| =$ $$|V_{OG}(\alpha(t))| = |V_{TW}|\left[1 - \sin^{-1}\left(-\frac{|Vc|^{\wedge}2}{|Vtw|^{\wedge}2}\sin\alpha(t)\right)\right]^{1/2} + |V_C|\cos \alpha(t).$$

Note that this equation is valid for $|V_C| < |V_{TW}|$.

Ignoring the time dependence in $\alpha(t)$ for the moment, the vehicle's speed-over-ground (SOG) as a function of its course-over-ground (COG) is quasi-sinusoidal, with mean equal to the (short-term constant) average speed-through-water and amplitude equal to the (short-term constant) current magnitude. The phase of the sinusoid indicates the direction of the water current.

The vehicle's short-term averaged SOG is maximized when the vehicle's courses over ground and through the water are aligned with the direction of the water current, i.e., when $\alpha(t) = \theta_{OG}(t) - \theta_C = 0$, in which case, the following is true:

$|V_{OG}|_{min} = |V_{TW}| + |V_C|$.

Similarly, the vehicle's short-term averaged speed-over-ground is minimized when its course-over-ground is in direct opposition to the direction of the water current, i.e., when $\alpha(t) = \pi$, yielding the following:

$|V_{OG}|_{min} = |V_{TW}| - |V_C|$, from which we have:

$|V_{TW}| = \frac{1}{2}(|V_{OG}|_{max} + |V_{OG}|_{min})$ and $|V_C| = \frac{1}{2}(|V_{OG}|_{max} - |V_{OG}|_{min})$.

Attention is now turned to FIG. 5A through FIG. 5D. For each of FIG. 5A through FIG. 5D, a line represents the progress or data collected for one vehicle around a 150 meter radius watch-circle with a vehicle-through-water ($V_{tw}$) speed of 1.5 knots and a water current at 60 degrees. Each line represents varying current magnitudes, with current magnitude to vehicle water speed ratios of 0, 1/6, 1/3, 1/2, 2/3, and 5/6.

Reviewing plots of the vehicle's short-term averaged SOG and COG in FIG. 5A through FIG. 5D, the direction of the water current is evident. The direction of the water current is the value of the COG that corresponds to the peak value of SOG. When cross-track navigation error is negligible, then the minimum and maximum SOG values can be more precisely located in the presence of measurement noise by noting the zero-crossing of the short-term averaged vehicle side-slip angle (i.e., COG-CTW).

When $|V_C| \ll |V_{TW}|$, plots of $|V_{OG}(t)|$ appear nearly sinusoidal. However, as $|V_C|$ approaches $|V_{TW}|$, plots of $|V_{OG}(t)|$ show increasingly sharpening peaks as the vehicles races through the portion of the watch-circle aligned with the current direction, followed by broader and flatter valleys as the vehicle labors to make progress against the current on the opposite side of the watch-circle. We can use these sharper peaks and broader troughs to build more robust estimators for the three unknown parameters.

Specifically, a gradient descent algorithm can be applied to the model parameter values to minimize model fit errors around the full phase of a complete circuit around the watch-circle. This estimator is also robust to incomplete data. For instance, if the vehicle exhibit slaloming while struggling to pass through the portion of the circle that is aligned against the water current, then this portion of the data set can be removed before processing.

The differential equation for the vehicle's angular progress around the circle is:

$$\dot{\theta}_{OG}(t) =$$

$$\dot{\alpha}(t) = \frac{1}{R}|v_{OG}(t)| = \frac{1}{R}\left(|v_{TW}|\left[1 - \frac{|v_C|^2}{|v_{TW}|^2}\sin^2\alpha(t)\right]^{1/2} + |v_C|\cos\alpha(t)\right).$$

This non-linear differential equation has no direct analytic solution for $\theta(t)$. However, given a specific vehicle heading relative to the prevailing current direction, we can calculate the time required for the vehicle to achieve this particular heading using numeric integration of the elliptic integral of the second kind, denoted by $E(\phi, k^2)$. The solution takes the form:

$$\tau(\phi) = \frac{R}{|v_{TW}|^2 - |v_C|^2}\left(|v_{TW}| \cdot E\left(\phi, \frac{|v_C|^2}{|v_{TW}|^2}\right) - |v_C| \cdot \sin\phi\right) \ni \alpha(\tau) = \phi$$

where $$E(\phi, k^2) = \int_0^\phi \sqrt{1 - k^2 \sin^2(\phi)}\, d\phi$$

is calculated via numeric integration. Most scientific computing environments and programming languages provide utility functions for calculating elliptical integrals.

Given assumed values for the sea current and wave propulsion magnitudes, and the sea current direction, we can calculate vehicle "arrival times", $\tau$, as a function of position around the circle, and then calculate angular velocities and instantaneous speeds over ground.

I.A. Model Parameter Estimation Processing.

Defining the model parameter vector as $\Theta = (\theta_C, |V_C|, |V_{TW}|)$, the modeled speeds over ground, $\hat{x}(\alpha(t, \Theta))$, can then be compared to observed vehicle speeds over ground, $x(\alpha(\tau))$, to calculate model fit errors. These quantities can be discretized over a sequence of N samples at sample times $t_k$ for k=[0, 1, . . . , N]. For convenience, we adopt the following notations for the discretized modeled and observed speeds over ground:

$$\hat{x}(\alpha(t_k, \Theta)) = \hat{x}[\alpha_k, \Theta] = \hat{x}[t_k, \Theta], \text{ and } x(\alpha(t_k)) = x[\alpha_k] = x[t_k]$$

The most common choice for the optimization cost function is the mean square error:

$$MSE(\Theta) = \frac{1}{N}\sum_{k=1}^N (\hat{x}[\alpha_k, \Theta] - x[\alpha_k])^2,$$

where $x(\alpha(\tau))$ and $\hat{x}(\alpha(\tau), \Theta)$ have been sampled at N discrete angular positions, $\alpha_1$ to $\alpha_N$, that provide the best possible angular coverage around the watch-circle that the data will allow (e.g., N points uniformly spaced around the circle). At the kth sample point, the local value of $x[\alpha_k]$ is calculated as the average speed over ground observed over a short arc segment centered around $\alpha_k$:

$$x[\alpha_k] = \frac{1}{\Delta\alpha}\int_{\alpha_k - \frac{\Delta\alpha}{2}}^{\alpha_k + \frac{\Delta\alpha}{2}} |v_{OG}(\alpha)|\, d\alpha,$$

which is also equivalent to averaging over a short time window centered around the corresponding sample time, $t_k$, when $\alpha(t_k) = \alpha_k$:

$$x[t_k] = \frac{1}{\Delta t}\int_{t_k - \frac{\Delta t}{2}}^{t_k + \frac{\Delta t}{2}} |v_{OG}(\tau)|\, d\tau.$$

Increasing the length of the averaging window, $\Delta t$ or $\Delta\alpha$, allows short-term unsteady vehicle motions to be rejected (e.g., float displacement velocities from individual waves). However, given the non-linear dependence of the speed-over-ground on the vehicle's heading, the averaging window length also should not exceed a few degrees of arc. Particular care should be taken when using time averaging in the neighborhood of the maximum speed over ground observations, as the SOG peak can be quite narrow when plotted as a function of time. For this reason, is it generally better to calculate the SOG observations, $x[\alpha_k]$, by averaging over arc lengths.

The model fit errors, $\hat{x}[\alpha_k, \Theta] - x[\alpha_k]$, are subject to noise in the SOG observations, of course, but are particularly sensitive to errors in the model parameter estimates that are used to calculate the $\hat{x}[\alpha_k, \Theta]$ values. The model parameter estimates can be iteratively improved using a gradient descent algorithm. Starting from an initial guess of the model parameter values, $\Theta_0$, each iteration "descends" towards the minimum mean-square error by stepping in the direction of the error gradient, as follows:

$$\Theta_i = \Theta_{i-1} - \eta \cdot \nabla MSE(\Theta_{i-1}),$$

where $\eta$ is a tunable parameter that determines the size of the step that is taken in each iteration. The iteration is stopped when the step size is less than a given tolerance, indicating arrival at the minimum mean-square error (MSE) for the given data, or when a maximum number of iterations has been reached. There a several different schemes for choosing appropriate values for η to promote rapid convergence. Most scientific computing environments and programming languages provide utility functions to implement several variants of the gradient descent algorithm.

The gradient of interest is the vector of partial derivatives of the $MSE(\Theta_i)$ with respect to individual model parameters in the $i^{th}$ iteration of the optimization algorithm. The gradient vector at each iteration step is given by the following:

$$\nabla MSE(\Theta_i) = \left[ \frac{\partial MSE(\Theta_i)}{\partial \theta_{c,i}}, \frac{\partial MSE(\Theta_i)}{\partial |v_C|_i}, \frac{\partial MSE(\Theta_i)}{\partial |v_{TW}|_i} \right]^T,$$

which, after grouping terms common to all three partial derivatives, is:

$$\nabla MSE(\Theta_i) =$$

$$\frac{2}{N} \sum_{k=1}^{N} (\hat{x}[\alpha_k, \Theta_i] - x[k]) \cdot \left[ \frac{\partial \hat{x}[\alpha_k, \Theta_i]}{\partial \theta_{c,i}}, \frac{\partial \hat{x}[\alpha_k, \Theta_i]}{\partial |v_C|_i}, \frac{\partial \hat{x}[\alpha_k, \Theta_i]}{\partial |v_{TW}|_i} \right]^T.$$

for convenience in calculating the partial derivatives of $\hat{x}[\alpha_k, \Theta_i]$, we first define:

$$C(\alpha(t), i) = C(t, i) = \left( 1 - \frac{|v_C|_i^2}{|v_{TW}|_i^2} \sin^2(\theta_{OG}(t) - \theta_{C,i}) \right)^{\frac{1}{2}},$$

so that $$\hat{x}[\alpha_k, \Theta_i] = |v_{OG}(\alpha(t_k))| = |v_{TW}| C(\alpha(t),i) + |v_C|_i \cos \alpha(t).$$

Then the partial derivatives of the vehicle's modeled speed over ground with respect to the three model parameters can be written as follows:

$$\frac{\partial \hat{x}[\alpha_k, \Theta_i]}{\partial \theta_{C,i}} =$$

$$|v_{TW}|_i C^{-1}(\alpha_k, i) \sin(\theta_{OG}(t) - \theta_{C,i}) \cos(\theta_{OG}(t) - \theta_{C,i}) + |v_C|_i \sin(\theta_{OG}(t) - \theta_{C,i}),$$

$$\frac{\partial \hat{x}[\alpha_k, \Theta_i]}{\partial |v_C|_i} = \cos(\theta_{OG}(t) - \theta_{C,i}) - \frac{|v_C|_i}{C(\alpha_k, i)|v_{TW}|_i^2} \sin^2(\theta_{OG}(t) - \theta_{C,i}), \text{ and}$$

$$\frac{\partial \hat{x}[\alpha_k, \Theta_i]}{\partial |v_{TW}|_i} = C(\alpha_k, i) - \frac{|v_C|_i^2}{C(\alpha_k, i)|v_{TW}|_i^2} \sin^2(\theta_{OG}(t) - \theta_{C,i}).$$

For each iteration, these derivatives are evaluated using the mean values of $\theta_{OG}(t_k)$ for k=1, . . . , N, to produce the gradient of the mean square error for that iteration. Examining the equations for the gradient, we see that contributions to the averaged gradient vector from individual sample points will be greatest where the corresponding model fit errors are high.

If a full circuit of the watch-circle course is completed first, then very good initial estimates for the model parameters, $\Theta_0$, can be derived from the minimum and maximum speed over ground values, as previously described, along with the vehicle headings when the minimum and maximum speeds over ground where achieved. In this case, the gradient descent search for the best parameter fit can be expected to converge in a relatively low number of iterations. The optimal model parameters can then be updated frequently as the vehicle continues around the watch-circle, using data from the trailing 360 around the circuit. This methodology allows variations in vehicle speed-through-water (a function of changing sea state) and in sea current magnitude and direction to be tracked over timescales that are significantly less than the full circuit time.

I.A.i Time Varying Model Parameters.

In general, the model parameters are not constant. Current magnitude and direction will change over tidal timescales and/or bathymetry-dependent length scales. Similarly, a vehicle's wave propulsion speed performance will vary with sea state conditions, with correlation times typically in excess of 1 hour. These slow variations in model parameters can be tracked using common filtering techniques. The watch-circle based methodology described herein allows the model parameters to be continuously tracked using the trailing 360 degrees of data from the current position, ensuring sufficient update rates to observe smoothly varying model parameter changes.

I.A.ii Float Versus Glider Position and Speed-Over-Ground.

The following applies to the vehicle shown in FIG. 1A. The vehicle global positioning system sensor measures the float's position and velocity over ground. As waves impinge upon the float, the float will experience surge and sway displacements with respect to the glider's instantaneous position. These motions cause apparent variations in vehicle speed-over-ground that are not physical, or at least only partially so in very large sea state conditions. For best accuracy, the methodology described above should be applied to the position and velocity of the glider instead of the float. Perturbations in the observations can be reduced by low-pass filtering the Float position and speed-over-ground. In higher sea states, it would be more accurate to estimate the position of the glider using umbilical length (assumed taut) and glider roll and pitch angles to back project from the float position, before applying the low-pass filter.

I.B. Introducing Cross-Track Error.

In developing the methodology above, it was assumed that the vehicle is capable of following a watch-circle course with negligible cross-track error. While this is often the case, many factors can cause non-negligible cross-track errors, such as wave-induced sway displacements in higher sea states and/or navigation errors that can occur when a vehicle is heading directly into a strong water current. This latter situation can occur across a wide range of current magnitudes since the effect is relative to the vehicle's current speed through the water, which varies with sea state. The methodology above can be generalized to account for such errors, so long as the glider's heading with respect to its course-over-ground (COG) can be independently observed. In this case, $\beta(t)$ is no longer a function of $\alpha(t)$ alone. The observed cross-track error velocity is equal to the change in the circle radius as a function of time, as follows:

$$\dot{R}(t) = |v_{OG,\perp}(t)| = |v_{TW}| \sin \beta(t) + |v_C| \sin \alpha(t),$$

where $\dot{R}(t)$ and $\beta(t)$ are observed measurements. Similarly, the vehicle's along course advance rate is given by the following:

$$R(t)\dot{\theta}_{\parallel}(t) = |v_{OG,\parallel}(t)| = |v_{TW}| \cos \beta(t) + |v_C| \cos \alpha(t),$$

where the vehicle's along-track angular velocity, $\dot{\theta}_{\parallel}(t)$, and $R(t)$ are observed measurements. Note that $\alpha(t)$ and $\beta(t)$ are still defined with respect to the instantaneous course-over-ground, but $\theta_{OG}(t)$ is not always coincident with $\theta_{\parallel}(t)$, the along-track heading (i.e., the desired course-over-ground). Squaring and adding these two equations, we have:

$$|v_{OG}(t)|^2 = |v_{TW}|^2 + |v_c|^2 + 2|v_{TW}||v_C|\{\cos\beta(t)\cos\alpha(t) + \sin\beta(t)\sin\alpha(t)\}$$
$$= |v_{TW}|^2 + |v_c|^2 + 2|v_{TW}||v_C|\cos(\beta(t) - \alpha(t))$$
$$= |v_{TW}|^2 + |v_c|^2 + 2|v_{TW}||v_C|\cos(\theta_{TW}(t) - \theta_C),$$

where $\theta_{TW}(t)$ is the measured heading of the glider. This set of equations assumes that the glider does not sideslip through the water, a reasonable assumption in all but the most extreme sea states. We take the square-root of this quantity and proceed as before to iteratively refine the model parameters to minimize the mean-squared disagreement between the modeled and observed vehicle speed over ground. Employing the simplifying notations $\hat{x}[\alpha_k, \Theta_i]=\hat{x}[t_k, \Theta_i]$ and $x[\alpha_k]=x[t_k]$, the partial derivatives for the gradient of the mean square error are:

$$\frac{\partial \hat{x}[t_k, \Theta_i]}{\partial \theta_{C,i}} = \frac{|\hat{V}_{TW}|_i|\hat{V}_C|_i\sin(\theta_{TW}(t) - \hat{\theta}_{C,i})}{\sqrt{|\hat{V}_{TW}|^2 + |\hat{V}_c|^2 + 2|\hat{V}_{TW}||\hat{V}_C|\cos(\theta_{TW}(t) - \hat{\theta}_C)}},$$

$$\frac{\partial \hat{x}[t_k, \Theta_i]}{\partial |v_C|_i} = \frac{|\hat{V}_C|_i + |\hat{V}_{TW}|_i\cos(\theta_{TW}(t) - \hat{\theta}_{C,i})}{\sqrt{|\hat{V}_{TW}|^2|\hat{V}_c|^2 + 2|\hat{V}_{TW}||\hat{V}_C|\cos(\theta_{TW}(t) - \hat{\theta}_C)}}, \text{ and}$$

$$\frac{\partial \hat{x}[t_k, \Theta_i]}{\partial |v_{TW}|_i} = \frac{|\hat{V}_{TW}|_i + |\hat{V}_C|_i\cos(\theta_{TW}(t) - \hat{\theta}_{C,i})}{\sqrt{|\hat{V}_{TW}|^2|\hat{V}_c|^2 + 2|\hat{V}_{TW}||\hat{V}_C|\cos(\theta_{TW}(t) - \hat{\theta}_C)}},$$

where the denominator is simply the modeled magnitude of the vehicle's speed over ground. Cancelling like terms, the gradient of the mean square error is as follows:

$$\nabla MSE(\Theta_i) = \frac{2}{N}\sum_{k=1}^{N}\left(\left(1 - \frac{x[\alpha_k]}{\hat{x}[t_k, \Theta_i]}\right) \cdot \begin{bmatrix} |\hat{V}_{TW}|_i|\hat{V}_C|_i\sin(\theta_{TW}(t) - \hat{\theta}_C) \\ |\hat{V}_C|_i + |\hat{V}_{TW}|_i\cos(\theta_{TW}(t) - \hat{\theta}_C) \\ |\hat{V}_C|_i + |\hat{V}_C|_i\cos(\theta_{TW}(t) - \hat{\theta}_C) \end{bmatrix}\right).$$

The short-term averaged SOG observations, $x[t_k]$, also account for the longer path-length that the vehicle takes by normalizing the quantity against the total path length over the angular averaging window. An iterative optimization algorithm is then employed as before to iteratively improve the model parameter estimates. This process is repeated after each new data point is obtained.

FIG. 6 shows navigation plots of six circuits of a water vehicle executing a watch-circle navigation course in water, in accordance with one or more embodiments. Graph (600) shows actual data taken of water vehicle courses around a watch-circle. Each different line shows a different circuit. SOG, COG, and CTW were estimated as two-minute moving averages of the raw data. Thus, the data shown in FIG. 6 may be applied to the equations described above, as well as those further below, where appropriate.

FIG. 7A through FIG. 7F should be considered together. FIG. 7A (graph 700) shows graphs of observed and modeled vehicle speed-over-ground versus course-through-water at a first time, in accordance with one or more embodiments. FIG. 7B (graph 702) shows graphs of observed and modeled vehicle speed-over-ground versus course-through-water at a second time, in accordance with one or more embodiments.

FIG. 7C (graph 704) shows graphs of observed and modeled vehicle speed-over-ground versus course-through-water at a third time, in accordance with one or more embodiments. FIG. 7D (graph 706) shows graphs of observed and modeled vehicle speed-over-ground versus course-through-water at a fourth time, in accordance with one or more embodiments. FIG. 7E (graph 708) graphs of observed and modeled vehicle speed-over-ground versus course-through-water at a fifth time, in accordance with one or more embodiments. FIG. 7F (graph 710) graphs of observed and modeled vehicle speed-over-ground versus course-through-water at a sixth time, in accordance with one or more embodiments.

The graphs shown in FIG. 7A through FIG. 7D reflect real data taken with an experimental water vehicle. The times shown are the end of successive data collection period. Each circuit around the watch-circle takes approximately 15 minutes to complete. Raw data for vehicle speed-over-ground (SOG) and course-through-water (CTW) are smoothed with a 2-minute moving average, and interpolated onto a common time-base before processing with a gradient-descent algorithm to produce estimates of vehicle speed-through-water (STW) and current magnitude and direction.

FIG. 7A through FIG. 7F show that the one or more embodiments described above accurately model speed-over-ground, course-through-water, and speed-through-water. The speed of the vehicle was observed directly with a speed sensor. The speed of the vehicle was also modeled independent of the speed sensor according to the one or more embodiments described above. As shown by the different lines of modeled versus observed values, the one or more embodiments provide a successful means for modeling the SOG, CTW, and STW without the use of a direct speed sensor.

FIG. 8A through FIG. 8F should be viewed together. FIG. 8A shows a graph (800) of a difference between course-through-water and course-over-ground, versus course-through-water, at a first time, in accordance with one or more embodiments. FIG. 8B shows a graph (802) of a difference between course-through-water and course-over-ground, versus course-through-water, at a second time, in accordance with one or more embodiments. FIG. 8C shows a graph (804) of a difference between course-through-water and course-over-ground, versus course-through-water, at a third time, in accordance with one or more embodiments. FIG. 8D shows a graph (806) of a difference between course-through-water and course-over-ground, versus course-through-water, at a fourth time, in accordance with one or more embodiments. FIG. 8E shows a graph (808) of a difference between course-through-water and course-over-ground, versus course-through-water, at a fifth time, in accordance with one or more embodiments. FIG. 8F shows a graph (810) of a difference between course-through-water and course-over-ground, versus course-through-water, at a sixth time, in accordance with one or more embodiments.

FIG. 8A through FIG. 8F again represent real data taken while experimenting with a water vehicle. FIG. 8A through FIG. 8F show the variation of vehicle "crab angle" (CTW-COG) with course-through-water. Sharp variations in vehicle SOG in FIG. 7A through FIG. 7F are often correlated with spikes in vehicle crab angle. These spikes may be attributable to real-time navigation anomalies or compass calibration errors.

FIG. 9A through FIG. 9C should be read together. FIG. 9A shows a graph (900) of vehicle speed-through-water versus time, in accordance with one or more embodiments. FIG. 9B shows a graph (902) of current magnitude versus time, in accordance with one or more embodiments. FIG. 9C shows a graph (904) of water current direction versus time, in accordance with one or more embodiments.

FIG. 9A through FIG. 9C again represent real data taken while experimenting with a water vehicle. FIG. 9A through FIG. 9C show variation of model parameter estimates over time, with estimates recomputed with every 30 degrees of additional arc of the vehicle's course-through-water (CTW). Each estimate is made from data taken over the trailing 360 degrees of CTW. Collections of every 12th estimate (e.g., the filled circles) form sets of independent parameter estimates calculated from non-overlapping data. The estimate's slow variation over time supports the underlying assumption that the current magnitude and direction and the vehicle's average speed-through-water vary slowly with respect to the time taken to complete each circuit around the watch-circle.

I.B.i First Alternative Model Parameter Estimation Process.

The model parameter estimation process described in section I.A. included an assumption that the vehicle could, on average, null its cross-track error while navigating a closed course. This assumption eliminated the need to directly measure the vehicles course through the water (CTW). The following is an alternative approach that removes this assumption and employs an iterative Newton-Raphson optimization algorithm to accelerate the processing algorithms convergence to the optimal parameter estimates.

As long as thruster revolutions per minute (RPM) are held constant (typically zero for an wave- or wind-propelled vehicle), a vehicle's average speed-through-water (STW), denoted by $|v_{T_w}|$, will vary slowly in a fixed location, since sea state and/or average winds also vary slowly. The current magnitude, $|v_C|$, and direction, $\theta_C$, will also vary slowly at a fixed location.

The average speed-over-ground (SOG) of the water vehicle, $|v_{OG}(t)|$, is the magnitude of the sum of a vehicle's short-term average speed-through-water (STW) and the water current vectors, and varies with the vehicle's course with respect to the current direction. The average SOG is defined by:

$$|v_{OG}(t)|=|v_{OG}(\theta_{TW}(t))|=|v_{TW}|^2+|v_C|^2+2|v_{TW}||v_C|\cos(\theta_{TW}(t)-\theta_C) \quad (1)$$

The average SOG, $|v_{OG}(t)|$, as a function of time is calculated from raw Float GPS data by low-pass filtering to remove unsteady accelerations from individual waves. Short-term average CTW, denoted by $\theta_{TW}(t)$, is calculated by low-pass filtering the compass heading of the vehicle. The values of $|v_{TW}|$, $|v_C|$, and $\theta_C$ can then be estimated from $|v_{OG}(t)|$ and $\theta_{TW}(t)$, given a range of CTW observations.

Let the short-term average observed SOG and CTW be given by:

$$x(t) = \frac{1}{\Delta T}\int_{\tau_k-\frac{\Delta T}{2}}^{\tau_k+\frac{\Delta T}{2}} |v_{OG}(\tau)|d\tau \text{ and} \quad (2)$$

$$\hat{\theta}_{TW}(t_k) = \frac{1}{\Delta T}\int_{\tau_k-\frac{\Delta T}{2}}^{\tau_k+\frac{\Delta T}{2}} \theta_{TW}(\tau)d\tau \quad (3)$$

Defining the model parameter vector as $\Theta=(\theta_1, \theta_2, \theta_3)=(|V_{TW}|, |V_C|, \theta_C)$, the modeled average SOG is provided by Equation 1:

$$\hat{x}(t_k,\Theta_i)=\sqrt{\theta_1^2+\theta_2^2+2\theta_1\theta_2\cos(\theta_{TW}(t_k)-\theta_3)}$$

Optimize the model parameter estimates by iteratively minimizing the mean square error between the averaged SOG observations and the modelled average SOG:

$$\text{MSE}(\Theta_i)=\Sigma_{k=1}^{N}(\hat{x}[t_k,\Theta_i]-x[t_k])^2$$

The objection function may be minimized using gradient descent. Starting from an initial estimate of the model parameters, $\Theta_0=(|\hat{v}_{TW}|_0, |\hat{v}_C|_0, \hat{\theta}_0)$, iteratively refine the model parameters by "descending" the gradient of the MSE:

$$\Theta_{i+1}=\Theta_i-\eta \cdot \nabla\text{MSE}(\Theta_i), \text{ with } 0<\eta<<1,$$

and where the gradient of the MSE at the $i^{th}$ iteration is given by:

$$G(\Theta_i) = \nabla MSE(\Theta_i) =$$

$$\nabla\left\{\frac{1}{N}\sum_{k=1}^{N}(\hat{x}[t_k,\Theta_i]-x[t_k])^2\right\} = \frac{2}{N}\sum_{k=1}^{N}\left(\frac{\hat{x}[t_k,\Theta_i]-x[t_k]}{\hat{x}[t_k,\Theta_i]}\right)\cdot g[t_k,\Theta_i]^T$$

where for convenience of notation we have defined $$g[t_k,\Theta_i]=[\theta_{1,i}+\theta_{2,i}\cos(\theta_{TW}(t_k)-\theta_{3,i});\theta_{2,i}+\theta_{1,i}\cos(\theta_{TW}(t_k)-\theta_{3,i});\theta_{1,i}\theta_{2,i}\sin(\theta_{TW}(t_k)-\theta_{3,i})]^T$$

so that $\nabla\{\hat{x}[t_k,\Theta_i]\}=g[t_k,\Theta_i]_T/\hat{x}[t_k,\Theta_i]$.

Iterate until the gradient magnitude is below a specified tolerance, indicating arrival at the global minimum of the convex objective function.

The objection function also may be minimized using Newton's method, with line search. By taking the curvature of the cost function into account, Newton's method converges much faster than gradient descent. Compute the Hessian of the MSE with respect to $\Theta$ (the matrix of partial second derivatives):

$$H(\Theta_i) =$$

$$\nabla^T(G(\Theta_i)) = \nabla^T \nabla MSE(\Theta_i) = \frac{2}{N}\sum_{k=1}^{N}\nabla^T\left\{\left(1-\frac{x[t_k]}{\hat{x}[t_k,\Theta_i]}\right)\cdot g[t_k,\Theta_i]^T\right\}$$

$$H(\Theta_i) =$$

$$\frac{2}{N}\sum_{k=1}^{N}\left(\left\{\nabla^T\left(1-\frac{x[t_k]}{\hat{x}[t_k,\Theta_i]}\right)\right\}\cdot g[t_k,\Theta_i]^T + \left(1-\frac{x[t_k]}{\hat{x}[t_k,\Theta_i]}\right)\cdot\{\nabla^T\cdot g[t_k,\Theta_i]^T\}\right)$$

$$H(\Theta_i) = \frac{2}{N}\sum_{k=1}^{N}\left(\left\{\frac{x[t_k]}{\hat{x}[t_k,\Theta_i]^2}\hat{x}[t_k,\Theta_i]^{-1}g[t_k,\Theta_i]\right\}g[t_k,\Theta_i]_i^T + \left(1-\frac{x[t_k]}{\hat{x}[t_k,\Theta_i]}\right)\cdot\{\nabla^T\cdot g[t_k,\Theta_i]^T\}\right)$$

$$H(\Theta_i) = \frac{2}{N}\sum_{k=1}^{N}\left(\frac{x[t_k]}{\hat{x}[t_k,\Theta_i]^3}g[t_k,\Theta_i]\cdot g[t_k,\Theta_i]^T + \left(1-\frac{x[t_k]}{\hat{x}[t_k,\Theta_i]}\right)\cdot\begin{bmatrix}1 & C_i[t_k] & \theta_{2,i}S_i[t_k]\\ C_i[t_k] & 1 & \theta_{1,i}S_i[t_k]\\ \theta_{2,i}S_i[t_k] & \theta_{1,i}S_i[t_k] & \theta_{1,i}\theta_{2,i}C_i[t_k]\end{bmatrix}\right)$$

where $C_i[t_k]=\cos(\theta_{TW}(t_k)-\theta_{3,i})$ and $S_i[k]=\sin(\theta_{TW}(t_k)-\theta_{3,i})$. The outer product $g[t_k,\Theta_i]\cdot g[t_k,\Theta_i]^T$ is a 3×3 matrix.

Note that the Hessian is symmetric, so only six terms need to be calculated. At each iteration, the step direction is $d_i=H(\Theta_i)^{-1}G(\Theta_i)$ and $\Theta_{i+1}=\Theta_i-\eta d_i$ with $$\eta = \underset{\eta}{\text{argmin}} MSE(\Theta_{i+1}).$$

The value of η that minimizes the objective function is found via a simple bisection line search. Starting with $\eta_{0,-}=0$ and $\eta_{0,+}=2$, compute the MSEs using $\Theta_{i,-}=\Theta_{i-1}-\eta_{i,-}d_i$ and $\Theta_{i,+}=\Theta_{i-1}-\eta_{i,+}d_i$.

For line-search iteration: if $MSE(\Theta_{i,-})<MSE(\Theta_{i,+})$, then set $\eta_{i+1,-}=\eta_{i,-}$ and $\eta_{i+1,+}=(\eta_{i,+}+\eta_{i,-})/2$, and continue to next line-search iteration. If $MSE(\Theta_{i,-})>MSE(\Theta_{i,+})$, then set $\eta_{i+1,-}=(\eta_{i,+}+\eta_{i,-})/2$ and $\eta_{i+1,+}=\eta_{i,+}$, and continue to next line-search iteration. Iterate until abs $(MSE(\Theta_{i,-})-MSE(\Theta_{i,+}))<\epsilon$, where $\epsilon$ is a user defined tolerance.

Individual iterations of the Newton Method are more computationally intensive than gradient decent iterations, but far fewer iterations are required. A solution is typically reached in 30 iterations or less of the Newton Method versus more than 3000 iterations with the gradient descent method. The line search for the best value of η can also improve gradient descent performance.

I.B.ii Second Alternative Model Parameter Estimation Process.

The convex mean-square error function that is minimized in the model parameter estimation process described in section I.B.i. is symmetric with respect to the first two model parameters. Due to this symmetry, it is possible for the "sense" of the two parameters to become swapped during the iterative minimization process, as there is no explicit constraint in the optimization process that $\theta_2<\theta_1$. It is also possible for the first two parameters to erroneously converge to about equivalent values, again due to the inherent symmetry embedded in the mathematical model of the vehicle speed over ground.

An alternative approach is to define the parameters of the vehicle speed over ground model as $\Theta=(\theta_1, \theta_2, \theta_3)=(|V_{TW}|, |V_C|/|V_{TW}|, \theta_C)$. Replacing the current magnitude parameter with the ratio of the current magnitude to vehicle waterspeed ratio mitigates the symmetry issue described above.

In this approach, the model of vehicle speed over ground is:

$$\hat{x}(t_k)=\sqrt{\theta_1^2+\theta_1^2\theta_2^2+2\theta_1^2\theta_2\cos(\theta_3-\theta_{TW}(t_k))}$$

$$\hat{x}(t_k,\Theta)=\theta_1\sqrt{1+\theta_2^2+2\theta_2\cos(\theta_3-\theta_{TW}(t_k))}=\theta_1 g_1(t_k,\Theta)$$

where for convenience we have defined $$g_1(t_k,\Theta)=\sqrt{1+\theta_2^2+2\theta_2\cos(\theta_3-\theta_{TW}(t_k))}.$$

As in sections I.A and I.B.i., the gradient and Hessian of the MSE are functions of the gradient and Hessian of the modeled speed over ground with respect to the model parameters. The gradient of the model is:

$$\nabla\hat{x}(t_k,\Theta)=\nabla(\theta_1 g_1(t_k,\Theta))=(g_1(t_k,\Theta),\theta_1 g_2(t_k,\Theta),\theta_1 g_3(t_k,\Theta))$$

where we have defined additional convenience functions $$g_2(t_k, \Theta) = \frac{\partial}{\partial\theta_2}(g_1(t_k, \Theta)) = \frac{\theta_2 + \cos(\theta_{TW}(t_k) - \theta_3)}{g_1(t_k, \Theta)}, \text{ and}$$

$$g_3(t_k, \Theta) = \frac{\partial}{\partial\theta_3}(g_1(t_k, \Theta)) = -\frac{\theta_2\sin(\theta_{TW}(t_k) - \theta_3)}{g_1(t_k, \Theta)}.$$

The gradient of the MSE is then $$G(\Theta_i) = \nabla MSE(\Theta_i) = \nabla\left\{\frac{1}{N}\sum_{k=1}^{N}(\hat{x}[t_k, \Theta_i] - x[t_k])^2\right\}$$

$$G(\Theta_i) = \frac{2}{N}\sum_{k=1}^{N}(\hat{x}[t_k, \Theta_i] - x[t_k])\cdot\nabla\hat{x}[t_k, \Theta_i]$$

and the Hessian of the MSE is $$H(\Theta_i) = \frac{2}{N}\sum_{k=1}^{N}(\nabla^T\hat{x}[t_k, \Theta_i]\cdot\nabla\hat{x}[t_k, \Theta_i] + (\hat{x}[t_k, \Theta_i] - x[t_k])\cdot\nabla^2\hat{x}[t_k, \Theta_i])$$

$$H(\Theta_i) = \frac{2}{N}\sum_{k=1}^{N}\left\{\begin{bmatrix} g_{1,i}g_{1,i} & g_{1,i}\theta_{1,i}g_{2,i} & g_{1,i}\theta_{1,i}g_{3,i} \\ g_{1,i}\theta_{1,i}g_{2,i} & g_{2,i}\theta_{1,i}^2g_{2,i} & g_{2,i}\theta_{1,i}^2g_{3,i} \\ g_{1,i}\theta_{1,i}g_{3,i} & g_{2,i}\theta_{1,i}^2g_{3,i} & g_{3,i}\theta_{1,i}^2g_{3,i} \end{bmatrix} + \right.$$

$$\left. (\hat{x}[t_k, \Theta_i] - x[t_k])\cdot\begin{bmatrix} 0 & g_{2,i} & g_{3,i} \\ g_{2,i} & \frac{\theta_{1,i}}{g_{1,i}}(1-g_{2,i}^2) & -\frac{\theta_{1,i}}{g_{1,i}}(s_i[t_k]+g_{2,i}g_{3,i}) \\ g_{3,i} & -\frac{\theta_{1,i}}{g_{1,i}}(s_i[t_k]+g_{2,i}g_{3,i}) & -\frac{\theta_{1,i}}{g_{1,i}}(\theta_{2,i}c_i[t_k]+g_{3,i}^2) \end{bmatrix}\right\}$$

where $C_i[t_k]=\cos(\theta_{3,i}-\theta_{TW}(t_k))$ and $S_i[k]=\sin(\theta_{3,i}-\theta_{TW}(t_k))$.

In this approach, it is still possible for the "sense" of the vehicle water speed and the current magnitude to become "swapped", though this happens with significantly less frequency. This eventuality can be further mitigated by monitoring the current to water speed ratio during each iteration of the parameter estimation process, resetting the first two parameters to $\theta_{1,i}$ $\theta_{2,i}$ and $\theta_{2,i}^{-1}$, respectively, whenever $\theta_{2,i}>1$.

II. Current-Adjusted Watch-Circles for Uniform Phase-Space Averaging.

FIG. 10A and FIG. 10B should be considered together. FIG. 10A shows a graph (1000) of courses over ground for current-adjusted (variable-radius) watch-circle courses with a common phase center and a current at ninety degrees at different current magnitudes relative to vehicle speed-through-water, in accordance with one or more embodiments. FIG. 10B shows a graph (1002) of instantaneous current-adjusted (variable-radius) watch-circle courses with a current at ninety degrees and varying current magnitude to water speed ratios, in accordance with one or more embodiments. Note that FIG. 14A and FIG. 14C provide alternative embodiments, described below, for watch polygon courses for one or more vehicles. FIG. 14B. demonstrates how variable-radius courses can be aligned to overlap over ground by adjusting the location of the respective phase-centers of the courses.

FIG. 11A through FIG. 11D show variations of vehicle speed over ground, vehicle course-over-ground, and vehicle crab angle with respect to performing current-adjusted watch-circle navigation of a water vehicle. Specifically, FIG. 11A shows a graph (1100) of speed-over-ground versus course-over-ground for a current-adjusted watch-circle with varying water current magnitudes, in accordance with one or more embodiments. FIG. 11B shows a graph (1102) of course-over-ground versus time for a current-adjusted watch-circle with varying water current magnitudes, in accordance with one or more embodiments. FIG. 11C shows a graph (1104) of speed-over-ground versus time for a current-adjusted watch-circle with varying water current magnitudes, in accordance with one or more embodiments. FIG. 11D shows a graph (1106) of a difference between a course-through-water and a course-over-ground, versus time, for a current-adjusted watch-circle with varying water current magnitudes, in accordance with one or more embodiments.

FIG. 12A through FIG. 12C compare certain aspects of vehicle navigation performance with respect to executing either standard watch-circle or current-adjusted watch-circle navigation of a water vehicle. FIG. 12A shows a graph (1200) of average speed-over-ground divided by speed-through-water, relative to current magnitude over vehicle speed-through-water, in accordance with one or more embodiments. FIG. 12B shows a graph (1202) of full-circuit completion periods for fixed and current-adjusted watch-circle navigation, versus the current magnitude to vehicle water speed ratio, in accordance with one or more embodiments. FIG. 12C shows a graph of the ratio of full-circuit completion periods versus current magnitude over vehicle speed through the water, in accordance with one or more embodiments.

Returning to the plot of COG versus time in FIG. 5B and of SOG versus time in FIG. 5C using standard watch-circle navigation, we note that the vehicle will take much less time to speed through the portion of the watch-circle where its heading is aligned with the current than it does to labor past the portion of the watch-circle where its heading is in opposition to the water current (i.e., sharper peaks and broader valleys). Since the vehicle's sensors are sampled at fixed temporal rates, there will be far fewer data points to average within a unit arc width when the vehicle is in the vicinity of the maximum SOG, than when it is near the minimum SOG portion of the circle. The variable number of data points in each unit arc-length of COG progress around a standard watch-circle course causes varying uncertainty in the uniformly spaced short-term SOG and COG averages (the $x[\alpha_k]$'s) that are the observations from which the model parameter estimates are made. Additionally, the maximum uncertainty occurs in the observation for the maximum SOG, which is a particularly useful single data point in the model parameter estimation algorithm. Furthermore, since the vehicle spends more time sampling the low-SOG portion of the watch-circle, the potential for, and severity of, navigational control problems when operating against a current will increase. For example, oscillating cross-track errors can occur when sailing into a current that is relatively strong in comparison to the vehicle's current STW performance.

To achieve good estimates of vehicle STW and current magnitude and direction, we would prefer to have equal amounts of sensor data in each unit arc-length around the watch-circle course. In other words, we would like to maintain a constant COG rate as the vehicle executes the watch-circle course. Since the vehicle's SOG changes as a function of watch-circle phase, maintaining a constant COG rate requires that the watch-circle radius be adjusted in proportion with the changing SOG. When the vehicle's CTW heading is aligned with the current direction (maximum SOG), the watch-circle radius must be large to provide more data points over a unit arc-width. Conversely, the radius must be small when the vehicle's CTW heading is in opposition to the current, to achieve an equivalent number of sensor samples in a unit arc-width.

For the fixed-radius watch-circle, recall that we previously found that:

$$\dot{\theta}_{OG}(t) = \dot{\alpha}(t) = \frac{1}{R}|v_{OG}(\alpha(t))| = \frac{1}{R}\left(|v_{TW}|\left[1 - \frac{|v_C|^2}{|v_{TW}|^2}\sin^2\alpha(t)\right]^{1/2} + |v_c|\cos\alpha(t)\right).$$

Setting a constant phase speed, $\dot{\theta}_{OG} = |v_{OG,AVG}|/R_*$, where $R_*$ is the fixed radius of the desired circular course-over-ground, we can recast the equation above as an expression for the watch-circle radius as a function of the vehicle's position on the watch-circle, as follows:

$$R(\alpha) = \frac{|v_{OG}(t)|}{\dot{\theta}_{OG}} = R_*\left(\frac{|v_{TW}|}{|v_{AVG}|}\left[1 - \frac{|v_C|^2}{|v_{TW}|^2}\sin^2\alpha\right]^{1/2} + \frac{|v_C|}{|v_{AVG}|}\cos\alpha\right).$$

The maximum and minimum radii occur when $\alpha=0$ and $\pi$, respectively:

$$R(\alpha)|_{max} = R_*\left(\frac{|v_{TW}| + |v_C|}{|v_{AVG}|}\right) \text{ and}$$

$$R(\alpha)|_{min} = R_*\left(\frac{|v_{TW}| - |v_C|}{|v_{AVG}|}\right).$$

The radius with respect to the center of each circle course increases as the current magnitude ratio increases, since the ratio of the vehicle's average speed-through-water to the average speed around the course increases. By allowing $\dot{\theta}_{OG}$ to increase along with the current magnitude ratio, we can adjust R so that the resulting variable radius watch circles all overlap regardless of the value of the current magnitude ratio. This is achieved by setting the following relationship:

$$R_* = R_F\frac{|v_{AVG}|}{|v_{TW}|}$$

where $R_F$ is the radius of the equivalent fixed-radius watch circle. The equation for the variable radius as a function of COG with respect to the current direction becomes, as follows:

$$R(\alpha) = \frac{|v_{OG}(t)|}{\dot{\theta}_{OG}} = R_F\left(\left[1 - \frac{|v_C|^2}{|v_{TW}|^2}\sin^2\alpha(t)\right]^{1/2} + \frac{|v_C|}{|v_{TW}|}\cos\alpha\right).$$

Applying the variable-radius at the origin of the fixed-radius watch-circle would yield a new circular course-over-ground that is offset a distance $R|V_C|/|V_{TW}|$ from the center of the fixed-radius course in the direction towards the point of minimum SOG on the closed course (i.e., $\theta_C + \pi/2$ for clockwise progress around the course). FIG. 10A shows a succession of such courses in the presence of an eastward flowing current with current magnitudes varying from 0 to ⅝th of the vehicle's speed over ground. Note that these courses all share the same origin, shown here at the point (0,0).

Referring back to FIG. 10A, the vehicle will spend an equal amount of time completing the "slow" portion of the course in the shaded area as it does in completing the remainder of the full circuit. FIG. 10B shows the variation of the variable radius as a function of the vehicle's heading over ground. For vehicle navigation purposes, we choose to shift the origins of each current-adjusted watch-circle "back" in opposition to the current direction by a distance of $-|R||V_C|/|V_{TW}|$, yielding perfectly overlapping circular courses over ground, independent of the current magnitude and direction so long as $|V_C|<|V_{TW}|$. The new origins will lie $|V_C|/|V_{TW}|^{th}$ of the way from the geometric center back towards the point of minimum SOG.

The reader should carefully note that the value of the variable radius is dependent on the vehicle's course-over-ground, not the phase-angles with respect to the various possible new origins.

The shape of the resulting course-over-ground, as shown in FIG. 10A, remains circular. However, the origin of the variable radius watch circle is now offset from the center of the circle. Since we are free to choose any desired target heading rate, the radius of the circular course-over-ground can be increased to favor lower estimation uncertainty or decreased to allow shorter full circuit cycle times and more frequent model parameter estimate updates. However, the heading rate cannot exceed a maximum rate implied by the vehicle's heading-averaged SOG (i.e., the average SOG over one complete cycle of COG, which is strictly less than the average speed-through-water in the presence of a current).

The heading-averaged SOG is:

$$|v_{OG,AVG}| = \oint_0^{2\pi} v_{OG}(\alpha) d\alpha,$$

and the maximum possible constant COG turn-rate is $\dot{\theta}_{OG,max}(t) = |v_{OG,AVG}|/R$. In general, the radius of the desired circular course-over-ground can be adjusted to maintain a desired heading rate, for the sake of consistency in the model parameter estimation process. Integrating this expression, yields the following:

$$\theta_{OG}(t) = \frac{|v_{OG,AVG}|}{R} t.$$

This equation shows one an advantage of current-adjusted watch-circle navigation. In particular, the time required to complete each full circuit of the variable-radius watch-circle is now only weakly dependent of the current magnitude, so long as the current magnitude does not exceed the vehicle's speed through the water. In practice, $R(\alpha)_{min}$ should not be allowed to fall below some minimum value, $R_{min}$, which in turn implies a maximum current magnitude to vehicle STW ratio above which current-adjusted watch-circle navigation should not be used.

Returning to FIG. 11A through FIG. 11D, these figures show SOG as a function of COG, as well as COG, SOG, and CTW-COG as functions of time for a succession of current-adjusted watch-circle courses in the presence of a water current at 60 degrees with magnitudes varying from ⅙th to ⅚th of the vehicles speed-through-water (STW). All quantities are plotted in comparison with a 150 meter fixed-radius watch-circle executed in the absence of a current. Comparing FIG. 11A with FIG. 5A, the corresponding figure for fixed radius watch-circle navigation, we see that the variable radius watch-circles do not alter the relationship between a vehicle's speed over ground versus its course-over-ground, with respect to the current speed and direction. However, comparing FIG. 11B through FIG. 11D, with corresponding plots for fixed-radius watch-circle navigation in FIG. 5B thorough FIG. 5D, one can see that variable-radius watch-circle navigation has the effect of "smoothing" the variability of vehicle COG, SOG, and crab-angle versus time. Indeed, the vehicle's COG, FIG. 11B, now varies linearly with time, with the slope of the line determined by the current magnitude to water speed ratio. One can also see that the sharp peaks in the SOG versus time curves in FIG. 5C are significantly broader using variable-radius navigation, FIG. 11C. Thus, FIG. 11C validates the desired effect of maintaining about equivalent numbers of samples per arc-length of COG.

More importantly, the time to complete each full circuit of the circular course-over-ground is much faster in the presence of a strong relative current, as shown in FIG. 11B through FIG. 11D, in comparison with FIG. 5B through FIG. 5D. For example, looking at FIG. 5C and FIG. 11C, and focusing on curve (524) in FIG. 5C, corresponding to current magnitudes of 1.25 kt (⅚th of the vehicle's STW), we see that the it takes 82.5 minutes for the vehicle to complete one circuit around the fixed-radius watch-circle. This time can be compared to only about 25 minutes per circuit, FIG. 11C., with variable-radius navigation under the same current conditions, a reduction of 70% in circuit completion time.

FIG. 12A compares vehicle average speed through the water around a full circuit of a watch-circle using fixed-radius and variable-radius watch-circle navigation, where the average SOG around a full circuit is defined as perimeter length of the course divided by the time taken by a vehicle to complete each circuit of the course. FIG. 12B directly compares the full-circuit periods for fixed-radius and variable-radius watch-circuit navigation. FIG. 12B. also shows that the fixed-radius cycle period heads rapidly toward infinity for current magnitudes of 90% or more of the vehicle's speed through the water. In contrast, FIG. 12B shows that the time required to complete each circle using variable-radius navigation is much less effected by increasing current magnitude to water speed ratio. FIG. 12C plots the ratio of the fixed-radius to variable-radius full-circuit periods, and shows that fixed-radius watch-circle navigation takes about six times longer to complete each circuit as the current to water speed ratio approaches 90%.

The plots of FIG. 12A through FIG. 12C also show that variable-radius navigation allows the effective operational envelope of watch-circle navigation to expand almost all the way to parity between the current magnitude and the prevailing STW. This result is useful in the common scenario where the vehicle's STW is low due to very low sea state, even when current magnitude is also low.

Furthermore, by spending less time fighting the current around the slowest portion of the circle, variable-radius navigation reduces the prevalence of unwanted navigation perturbations that can occur when navigating into a relatively strong current (higher current magnitude to water speed ratio). This feature is particularly desirable in the context of the vehicle towing submerged payloads, since navigation-induced perturbations of payload degrade payload performance. Of course, current-adjusted watch-circle navigation can only be used when the vehicle's STW and the water current magnitude and direction are already approximately known. After the vehicle has completed at least one initial circuit around a standard watch-circle and model parameter estimates have been made, then the vehicle's navigation can be switched over to current-adjusted watch-circle control at any point without causing discontinuities in the course-over-ground. Small errors in the model parameter estimates will result in relatively small variations in heading rate and will not adversely affect execution of the variable radius watch-circle. Indeed, such errors are to be expected as the water current magnitude and direction and the prevailing sea state conditions slowly vary over the course of each circuit around the watch-circle.

Using current-adjusted watch-circle navigation will result in short-term averaged SOG estimates (the $x[\alpha_k]$'s) with uniform estimation uncertainties that are not dependent upon watch-circle phase. Variable-radius watch-circle navigation will also minimize the duration of any cross-track navigation error oscillations in the vicinity of the minimum SOG portion of the circle by reducing the amount of time that the vehicle spends in this region. Finally, since the current-adjusted watch-circle spends less time in the "slow" portion of the circle, and more time in the "fast" portion, the time to complete each full circuit is significantly reduced with respect to that of the fixed-radius watch circle (e.g., a 70% reduction in time used in the case of a 1.5 kt vehicle speed-through-water and a 1.25 knot current).

II.A. Implementing Variable-Radius Watch-Circle Navigation.

Attention is now turned to the details of implementing a variable-radius watch-circle navigation for a vehicle moving through a water when the vehicle is subject to advection. As was mentioned briefly above, the variable-radius watch-circle's course-over-ground exactly overlaps that of the fixed-radius watch-circle course. The equation for $R(\alpha(t))$ above defined a radius as a function of heading relative to the prevailing current (i.e., $\alpha(t)=\theta_{OG}(t)-\theta_C$) that results in a constant COG heading rate, $\dot{\theta}_{OG}(t)=|v_{OG,AVG}|/R$, with respect to the center of the watch-circle as the vehicle executes each circuit around the course. However, the vehicle's navigation will be performed with respect to the origin of the variable radius watch-circle. If the center of the desired circular course with radius R is at $\mathbb{O}_f=(N_0, E_0)$, then the origin of the variable-radius watch-circle will be as follows:

$$\mathbb{O}_{vr} = \mathbb{O}_f - \frac{|v_C|}{|v_{TW}|} R \cdot \left(\cos\left(\theta_C + \frac{\pi}{2}\right), \sin\left(\theta_C + \frac{\pi}{2}\right)\right) =$$

$$\mathbb{O}_f - \frac{|v_C|}{|v_{TW}|} R \cdot (\sin(\theta_C), -\cos(\theta_C)),$$

for clockwise progress around the course. The relationships between the vehicle's instantaneous course-over-ground, $\theta_{OG}(t)$, and the vehicle's phase-angle with respect to the origin the variable-radius watch-circle, $\theta_{VR}(t)$, are:

$$\theta_{VR}(t) = \tan^{-1}\left(\frac{\sin(\theta_{OG}(t) - \theta_C)}{\cos(\theta_{OG}(t) - \theta_C) + \frac{|v_C|}{|v_{TW}|}}\right) - \theta_C, \text{ and}$$

$$\theta_{OG}(t) = \tan^{-1}\left(\frac{R(\theta_{VR}(t) - \theta_C)\sin(\theta_{VR}(t) - \theta_C)}{R(\theta_{VR}(t) - \theta_C)\cos(\theta_{VR}(t) - \theta_C) + R\frac{|v_C|}{|v_{TW}|}}\right) - \theta_C.$$

To maintain a constant heading rate over ground, current-adjusted watch-circle navigation uses a time-varying turn rate in the vehicle's course through the water. The vehicle's through-water turn rate is the current-adjusted watch-circle phase rate, $\dot{\theta}_{VR}(t)$. Since sharp turns can cause a vehicle to slow significantly, $\dot{\theta}_{VR}(t)$ r should remain suitably low so as not to violate the assumption that the vehicle's short-term averaged speed-through-water is constant over the duration of a single circuit around the watch-circle.

Differentiating the equation for $\theta_{VR}(t)$ above (and after cancelling terms when possible), we find that:

$$\dot{\theta}_{TW}(t) = \dot{\theta}_{VR}(t) = \left(\frac{1}{1 + \frac{|v_C|}{|v_{TW}|}\cos(\theta_{OG}(t) - \delta_C)}\right)\dot{\theta}_{OG}(t),$$

where dependence on $\alpha(t)$ is implicit. Disregarding possible cross-track error perturbations for the moment, this equation provides that the control law embodied in the variable-radius watch-circle navigation algorithm will adjust the rudder bias angle (i.e., the slowly varying portion of the rudder command) to achieve the desired CTW turn rate, $\dot{\theta}_{TW}(t)$, as a function of the vehicle's current COG, $\theta_{OG}(t)$. The above equation also implies that the maximum through-water turn rate and the minimum through-water turn rate depend solely on the relative magnitudes of the current and the vehicle's SOG, as shown in the following:

$$\left.\frac{\dot{\theta}_{TW}(t)}{\dot{\theta}_{OG}(t)}\right|_{min} = \left(\frac{1}{1 + \frac{1|v_C|}{|v_{TW}|}}\right) = \frac{|v_{TW}|}{|v_{TW}| + |v_C|} \text{ and}$$

$$\left.\frac{\dot{\theta}_{TW}(t)}{\dot{\theta}_{OG}(t)}\right|_{max} = \left(\frac{1}{1 - \frac{1|v_C|}{|v_{TW}|}}\right) = \frac{|v_{TW}|}{|v_{TW}| - |v_C|}.$$

As an example, if the vehicle's STW is 1.5 kt and there is a 1.25 kt current ($|v_C|/|v_{TW}|=5/6$), and the vehicle is navigating a variable-radius watch-circle course with a reference radius of 150 m, then the vehicle's average SOG around the full circle will be 1.19 kt, with a constant heading rate of $\dot{\theta}_{OG}(t)=0.23°/s$. In this case, the vehicle's maximum turn rate through the water would be $\dot{\theta}_{TW}(t)=1.4°/s$, or six times faster than the constant COG heading rate.

It is also possible to determine acceptable CTW turn rate limits that do not adversely affect vehicle STW. Regardless, the reference radius for the variable-radius watch-circle can be increased to achieve CTW turn rates that remain below some prescribed maximum value.

II.B Geometry of Watch Circle Navigation Courses.

FIG. 13A shows an example of a standard watch-circle navigation course (1300), in accordance with one or more embodiments. FIG. 13B shows an example of a current-adjusted (variable-radius) watch-circle navigation course (1302), in accordance with one or more embodiments. The current-adjusted variable-radius watch-circle course of FIG. 13B provides some of the geometry of the variable-radius watch-circle course shown in FIG. 10A and FIG. 10B. FIG. 13A and FIG. 13B also show the methodology and some advantages of the one or more embodiments.

Using current-adjusted, variable radius watch-circles keeps the vehicle from becoming stuck in the slowest portion of the circle where its course is in direct opposition with the prevailing ocean current. As the ratio of the current magnitude to vehicle water speed increases beyond 0.5, the time required to complete one full circuit around a standard watch circle (FIG. 13A) grows rapidly. The time to complete a current-adjusted watch-circle (FIG. 13B) grows much more slowly. At a current magnitude to water speed ratio of 0.9, it would take a water vehicle six times longer to complete one circuit around a standard watch-circle (FIG. 13A) versus a current-aware watch circle (FIG. 13B).

The methodology and mathematics are now addressed. Set the vehicle's "phase speed" around the circle to a constant, $\dot{\theta}_{OG}=|v_{AVG}|/R_*$, where $R_*$ is the equivalent fixed radius of the circular course-over-ground. We then solve for the variable radius $R(\alpha(t))$ that maintains constant $\dot{\theta}_{OG}$:

$$R(\alpha) = \frac{|v_{OG}(\alpha)|}{\dot{\theta}_{OG}} = R_*\left(\frac{|v_{TW}|}{|v_{AVG}|}\left[1 - \frac{|v_C|^2}{|v_{TW}|^2}\sin^2\alpha\right]^{1/2} + \frac{|v_C|}{|v_{AVG}|}\cos\alpha\right)$$

The maximum and minimum variable radii are achieved when $\alpha=0$ and $\pi$, respectively:

$$R(\alpha)_{max/min} = R_*\left(\frac{|v_{TW}| +/- |v_C|}{|v_{AVG}|}\right)$$

Now, we would like the circular course-over-ground to remain constant as the vehicle's STW and/or current magnitude changes. This goal can be achieved by setting $R_*=R_F|v_{AVG}|/|v_{TW}|$, where $R_F$ is the radius of the desired fixed-radius circular course-over-ground. In this case, $\dot{\theta}_{OG}$ will remain constant over $\alpha(t)$, but the value of the constant will decrease as $|v_C|/|v_{TW}|$ increases.

Substituting in for R*, our equation for the variable radius is:

$$R(\alpha) = R_F\left(\left[1 - \frac{|v_C|^2}{|v_{TW}|^2}\sin^2\alpha\right]^{1/2} + \frac{|v_C|}{|v_{TW}|}\cos\alpha\right), \text{ and}$$

$$R(\alpha)_{max/min} = R_F\left(1 \pm \frac{|v_C|}{|v_{TW}|}\right)$$

This equation results in less time spent in the slower portion of the watch speed, thereby increasing the rate at which the vehicle completes the current-adjusted watch-circle.

The core technical contribution embodied by the invention is the derivation of the equations that define the advection-tolerant watch-circle. Interesting elements of this derivation are the location of the modified phase center with respect to the geometric center of the circular course, and the variation of the advection-tolerant watch-circle radius with vehicle heading relative to the advection direction. With these two equations, many different algorithms could be employed to implement vehicle navigation control for the advection-tolerant watch-circle. Note that this embodiment was motivated by, and is intended to be used in concert with the method for joint estimation of vehicle speed and advection rate and direction, as described above. Taken together, these embodiments allow enhanced navigation of relatively slow platforms in advecting waters using only a minimal set of sensors that are typically available on all marine and aerial platforms (GPS/GNSS and Compass).

II.C. Alternatives to Current-Adjusted Watch-Circle Navigation: Variable Polygon Navigation.

As indicated above, the one or more embodiments are not limited to watch-circles. For example, FIG. 14A shows a graph (1400) of watch-polygon courses with overlapping origins (phase centers) with a current at ninety degrees at different current magnitudes relative to vehicle speed-through-water, in accordance with one or more embodiments. FIG. 14B shows a graph (1402) of offsetting of the origins (phase centers) to realign the course geometries over ground, in accordance with one or more embodiments. FIG. 14C shows a graph (1404) of variable-radii to vertices of watch-polygon courses with a current at ninety degrees versus vehicle heading over ground, in accordance with one or more embodiments. In the limit where the number of facets of the polygon approaches a large number (e.g., more than 100), then this embodiment approaches the watch-circle navigation approach described above with respect to FIG. 10A through FIG. 13B.

The watch-polygon navigation assumes that the segments above line (1406) take longer to complete than the segments below the line (1406). The segments below the line (1406) represent when the vehicle is fighting against advection in the water. However, the lower segments are shorter than the upper segments, so the time taken to complete each leg should be identical or about identical. In this manner, a watch-polygon navigation can achieve a similar time-savings effect as the watch-circle navigation described above.

In practice, watch-circles navigation is often implemented using polygonal courses with a large number of sides. That said, the technique is still useful for polygons with a low number of sides, particularly when one vertex is aligned with the slowest point on a circumscribing circular course. The watch-polygon course allows the vehicle to pass through the point in direct opposition to the current while using its maximum turn rate through the water.

Thus, by adjusting the lengths of the legs as a function of vehicle position relative to the phase center, the time required complete each course leg is about the same for all legs, regardless of leg length. This result is advantageous because the maximum average speed over ground around the course may be achieved. In turn, the maximum number of full-circuits around the closed course is achieved in a given time.

The watch-polygon course also ensures that sensors with fixed sampling rates collect equal amounts of data along each COG heading. Using this method allows a vehicle to complete full-circuits more often, thereby allowing water speed and current magnitude and direction to be estimated more frequently. Additionally, the short-term averaged SOG versus COG observations should have similar statistical validity, since they are estimated from equal amounts of data (i.e., equal time spent on each leg of the course).

III. Comparative Speed Performance Analyses and Vehicle Drag.

Attention is now turned to performing comparative speed performance analyses among multiple vehicles performing watch-circle or watch-polygon navigation or other closed courses. Such analyses are useful for understanding the impact of variations of a design or configuration on vehicle speed through the water performance, and thus are useful for updating a design model for a vehicle and designing new vehicles.

The drag force experienced by an object as it moves through a water will vary with its speed through the water, according to the following equation:

$$D = \tfrac{1}{2}\rho C_D S V^2,$$

where $\rho$ is the density of the water ($\approx 1025$ kg/m$^3$, for sea water), $C_D$ is the drag coefficient, S is the wetted surface area of the vehicle (used when skin friction dominates), and V is the speed of the vehicle through the water. The projected frontal area, A, is often used instead of surface area, when "form" drag is more dominant (i.e., the inertial drag associated with accelerating the surrounding water out of the way of the vehicle). Friction and form drag coefficients have been tabulated for a wide range of simple solid shapes as well as for more complex hulls, wings or foils, undulating cables, etc.

For a given shape, the drag coefficient data are parameterized by the non-dimensional Reynolds number of the flow around the shape. The Reynolds number is the fluid flow rate (vehicle speed) times a characteristic length scale for the given shape divided by the kinematic viscosity of the fluid. The Reynolds number indicates the relative importance of inertial vs. viscous forces for a given shape and flow rate. Drag coefficients for complex shapes are often estimated by decomposing the complex shape into a collection of simple shapes, and then summing the drag coefficients for the component shapes. The characteristic length scales for the component shapes can be very different from each other, indicating that the fluid flows across various components may cover a wide range of Reynolds numbers (flow "regimes"). It is well known that this decomposition approach does not account for interactions between the flows around the component shapes, often resulting in lower drag coefficient estimates than those found through controlled experimentation in water tunnel or drag tank. For this reason, highly sophisticated computation fluid dynamic (CFD) models are often employed for very complex shapes that cannot be easily tested in situ, with varying levels of success.

For many shapes, drag coefficient curves as a function of Reynolds number will show a broad plateau of stable $C_D$ values at low Reynolds numbers. This plateau is associated with laminar flow around the body. At some higher Reynolds number, the $C_D$ curve will often dip below the laminar flow plateau, as the body transitions into the turbulent flow regime. The $C_D$ values will then begin to rise again as the Reynolds number increases over several orders of magnitude. For the water vehicle tested, the wave propulsion mechanism may produce an unsteady propulsion force that varies with each passing wave, causing the vehicle to accelerate cyclically and continuously (predominantly in heave and surge). Consequently, we can reasonably assume that the vehicle experiences turbulent flow, even at low speeds.

Given the construction of the water vehicle shown in FIG. 1A, determining an appropriate aggregate value for $C_D$, whether analytically or from empirical tables, would be quite difficult. Indeed, it is not even clear how to establish the appropriate "characteristic" value for a vehicle's surface/wetted area, S, or its projected frontal area, A, as these quantities are affected by differing assumptions that go along with the different ways of calculating the drag coefficient. For any vehicle, though, the combination of $C_D S$ or $C_D A$ will be constant at a given speed (Reynolds number), regardless of the methods used to calculate the individual components.

Note that this is only strictly true at a given speed, since $C_D$ varies with Reynolds number, and Reynolds number varies with speed. Values of $C_D$ can and do vary with vehicle speed, with the greatest change being due to the transition from laminar to turbulent flow. Observing a wave or wind-propelled vehicle's speed-through-water as a function of wave or wind state provides no insight into the total drag forces that it experiences at different speeds.

Given the continuously unsteady acceleration of the water vehicle in FIG. 1A, it is reasonable to assume that the vehicle is in turbulent flow, even when at low speeds through the water. Furthermore, the water vehicle of FIG. 1A experiences a limited range of variation of its speed through the water, from about 0.1 to 2.0 knots, or about one order of magnitude variation in Reynolds number. Using these facts, we will assume in the analysis below that the vehicle's aggregate drag coefficient remains constant across the full, but limited, range of vehicle speeds.

As mentioned earlier, observing a single wind or wave-propelled vehicle's speed performance in different wind or sea states does not provide any insight into the total drag forces experienced by the vehicle as a function of its speed through the water. However, if two or more vehicles are experiencing the same wave conditions, then differences in their relative speeds can be directly linked to differences in their total drag forces, since drag and propulsion forces precisely balance each other, at least when averaged over several wave cycles.

Let us now consider the action of the vehicle thruster of the water vehicle in FIG. 1A. The thruster of this vehicle employs two control laws, revolutions per minute (RPM) and power-limit, that operate simultaneously to achieve a desired RPM value without exceeding a desired input power level. One can command a high RPM value and a low power limit, which has the effect of limiting thruster RPM to some lower value so that thruster power does not exceed the desired limit. However, it is also possible to command a high power limit and a low RPM value, resulting in stable thruster RPMs, so long at the desired RPM value can be achieved without exceeding the power limit.

Now, if we assume that all thruster blades are identical between vehicles, then we can further assume that two or more thrusters will develop identical incremental thrust forces when operating at the same RPM value. Since every vehicle is slightly different, though, we do not necessarily expect identical incremental thrust forces to produce identical changes in different vehicle's speeds through the water.

By simultaneously observing and comparing average speeds through the water for a collection of vehicles over a range of different thruster RPM values, we can directly observe differences in the relative speed performances across the collection of vehicles. Specifically, we tabulate vehicle speed-through-water as a function of thruster RPM (including 0 RPM) for each vehicle, and then compare the resulting curves to assess relative performance. By focusing on the incremental speed change achieved on each vehicle, we remove any dependence in the observation on each vehicle's individual wave-based propulsion performance, so long as all vehicles are experiencing the same sea state conditions over the duration of each speed increment observation.

For two or more vehicles, changing the thruster RPM by the same amount will result in identical incremental thrust forces, and the vehicles' speeds through the water will each increase by differing amounts. Recasting in terms of the drag force that balances the incremental thrust, we have $\Delta T = \Delta D = \frac{1}{2}\rho C_D S(V_1^2 - V_0^2)$, where $V_0$ and $V_1$ are the vehicle's average speeds through the water without and with incremental thrust, respectively. For a collection of several vehicles, designated with letter subscripts, we have the following equation:

$$\Delta T_{0,1} = \Delta D_{0,1} = K_a(V_{a,1}^2 - V_{a,0}^2) = K_b(V_{b,1}^2 - V_{b,0}^2) = \ldots = K_k(V_{k,1}^2 - V_{k,0}^2)$$

where $K_i = \frac{1}{2}\rho C_{D,i} S_i$ is an unknown constant for the $i^{th}$ vehicle that combines all of the non-velocity terms associated with the drag forces. Due to variations in vehicle manufacturing, assembly, configuration, trimming, bio-fouling, etc., $K_i \neq K_j$ in general (i.e., the K constants for the $i^{th}$ and $j^{th}$ vehicles are not necessarily equal). Similarly, $V_{i,n} \neq V_{j,n}$ for $n \in \{0, 1, \ldots, N\}$.

Since we do not know the incremental thrust that is generated from a specific change in thruster RPM, we cannot calculate the individual values of the $K_i$ directly. However, we can directly compare the relative speed changes between vehicles, since we know or assume that the incremental thrusts are all equivalent. Given N observations of speed changes due to N ΔRPM changes, with each ΔRPM applied simultaneous across all vehicles, we can estimate the relative performance of two vehicles (the $i^{th}$ and the $j^{th}$ vehicles) as follows:

$$\hat{K}_{j,i} = \frac{K_j}{K_i} = \frac{C_{D,j} S_j}{c_{D,i} S_i} = \frac{1}{N} \sum_{k=1}^{N} \frac{(V_{i,k}^2 - V_{i,k}^2)}{(V_{j,k}^2 - V_{j,k}^2)}$$

Averaging over different several different ΔRPM values has the effect of averaging out any variations with speed (Reynolds number) in each vehicles aggregate $C_D$ value. The relative performance of all vehicles with respect to each other can then be summarized in a relative performance matrix, expressed as follows:

$$P_{rel} = \begin{bmatrix} 1 & \hat{K}_{b,a} & \cdots & \hat{K}_{N,a} \\ \hat{K}_{a,b} & 1 & \cdots & \hat{K}{N,b} \\ \vdots & \vdots & \ddots & \vdots \\ \hat{K}_{a,N} & \hat{K}_{b,N} & \cdots & 1 \end{bmatrix}$$

In the case where the different vehicles are all configured and trimmed alike (to within best efforts), then the vehicle's wetted areas should all be equivalent. Thus, any relative performance differences between the vehicles can be ascribed to differences in the vehicles' drag coefficients. For otherwise identical vehicles, such differences must arise from variations in the manufacturing process (e.g., variations in hull shape, surface roughness, wing-spring tension or stops, etc.), damage to vehicle components (e.g., bent components, surface roughness, etc.), residual trim or balance differences, or variations in bio-fouling across the vehicles.

In comparison with the traditional approach to comparing different vehicle performance, the method outlined above significantly reduces the time and effort required to gather sufficient data to generate statistically sound estimates of the impacts of different vehicle configurations and designs on speed performance.

III.A. Implementation Considerations.

The technique described above may rely on making reasonably accurate estimates of vehicle speeds through the water, according to the one or more embodiments described above. The algorithm's dependence on the squares of each vehicle's STW at two or more different RPM values will amplify errors in the STW estimates. Accurate knowledge of current magnitude and direction is also helpful to allow STW to be inferred from the vehicle's speed over ground (SOG). If the current magnitude cannot be directly measured using a bottom-mounted acoustic doppler current profiler (ADCP) or other science-grade instrument, then the model parameter estimation technique that was described above should be used to produce the best possible simultaneous estimates of the current speed and direction and each vehicle's STW at the two different RPM values.

The individual speed trials at the two different RPM values involved in each ΔRPM observation should be performed consecutively or as quickly as reasonably possible, to minimize any sea state changes over the duration of the observation. Changing sea state may also change the wave-based propulsion component of each vehicle's STW. Care should be taken to minimize such errors, by averaging over several trials for each unique ΔRPM value.

We also assumed above that the increment trust, ΔT, is a function of the two different RPM values, only. That is, all thrusters would produce the same $\Delta T_{0,1}$ value when stepping from $RMP_0$ to $RPM_1$. This assumption is known not to be true in all cases, since thruster efficiency is also dependent on the speed of the water entering into the thruster. Therefore, if one vehicle's initial STW is significantly higher than another's (e.g., one towing a submerged payload), then the underlying assumption of equal ΔT's for the same ΔRPM may be less accurate. Since thruster efficiency changes with respect to inflow speed typically manifest only over relatively large changes in the inflow velocity, these effects may be negligible in the thruster of the water vehicle of FIG. 1A.

Computing and Manufacturing Systems of Use with Respect to Gathering and Processing Data Described Above, and Using Processed Data to Design and Produce Improved Vehicles.

FIG. 15A shows a computing system, in accordance with one or more embodiments of the invention. FIG. 15B shows a computing network, in accordance with one or more embodiments of the invention. The data collection and analysis described with respect to the one or more embodiments above may be processed using software executing on a computer. Thus, the one or more embodiments may be partially performed using a physical device (i.e., the vehicle) and then partially performed using computer-driven data analysis. Thus, a description of a computer system follows.

FIG. 15A and FIG. 15B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 15A, the computing system (1500) may include one or more computer processors (1502), non-persistent storage device(s) (1504) (e.g., volatile memory, such as random access memory (RAM), cache memory), persistent storage device(s) (1506) (e.g., a hard disk, an optical drive such as a compact disk (CD) drive or digital versatile disk (DVD) drive, a flash memory, etc.), a communication interface (1508) (e.g., Bluetooth interface, infrared interface, network interface, optical interface, etc.), and numerous other elements and functionalities that implement the features and elements of the disclosure.

The computer processor(s) (1502) may be an integrated circuit for processing instructions. For example, the computer processor(s) may be one or more cores or micro-cores of a processor. The computing system (1500) may also include one or more input devices (1510), such as a touchscreen, keyboard, mouse, microphone, touchpad, electronic pen, or any other type of input device.

The communication interface (1508) may include an integrated circuit for connecting the computing system (1500) to a network (not shown) (e.g., a local area network (LAN), a wide area network (WAN) such as the Internet, mobile network, or any other type of network) and/or to another device, such as another computing device.

Further, the computing system (1500) may include one or more output devices (1512), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1502), non-persistent storage device(s) (1504), and persistent storage device(s) (1506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (1500) in FIG. 15A may be connected to or be a part of a network. For example, as shown in FIG. 15B, the network (1520) may include multiple nodes (e.g., node X (1522), node Y (1524)). Each node may correspond to a computing system, such as the computing system shown in FIG. 15A, or a group of nodes combined may correspond to the computing system shown in FIG. 15A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1500) may be located at a remote location and connected to the other elements over a network.

Although not shown in FIG. 15B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1522), node Y (1524)) in the network (1520) may be configured to provide services for a client device (1526). For example, the nodes may be part of a cloud computing system. The nodes may include functionality to receive requests from the client device (1526) and transmit responses to the client device (1526). The client device (1526) may be a computing system, such as the computing system shown in FIG. 15A. Further, the client device (1526) may include and/or perform all or a portion of one or more embodiments of the invention.

The computing system or group of computing systems described in FIGS. 15A and 15B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 15A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 15A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 15A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 15A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 15A and the nodes and/or client device in FIG. 15B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
    operating a plurality of vehicles through a medium, wherein:
        the plurality of vehicles are subject to advection due to movement of the medium,
        the plurality of vehicles are in sufficient proximity to each other that one or more conditions of the medium are about equivalent for the plurality of vehicles;
    applying an incremental sequence of about equivalent thrust forces to the plurality of vehicles to generate about equivalent incremental changes in a plurality of steady-state average drag forces for the plurality of vehicles;
    measuring a plurality of speed changes for the plurality of vehicles; and
    calculating, from the plurality of speed changes, a plurality of relative speed performance statistics for relative speed performance between pairs of vehicles, wherein calculating is performed independently of the one or more conditions of the medium.

2. The method of claim 1, wherein measuring the plurality of speed changes is performed over a range of incremental thrust forces.

3. The method of claim 1, wherein measuring the plurality of speed changes is performed individually by ones of the plurality of vehicles.

4. The method of claim 1, wherein the sequence of incremental thrust forces change the steady-state speeds of the plurality of vehicles so that the plurality of steady-state average drag forces balance additional thrust forces applied to the plurality of vehicles.

5. The method of claim 1, wherein calculating further comprises:
    observing a plurality of differences between speed changes for the plurality of vehicles, and
    comparing a plurality of ratios of total drag coefficients between the pairs of vehicles.

6. The method of claim 1, wherein calculating further comprises:
    inferring speeds-through-water for the plurality of vehicles from a combination of i) advection magnitude and direction, and ii) speeds-over-ground for the plurality of vehicles, and
    calculating squares of the speeds-through-water for the plurality of vehicles at two or more different thrust values.

7. The method of claim 6, wherein calculating the speeds-over-ground for the plurality of vehicles is calculated using data from a satellite navigation system that measures a plurality of positions, velocities, or both positions and velocities for the plurality of vehicles.

8. The method of claim 1, wherein operating the plurality of vehicles comprising ordering the plurality of vehicles to perform closed course navigation paths.

9. The method of claim 8, wherein the closed course navigation paths comprise one of: a circular closed course path, a polygonal closed course path, and a hybrid closed course path composed of both circular arcs and linear segments.

10. The method of claim 9, wherein the closed course navigation paths are about equivalent in at least one of shape, perimeter, length, and orientation.

11. The method of claim 9, wherein the closed course navigation paths are about equivalent in shape and orientation, but perimeter lengths of each closed course navigation path are increased or reduced such that each of the plurality of vehicles completes a full circuit around a respective closed course in about an equivalent amount of time relative to others of the plurality of vehicles.

12. The method of claim 1, wherein the sequence of incremental thrust forces are applied concurrently across the plurality of vehicles.

13. The method of claim 1, further comprising:
    updating, using at least some of the plurality of relative speed performance statistics, a design model for at least one of the plurality of vehicles to generate an updated design model; and
    manufacturing a new vehicle using the updated design model.

14. The method of claim 1, wherein:
    the plurality of vehicles comprise water vehicles,
    incremental thrust forces are generated using a plurality of propellers for the plurality of vehicles;
    the thrust forces are applied by increasing the plurality of propellers to a first number of revolutions per minute (RPM);
    applying the sequence of incremental thrust forces comprises increasing or decreasing the first RPM by a second number of RPM.

15. The method of claim 14, wherein operating the plurality of vehicles comprises ordering the plurality of vehicles to perform at least one of watch-circle navigation, polygonal navigation, or a hybrid watch-circle and polygonal navigation.

16. The method of claim 15, wherein applying the sequence of incremental thrust forces is performed after a slowest vehicle in the plurality of vehicles completes a full circuit around a closed course.

17. The method of claim 16, further comprising:

responsive to the slowest vehicle failing to complete the closed course within a threshold period of time, reducing a length of a perimeter of the closed course for the plurality of vehicles; and responsive to faster vehicles completing more than one circuit of the closed course in a threshold period of time, increasing individual lengths of perimeters of a plurality of vehicle courses proportionately with respective vehicle speeds through the medium, such that all vehicles will complete subsequent circuits of new courses in about a same period of time.

18. A system comprising:

a plurality of vehicles comprising:

a plurality of thrusters for propelling the plurality of vehicles through a medium that subjects the plurality of vehicles to advection caused by movement of the medium, and a plurality of communication devices; and a control system in communication with the plurality of vehicles via the plurality of communication devices, wherein the control system is programmed to:

apply an incremental sequence of about equivalent thrust forces to the plurality of vehicles to generate about equivalent incremental changes in a plurality of steady-state average drag forces for the plurality of vehicles;

receive a plurality of speed changes for the plurality of vehicles; and calculate, from the plurality of speed changes, a plurality of relative speed performance statistics for relative speed performance between pairs of vehicles, wherein calculating is performed independently of the one or more conditions of the medium.

19. The system of claim 18, wherein:

the plurality of vehicles further comprise a plurality of speed measurement systems configured to measure a plurality of speeds of the plurality of vehicles, and the control system receives the plurality of speed changes from the plurality of vehicles.

20. The system of claim 18, wherein the plurality of vehicles comprise either a plurality of water vehicles or a plurality of aerospace vehicles.

* * * * *